United States Patent
Mayer et al.

(10) Patent No.: US 12,447,690 B2
(45) Date of Patent: *Oct. 21, 2025

(54) METHOD FOR SECURING A SECOND OBJECT TO A FIRST OBJECT

(71) Applicant: Woodwelding AG, Stansstad (CH)

(72) Inventors: Jörg Mayer, Niederlenz (CH); Joakim Kvist, Nidau (CH); Philipp Bernhard, Thun (CH); Laurent Torriani, Lamboing (CH); Mario Weiss, Diessbach bei Büren (CH); Antonino Lanci, Bern (CH); Martin Sigrist, Bern (CH); Hannes Merz, Olten (CH); Samuel Malzach, Evilard (CH)

(73) Assignee: WOODWELDING AG, Stansstad (CH)

( * ) Notice: Subject to any disclaimer, the term of this patent is extended or adjusted under 35 U.S.C. 154(b) by 22 days.

This patent is subject to a terminal disclaimer.

(21) Appl. No.: 18/430,210

(22) Filed: Feb. 1, 2024

(65) Prior Publication Data

US 2024/0227312 A1 Jul. 11, 2024

Related U.S. Application Data

(62) Division of application No. 17/719,603, filed on Apr. 13, 2022, now Pat. No. 11,911,972, which is a
(Continued)

(30) Foreign Application Priority Data

Sep. 30, 2015 (CH) ................................. 01421/15
Apr. 18, 2016 (CH) ................................. 00509/16
(Continued)

(51) Int. Cl.
*B29C 65/06* (2006.01)
*B29C 65/00* (2006.01)
(Continued)

(52) U.S. Cl.
CPC .............. *B29C 65/06* (2013.01); *B29C 65/08* (2013.01); *B29C 65/564* (2013.01);
(Continued)

(58) Field of Classification Search
CPC ....... B29C 65/06; B29C 65/08; B29C 65/564; B29C 65/606; B29C 65/608;
(Continued)

(56) References Cited

U.S. PATENT DOCUMENTS 3,431,593 A 3/1969 Miller
3,440,117 A 4/1969 Soloff et al.
(Continued)

FOREIGN PATENT DOCUMENTS

CA 2 624 874 6/2009
DE 1 916 508 10/1970
(Continued)

OTHER PUBLICATIONS

International Preliminary Report on Patentability dated Apr. 3, 2018 (Apr. 3, 2018), Application No. PCT/EP2016/073422, 10 pages.
(Continued)

*Primary Examiner* — Brent T O'Hern
(74) *Attorney, Agent, or Firm* — Rankin, Hill & Clark LLP

(57) ABSTRACT

A method of mechanically securing a first object to a second object, wherein the first object has a thermoplastic material in a solid state, the second object has a generally flat sheet portion having a second object edge. A third object is provided and arranged to provide an assembly including the first, second and third objects, in which assembly the second object edge is in contact with the thermoplastic material. Mechanical vibration energy is coupled into the assembly by means of a vibrating tool until a flow portion of the thermoplastic material due to friction heat generated between
(Continued)

the second object edge and the thermoplastic material becomes flowable and flows around the second object edge to at least partially embed the second object edge in the thermoplastic material and the third object is caused to be embedded at least partially in the thermoplastic material of the first object.

22 Claims, 28 Drawing Sheets

Related U.S. Application Data division of application No. 16/740,765, filed on Jan. 13, 2020, now Pat. No. 11,331,862, which is a division of application No. 15/764,180, filed as application No. PCT/EP2016/073422 on Sep. 30, 2016, now Pat. No. 10,562,233.

(30) Foreign Application Priority Data

| | | |
|---|---|---|
| Jun. 17, 2016 | (CH) | 00778/16 |
| Jul. 29, 2016 | (CH) | 00996/16 |

(51) Int. Cl.

| | |
|---|---|
| *B29C 65/08* | (2006.01) |
| *B29C 65/56* | (2006.01) |
| *B29C 65/60* | (2006.01) |
| *B29C 65/64* | (2006.01) |
| *B29C 65/78* | (2006.01) |
| *B29L 1/00* | (2006.01) |
| *B29L 31/00* | (2006.01) |
| *B29L 31/30* | (2006.01) |

(52) U.S. Cl.
CPC .......... *B29C 65/606* (2013.01); *B29C 65/608* (2013.01); *B29C 65/645* (2013.01); *B29C 65/7811* (2013.01); *B29C 66/1122* (2013.01); *B29C 66/21* (2013.01); *B29C 66/30221* (2013.01); *B29C 66/30223* (2013.01); *B29C 66/43* (2013.01); *B29C 66/474* (2013.01); *B29C 66/7392* (2013.01); *B29C 66/742* (2013.01); *B29C 66/7422* (2013.01); *B29C 66/74283* (2013.01); *B29C 66/8322* (2013.01); *B29C 66/92921* (2013.01); *B29C 65/0627* (2013.01); *B29C 66/0242* (2013.01); *B29C 66/30321* (2013.01); *B29C 66/472* (2013.01); *B29C 66/71* (2013.01); *B29C 66/7212* (2013.01); *B29C 66/73112* (2013.01); *B29C 66/73117* (2013.01); *B29C 66/929* (2013.01); *B29C 2793/0045* (2013.01); *B29C 2793/0081* (2013.01); *B29L 2001/00* (2013.01); *B29L 2031/3002* (2013.01); *B29L 2031/737* (2013.01)

(58) Field of Classification Search
CPC .............. B29C 65/645; B29C 65/7811; B29C 66/1122; B29C 66/21; B29C 66/30221; B29C 66/30223; B29C 66/43; B29C 66/474; B29C 66/7392; B29C 66/742; B29C 66/7422; B29C 66/74283; B29C 66/8322; B29C 66/92921; B29C 65/0627; B29C 66/0242; B29C 66/30321; B29C 66/472; B29C 66/71; B29C 66/7212; B29C 66/73112; B29C 66/73117; B29C 66/929; B29C 2793/0045; B29C 2793/0081; B29L 2001/00; B29L 2031/3002; B29L 2031/737
USPC ......................................................... 428/411
See application file for complete search history.

(56) References Cited

U.S. PATENT DOCUMENTS

| | | | |
|---|---|---|---|
| 4,058,421 | A | 11/1977 | Summo |
| 4,106,962 | A | 8/1978 | Adams et al. |
| 4,358,328 | A | 11/1982 | Pearson |
| 11,911,972 | B2 * | 2/2024 | Mayer et al. ..... B29C 66/30223 |
| 2017/0015049 | A1 | 1/2017 | Kittel |
| 2017/0043525 | A1 | 2/2017 | Wiethoff et al. |
| 2018/0290390 | A1 | 10/2018 | Kvist et al. |

FOREIGN PATENT DOCUMENTS

| | | |
|---|---|---|
| DE | 1916508 A1 * | 10/1970 |
| DE | 100 59 452 | 6/2002 |
| DE | 10 2013 001 943 | 3/2014 |
| JP | 58-124809 | 7/1983 |
| JP | 60-11337 | 1/1985 |
| JP | 2007-007971 | 1/2007 |
| WO | 93/12344 | 6/1993 |
| WO | 2015/117253 | 8/2015 |
| WO | 2015/135824 | 9/2015 |
| WO | 2015/162029 | 10/2015 |

OTHER PUBLICATIONS

English translation of Chinese Office Action dated Mar. 3, 2021, Application No. 201680069402.4, 8 pages.

* cited by examiner

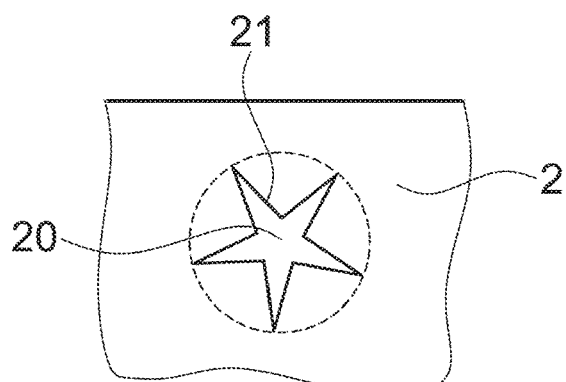
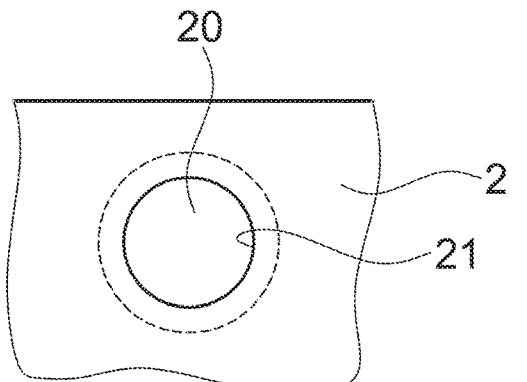
Fig. 1a
Fig. 2a
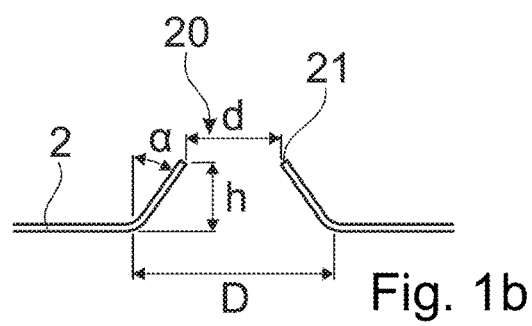
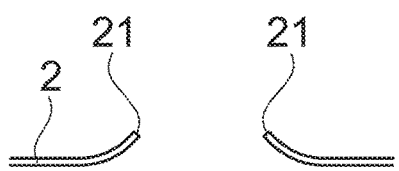
Fig. 1b
Fig. 2b
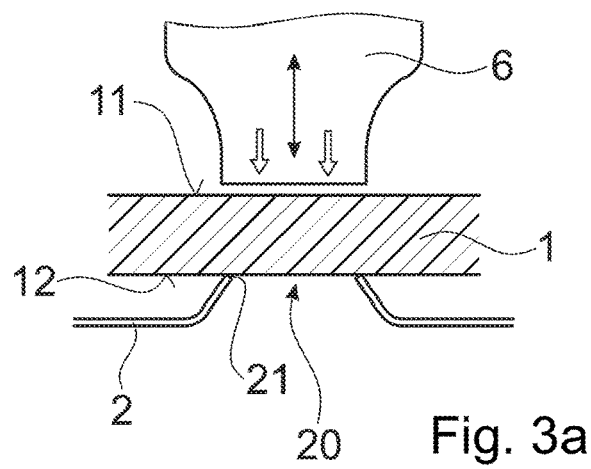
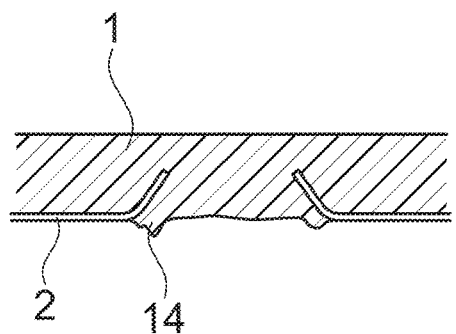
Fig. 3a
Fig. 3b
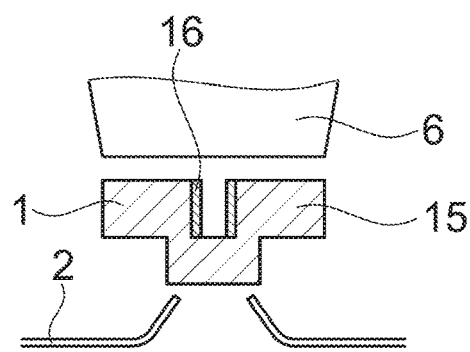
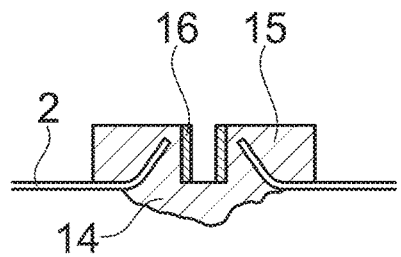
Fig. 4a
Fig. 4b

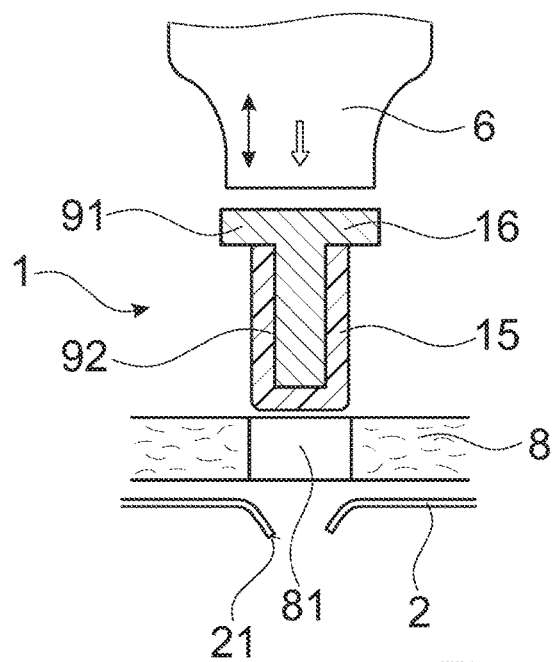
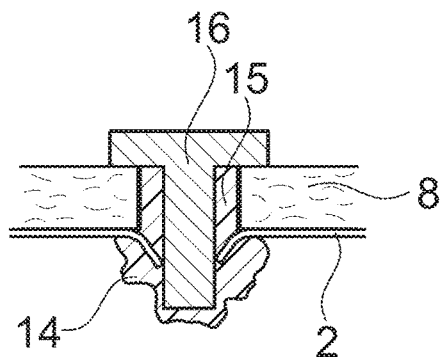
Fig. 18aFig. 18b
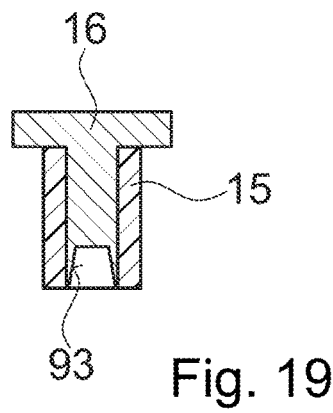
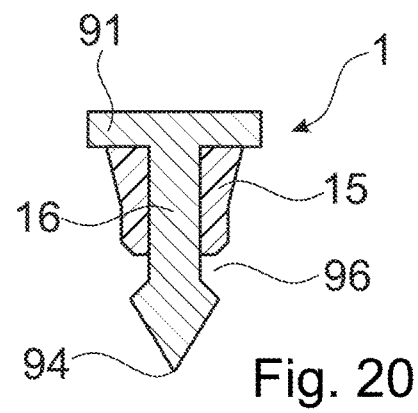
Fig. 19Fig. 20
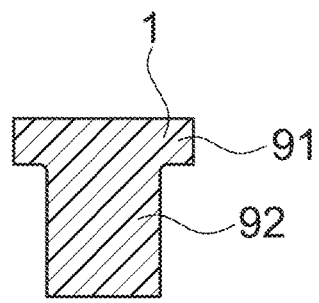
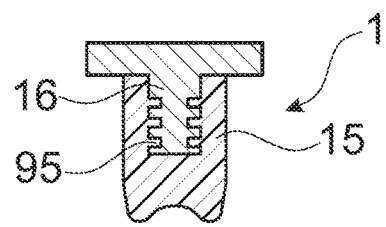
Fig. 21Fig. 22

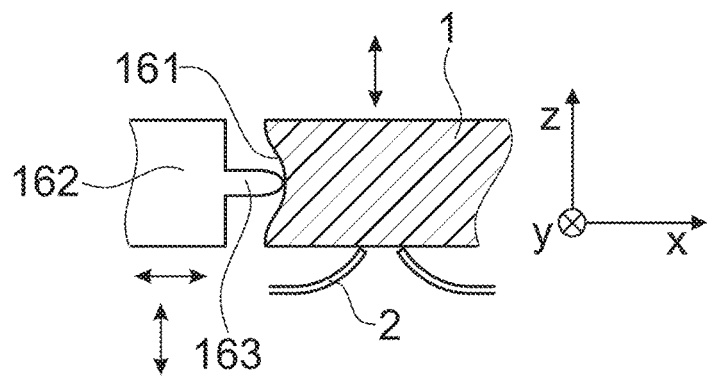
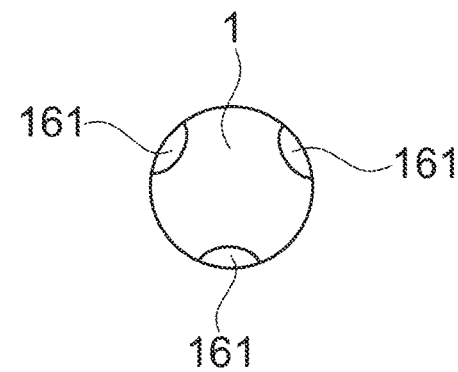
Fig. 50a          Fig. 50b
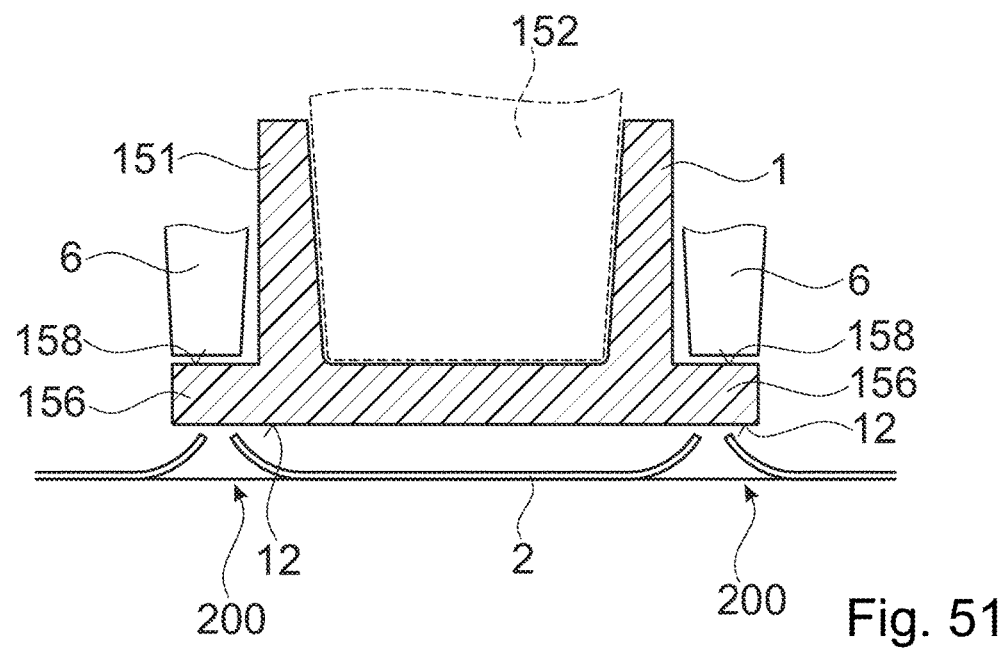
Fig. 51
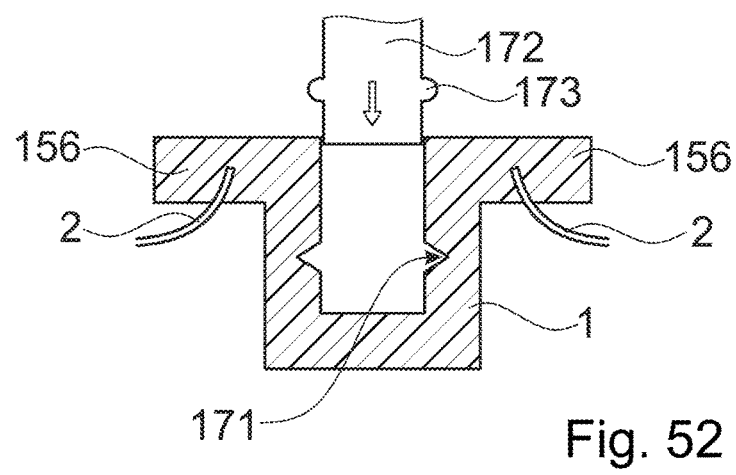
Fig. 52

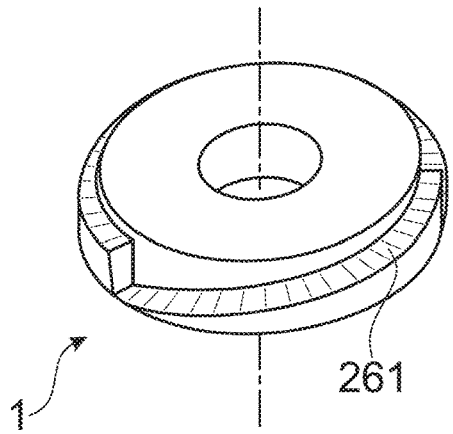
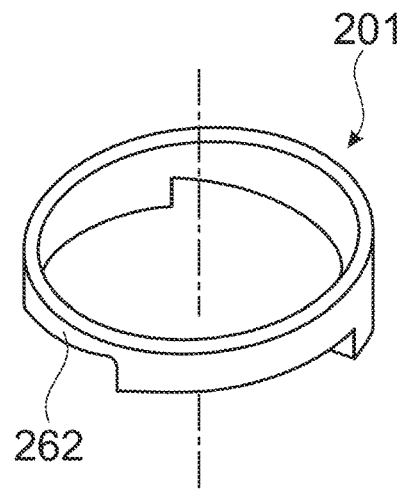
Fig. 57a          Fig. 57b
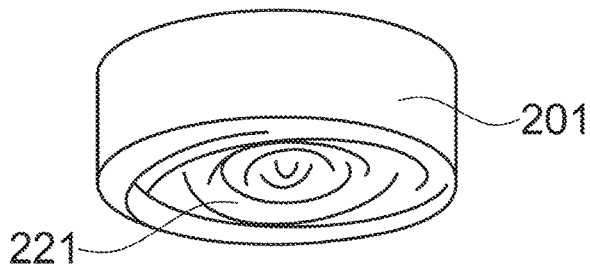
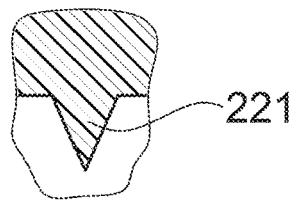
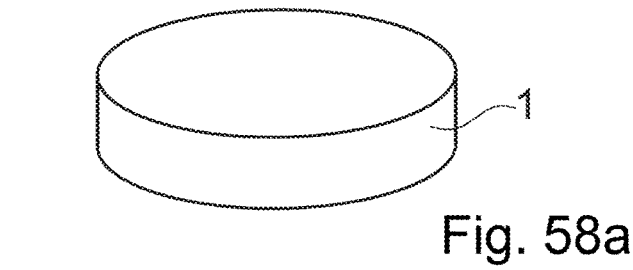
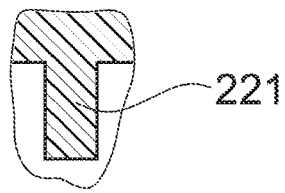
Fig. 58a          Fig. 58b
Fig. 58c
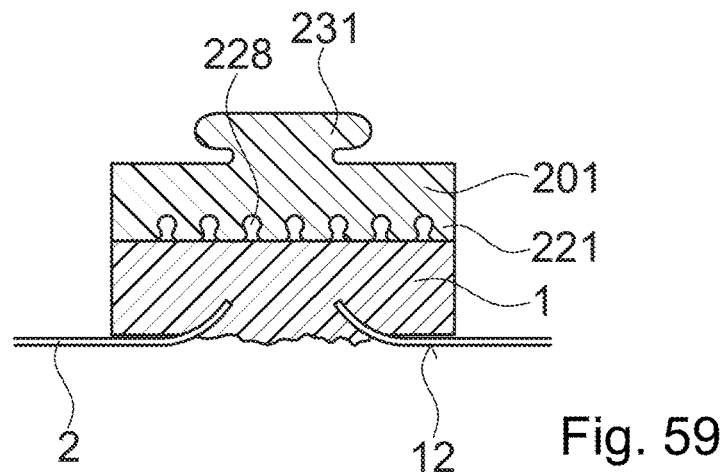
Fig. 59

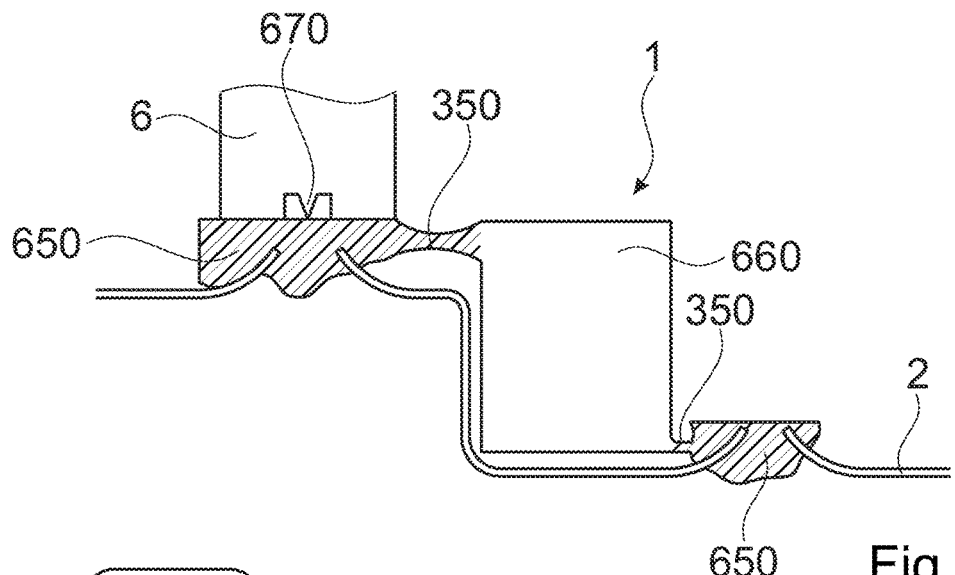
Fig. 119
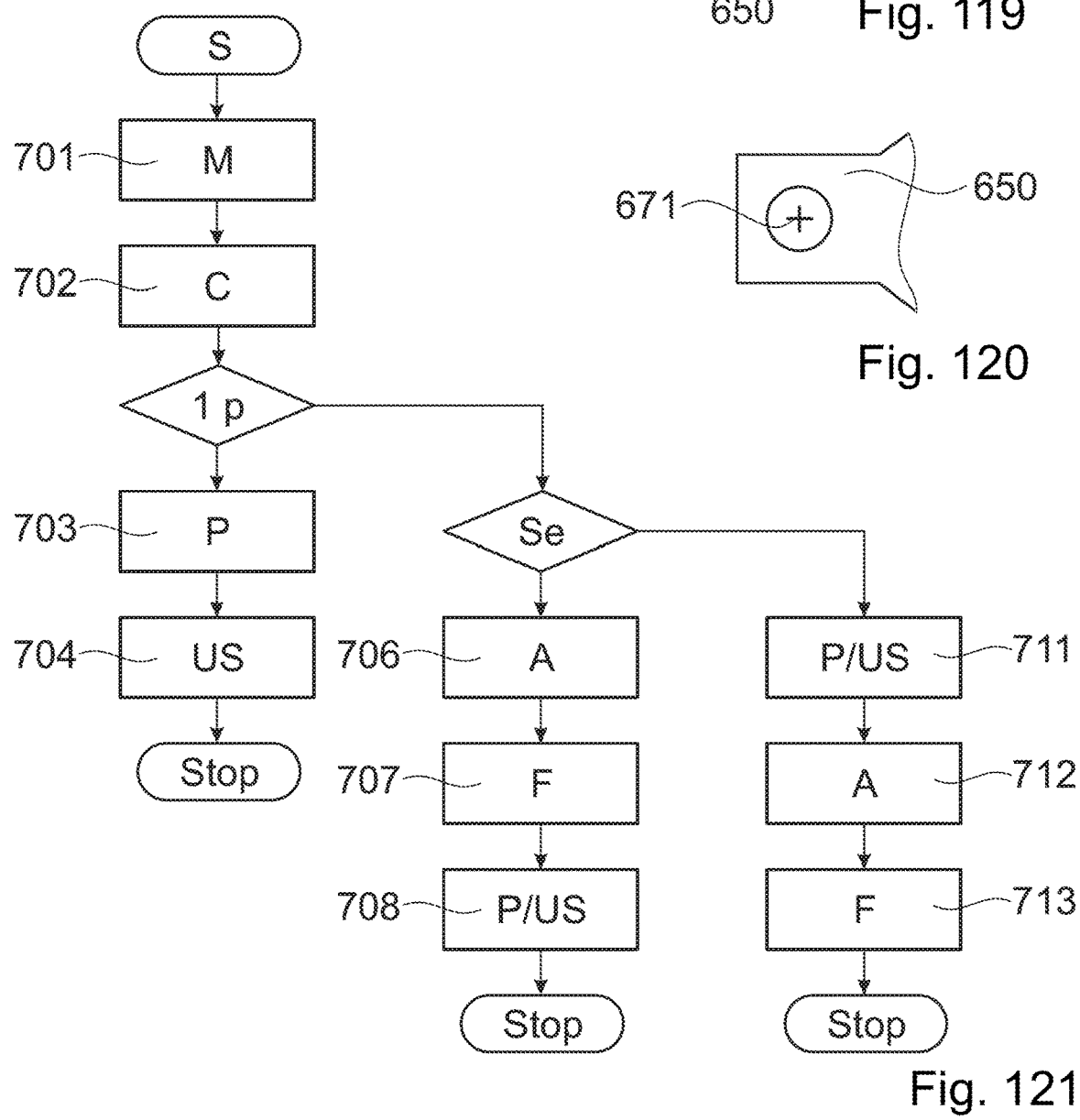
Fig. 120
Fig. 121

METHOD FOR SECURING A SECOND OBJECT TO A FIRST OBJECT

CROSS-REFERENCE TO RELATED APPLICATION

The present application is a continuation of U.S. Ser. No. 17/719,603 filed Apr. 13, 2022, which is a divisional of U.S. Ser. No. 16/740,765 filed Jan. 13, 2020 (U.S. Pat. No. 11,331,862 issued May 17, 2022), which is a divisional of U.S. Ser. No. 15/764,180 filed Mar. 28, 2018 (U.S. Pat. No. 10,562,233 issued Feb. 18, 2020), which is a National Stage of PCT/EP2016/073422 filed Sep. 30, 2016, which claims priority to CH 01421/15 filed Sep. 30, 2015, CH 00509/16 filed Apr. 18, 2016, CH 00778/16 filed Jun. 17, 2016, and CH 00996/16 filed Jul. 29, 2016, the disclosures of which are expressly incorporated herein in their entireties.

BACKGROUND OF THE INVENTION

Field of the Invention

The invention is in the fields of mechanical engineering and construction, especially mechanical construction, for example automotive engineering, aircraft construction, railway industry, shipbuilding, machine construction, toy construction, building industries, etc. In particular, it relates to a method of—mechanically—securing a second object to a first object.

Description of Related Art

In the automotive, aviation and other industries, there has been a tendency to move away from steel-only constructions and to use lightweight material such as aluminum or magnesium metal sheets or polymers, such as carbon fiber reinforced polymers or glass fiber reinforced polymers or polymers without reinforcement, for example polyesters, polycarbonates, etc. instead.

The new materials cause new challenges in bonding elements of these materials—especially in bonding a flattish object to an other object. An example for this is the bonding of parts of polymer-based material to metal parts, such as metal sheets.

To meet these challenges, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used. Further, a flattish adhesive bond between two objects not having the same coefficient of thermal expansion may lead to additional reliability problems as the adhesive bond may be subject to substantial shearing forces in everyday use due to temperature fluctuations.

A particular challenge when bonding elements to each other is the compensation of tolerances, for example if the elements are bonded to each other with other bonds than adhesive bonds, such as by screws and nuts or by rivets. In such bonds, a precise definition or the relative locations of a fastener and the respective fastening location is required. Such precise definition may especially be hard to reach if a manufacturing process has to be particularly economical and/or if the parts to be connected are comparably large in at least one dimension and/or react to the conditions they are subject to during manufacturing and use in a different manner (for example if they have different coefficients of thermal expansion).

SUMMARY OF THE INVENTION

It is therefore an object of the present invention to provide a method of mechanically securing a second object to a first object, the method overcoming disadvantages of prior art methods. It is especially an object of the invention to provide a cost-efficient method that yields a reliable connection between a thermoplastic part and a part that is not liquefiable under the conditions, under which the thermoplastic part liquefies, or that yields a reliable connection between different parts by means of a thermoplastic connection element. It is another object of the invention to provide a method that yields a reliable connection between parts and is efficient and quick. It is a further object of the invention to provide a method that yields a reliable connection between parts and allows for an efficient tolerance compensation.

According to an aspect of the invention, a method of mechanically securing a first object to a second object is provided, the method including the steps of:
Providing the first object including a thermoplastic material in a solid state;
Providing the second object with a generally flat sheet portion with the sheet portion having an edge;
Positioning the first object relative to the second object so that the edge is in contact with the thermoplastic material;
Coupling mechanical vibration energy into the assembly including the first and second objects until a flow portion of the thermoplastic material due to friction heat generated between the edge and the thermoplastic material becomes flowable and flows around the edge to at least partially embed the edge in the thermoplastic material;
Stopping the mechanical vibration and causing the thermoplastic material to re-solidify, whereby the re-solidified thermoplastic material at least partially embedding the edge anchors the first object in the second object.

In the step of coupling mechanical vibration energy into the assembly, the first object may be pressed against the edge so that upon liquefaction of the flow portion the edge is pressed into the thermoplastic material of the first object.

After stopping the mechanical vibration, a pressing force in embodiments is maintained until the flow portion has re-solidified at least to some extent to prevent a spring-back effect.

In embodiments, the second object is provided to have a perforation of the sheet portion, with the edge running along the perforation.

In embodiments having a perforation, the sheet portion around the perforation has a projecting section projecting away from a sheet plane towards the first object, i.e. towards proximally if the vibration is coupled into the first object.

The first object and the connection to the second object may in embodiments be such as to seal the perforation off, i.e. to seal a region proximally of the second object from a region distally thereof. To this end, the first object may for example have a continuous body extending to the periphery, which periphery embeds the edge.

In other embodiments, the first object has a through opening, in which through opening for example a connector piece or not liquefiable body as described hereinafter may be arranged, which piece or body forms an anchor piece for a further object. It may for example have a thread or other engagement feature, and/or it may serve for a nut-and-bolt arrangement extending through it. Alternatively, a bearing sleeve, a ball bearing or other bearing may be positioned in the first object, especially a through opening of it.

Especially, the mechanical vibration energy may be coupled into the first object and not (not directly, i.e. at most via the first object) into the second object. Especially, in the step of positioning, the first object may be brought into contact with the second object from a generally proximal side, and the step of coupling energy into the first object may include pressing a vibrating sonotrode against a proximally facing coupling face of the first object, whereby by the sonotrode simultaneously the pressing force relative to the second object and mechanical vibration are coupled into the first object.

For applying a counter force to the pressing force, the second object may then be placed against a support, for example a non-vibrating support. In embodiments, the second object is placed against a support with no elastic or yielding elements between the support and the second object, so that the support rigidly supports the second object.

However, the pressing forces applied during the process may be low enough for the second object to be self-supporting. In general, the approach according to the present invention given the generally very good energy absorption characteristics of an edge (being an intrinsic energy director for mechanical vibration energy) in physical contact with a thermoplastic object, the thermoplastic object and/or the edge being subject to mechanical vibration, makes possible that only small pressing forces have to be applied. This may be a substantial advantage for applications in which at least one of the objects has a complex shape and/or is part of complex item, such as a car body, and where therefore placing a rigidly supporting support at the lateral position where the pressing force is applied can be difficult.

It is not excluded, though, that the energy is coupled into the second object, i.e. the mechanical vibration energy impinges from the side of the second object.

Especially, but not only, embodiments that include coupling the vibration into the second object, the vibration may be transverse vibration, whereas in other embodiments the vibration will be longitudinal vibration. Set-ups with transverse vibration are for example known from welding of metallic parts. For this, for example the following options exist:

A sonotrode couples vibration into the second object from a generally lateral direction (in-plane direction with respect to the sheet plane of the second object, if defined), whereas a separate pressing tool applies the required pressing force between the first and second objects.

A sonotrode itself is caused to be subject to transverse vibration at the distal end where it is coupled to the second object. To this end, a mechanical coupling between the sonotrode and the second object may be such that such transverse movement is capable of being transferred to the second object. For example, the second object may in addition to an anchoring plate including (for example constituting) the sheet portion also include a fastening element that may be coupled to the sonotrode. Especially, in embodiments the second object is a fastener configured to fasten a further object to the first object, and the fastening element has a corresponding structure, for example by being a threaded bolt (inner and/or outer thread), a bolt without a thread, a pin, a nut, a hook, an eyelet, a base for a bayonet coupling, etc.

The present invention also concerns a set of a sonotrode and of a second object adapted thereto for carrying out the process according to any embodiment of the invention that includes coupling the mechanical vibration into the second object. For example, the second object may include an anchoring plate and a fastening element bonded thereto, and the sonotrode may include a distal outcoupling face shaped for a force and vibration transmitting contact with the anchoring plate, and a receiving structure for accommodating the fastening element. The receiving structure, for example receiving opening or protrusion may be adapted for mechanical coupling to a fastening structure (thread or similar) of the fastening element.

Optionally, in addition to the mechanical vibration energy, further energy may be coupled into the assembly. In an example, the second object may be pre-heated by IR irradiation, induction (especially efficient near the edge), a hot air stream, etc. In addition or as an alternative, the thermoplastic material may be pre-heated locally near the interface to the edge, for example by electromagnetic heating as described in Swiss patent application 01 104/15, by irradiation, etc. For example, for electromagnetic heating as described in Swiss patent application 01 104/15, the thermoplastic material in the attachment zone may be provided with a magnetic dopant.

In both cases, the pre-heating assists the process of making the thermoplastic material flowable directly and/or indirectly. An indirect effect is achieved if the pre-heating step causes the absorption of mechanical vibration energy to be increased at/near the locations where the pre-heating step takes effect, especially due to enhanced internal friction caused by the increased temperature.

Such additional, further energy may have the purpose of enhancing the velocity and/or reducing the required pressing forces. This may also have a positive effect on the process control.

The flow portion of the thermoplastic material is the portion of the thermoplastic material that during the process and due to the effect of the mechanical vibration is caused to be liquefied and to flow. The flow portion does not have to be one-piece but may include parts separate from each other.

The liquefaction of the flow portion in this is primarily caused by friction between a vibrating part of the assembly (such as the first object) and a non-vibrating part (such as the second object), which friction directly or indirectly heats the thermoplastic material of the first object. This is particularly efficient if the heat generating friction takes place at the place where the material is to flow, because then in contrast to other methods that include liquefied thermoplastic material, the there is no cooling effect at places where the flow portion has flown away from the heat source. Especially, in the step of causing a flow portion of the thermoplastic material to become flowable, the flow portion or parts thereof may become flowable due to heat generated between the projecting section and the thermoplastic material. In embodiments, the second object by the above-described method steps is secured to the first object wherein a space on the other side of the second object than the side from which the first object is brought into contact with it (a distal side in embodiments of the above-mentioned kind in which the vibration energy is coupled into the first object from a generally proximal side) may be free along the edge (thus, if applicable, around the perforation) so that the thermoplastic material can flow immediately along the surfaces of the second object's sheet portion. Especially, in embodiments no further object distally of the second object is secured to the second object by the first object.

In embodiments, the sheet portion along the edge (thus if applicable around the perforation) is deformed so that the sheet portion projects away from a sheet plane defined. Especially, the sheet portion may project towards the side of the first object (towards the proximal side in embodiments of the above-mentioned kind in which the vibration energy is coupled into the first object from a generally proximal side). Especially, the projecting section (if any) being a deformed section may be of a same metal sheet material as the sheet portion.

In this text, the term "sheet plane" denotes the plane/surface defined by the shape of the generally planar sheet portion in a region around the edge, especially around the perforation (if any). The sheet plane may be planar in the sense of extending straight into two dimensions. Alternatively, the sheet plane may be curved and thereby follow a more complex 3D shape, for example if it constitutes the surface of a complex object, such as a body of a vehicle or aircraft. In case the second object is, near the edge, deformed to project away from the sheet plane, the curvature of second object at the location from where the deformed section extends will often be much larger than the curvature of the sheet plane.

Such a deformed section may be formed by deforming a corresponding part of the sheet portion, for example by making a cut (for example by punching) and bending or otherwise deforming hence leaving a second element opening where the corresponding part of the sheet portion had initially been. In this, the deformed section may still be one-piece with the sheet section.

As an alternative to a deformed section, would also be possible to provide a section of the sheet portion that projects away from the sheet plane as a separate element secured to the sheet material, for example by welding.

As an even further alternative to a deformed section, it would be possible to manufacture a section projecting towards the side from which the first object is brought into contact, which section ends in the edge, by an ab-initio shaping process, such as by die casting or pressing or injection molding (followed by well-known subsequent processing steps) if the named section is of ceramic. In such embodiments, the sheet portion may even consist of the portion that projects towards the first object and/or the section that after the process is embedded in the flow portion i.e. there is no need to have a sheet plane that is further defined by the sheet portion.

In embodiments with a perforation and with a projecting (for example deformed) section around the perforation, the deformed section may be symmetrical, i.e. may be deformed uniformly around the perforation (this includes the possibility that the deformed section has a rough edge, for example with a sawtooth-like shape). Especially, it may be symmetrical with respect to rotation around an axis perpendicular to a sheet plane through a center of the perforation.

Alternatively, it may be asymmetrical with respect to rotation around said axis in that the height (average height in case of a rough/toothed edge) of the projecting section differs as a function of the position along the edge. In such embodiments, the asymmetry may even be such that the projecting section does not extend all around the perforation but along some segment of the edge there is no such projecting section. In this case, however, the projecting section may extend around at least more than 180% of the periphery so as to lock the first and second objects with to each other with respect to all in-plane relative forces.

In a group of embodiments with the second object including a perforation along which the edge runs, the sonotrode and the first object may be adapted to each other so that the coupling face (the part of the first object surface against which the sonotrode is pressed) covers in-plane positions of the edge but does not extend to a central position with respect to the perforation. "To cover in-plane positions" in this context means that in a projection along the proximo-distal axis the edge lies in an area of the coupling face.

For example, the coupling face may form a lane around a center, with an in-plane position of the center corresponding to an in-plane position of the perforation.

To this end, either one or a combination of the following options may be realized:
  The sonotrode includes a central indentation, with the coupling face around the central indentation; and/or
  The first object includes a proximally facing central indentation, with the coupling face around the central indentation.

Effects of the coupling face not extending to central positions may include making process control easier, and/or preventing central portions of the first object, for example having a functional element, from becoming damaged.

In a group of embodiments that include the perforation of the second object and a projecting section around the perforation, the projecting section projecting towards proximally towards the first object, the first object may be provided with a distally facing spacer (also referred to as "foot portion" in this text). Such spacer may be arranged laterally of the location where the first object's contact side comes into contact with the edge of the second object.

Especially, the spacer may be arranged more laterally than the projecting section of the second object, whereby, when the first and second objects are pressed against each other when the vibration impinges, a relative movement of the first and second objects against each other can be caused until the foot portion abuts against the sheet portion where the sheet plane is defined. Thereby, the z-position of the first object relative to the second object is defined by the dimension of the foot portion that serves as a spacer.

Such a foot portion, therefore, is an example of a relatively simple measure for achieving z position control without sophisticated measurement tools. Especially, the foot portion makes a good process control possible in that at the end of the process the operator has a physical feedback when he has reached the right z position. This may be advantageous if the process is carried out manually or also if the mechanical resistance is a control parameter in an automated process. Other measures for precise z position control are discussed hereinafter.

The method may include the further step of manufacturing a perforation in the second object prior to the step of positioning, for example by punching, drilling, etc. Alternatively, the perforation along which the edge is formed in embodiments may be an opening that exists in the second object anyway or has been provided in a manufacturing process.

The first object includes thermoplastic material. In embodiments, the first object consists of thermoplastic material. In other embodiments, the first object in addition to the thermoplastic material includes a body of a not liquefiable material. Such a body of not liquefiable material may constitute a reinforcer portion of the first object.

In embodiments with a not liquefiable body, the body of the not liquefiable material is different from a mere filler of a large number of particles but is a macroscopic body with a defined position and orientation and of a substantial size. In a sheet plane defined by the second object, the size may be for example at least 10% of first object average diameter (of a cross section perpendicular to the insertion axis) or, if applicable, of a perforation average diameter, and/or a characteristic dimension may be at least 0.1 mm in any dimension. Especially, the body may be metallic or of ceramics. Especially, the body may be such as to have a defined shape and to thereby add stiffness to the first object. By the body, the first object is defined into at least two spatially separated regions, namely the body region and the thermoplastic region.

In embodiments in which the first object in addition to the thermoplastic material includes not liquefiable material, the thermoplastic material may be arranged at least on surface portions that come into contact with the edge.

The first object may include a fixation element for fastening a further object to the second object. For example, the first object may itself be such a fixation element (fastener) by including an appropriate structure, such as a thread or other fastening structure, or it may carry a dedicated fixation element, such as a threaded bar, nut, etc. In these embodiments, the first object may be viewed as a fastener—or anchor—for the further object. In alternative embodiments, the first object may itself constitute an object having a function different from being a mere fastener.

Especially, but not only, in these alternative embodiments, the first object may be relatively large, it not being possible to vibrate the whole first object to attach the first object simultaneously at a plurality of attachment locations. In such embodiments, it may be either necessary to simultaneously cause a plurality of sonotrodes to impinge to attach secure the first object to the second object at a corresponding plurality of attachment locations, and/or it may beneficial to have sufficient flexibility to sufficiently de-couple the portion of the first object where attachment takes place from a rest of the first object. Examples for this are discussed hereinafter, for example referring to the attachment flange.

In embodiments, the first object has an attachment zone that includes the thermoplastic portion and further has a functional zone different from the attachment zone. Such functional zone may for example include the fastening structure and/or other functional elements. The functional zone may be configured so that it is not possible and/or not desired to locally liquefy thermoplastic material that will embed the edge in the process. In many embodiments, the first object in the functional zone is not liquefiable. In other embodiments, the first object in the functional zone may include liquefiable material, however, the function would be adversely affected by the process according to the invention.

In embodiments, the first object is manufactured in a process that includes a step of two-component injection moulding, with the attachment zone being of one thermoplastic material and the functional zone including another thermoplastic material. Then (or also in other situations with the first object including two thermoplastic material parts), the thermoplastic materials of the different zones have different material properties.

The modulus of elasticity E of the thermoplastic material of the functional zone may be greater, for example much greater, than the according modulus of the attachment zone; and/or The (elastic) extensibility of the thermoplastic material of the attachment zone may be much higher than the extensibility of the functional zone. To this end, the thermoplastic material of the attachment zone may optionally be an elastomeric thermoplastic material, such as thermoplastic polyurethane. Thereby, it is suited for repeated heating/cooling cycles. According to another option, the thermoplastic material of the attachment zone may be a partially crystalline polymer with a relatively low glass transition temperature and a comparably high plasticity at elevated temperature (for example polypropylene) to compensate a thermic distortion, for example in an electrodeposition process, by a one-time plastic deformation (creeping) process.

By the latter, for example different thermal expansion behaviors between the first object and the second objects may be compensated for.

In embodiments that include at least one attachment zone, the material of the attachment zone(s) may be secured to a first object body (that includes the functional zone(s)) by a positive-fit connection. For example, the first object body may include at least one undercut opening, and the thermoplastic material forming the attachment zone(s) may be present at least partially in the undercut opening(s). In addition or as an alternative, the body may include an open porous section, with the thermoplastic material of the attachment zone(s) interpenetrating the porous section. In addition or as an alternative to the positive-fit connection, also other kinds of mechanical connections between the material of the attachment zone and the body may be present, such as an adhesive connection.

In a group of embodiments, the first object includes a body that defines the functional zone and a flange (attachment flange) running along at least a portion of a lateral periphery of the body and defining the attachment zone, whereby at least portions of the flange in the step of coupling mechanical vibration energy into the assembly are clamped between a sonotrode acting in an axial direction and the second object.

An attachment flange may be a peripheral, laterally protruding portion of the first object. It may consist of the thermoplastic material; at least a distal face includes the thermoplastic material. It may for example define a proximally facing incoupling surface for a sonotrode that is at least approximately parallel to the distal surface of the first object where the latter is in contact with the edge of the second object 2. Thereby, even if the first object due to its function has a complex shape that may be different from a shape having a plane distal surface, a less complex shape at the attachment location(s) becomes possible.

The first object, especially an attachment flange thereof, may include a well-defined, possibly marked proximally facing coupling surface portion that is positioned to correspond to an attachment location defined by the second object, for example a perforation thereof, along which the edge extends. Such coupling surface portion may for example be parallel to the corresponding distally facing surface portion on the opposite side, which comes into contact with the edge of the second object.

Also, the first object may include an elastic joint between an attachment flange—or other attachment structure that has the coupling surface and the surface portion that comes into contact with the edge—and a first object body. Thereby, the attachment structure, for example attachment flange—can be vibrationally de-coupled from the rest of the first object. This may especially be an option in embodiments in which the first object is comparably large and in which it is not readily possible to couple vibration into the whole first object or in which it would be detrimental do to so. In such embodiments, attachment at different attachment locations either has to be carried out simultaneously for many attachment locations, in which case several sonotrodes have to act simultaneously. An alternative is sequential attachment at different attachment locations. Then, there is the need of a certain flexibility of the first and/or second object, since the attachment process brings about a relative movement of the first and second objects at the actual attachment location, whereas such movement is not present at other attachment locations. An attachment flange and/or an attachment structure separated from the body by a joint may bring such flexibility.

In a group of embodiments, the method includes the further step of providing a connector piece that is initially separate from both, the first and the second objects. In these embodiments, the assembly into which the mechanical vibration energy is coupled also includes the connector piece. The connector piece in the process may be caused to be embedded at least partially in thermoplastic material of the first object and to be, after re-solidification, anchored with respect to the first and second objects. In embodiments, as described in more detail hereinafter, a connector piece may be connectable (by being embedded or by another connection) to the first object in a plurality of possible relative positions, for example to compensate for variations of dimensions/positions during a manufacturing process.

Especially, in the step of coupling mechanical vibration energy into the assembly, a vibrating sonotrode may be pressed against a coupling face of the connector piece while the connector piece is pressed against the first object until the thermoplastic material of the first object becomes flowable in a vicinity of the connector piece so that the connector piece is driven into the first object. Simultaneously and/or subsequently, mechanical vibration energy may also be absorbed at the interface between the second object and the first object.

The connector piece in this may be caused to extend through a plane defined by the edge of the sheet portion, thus if applicable by a mouth of the perforation, from a proximal side thereof. Similarly, in case the first object has a body of a not liquefiable material, such as a reinforcer portion, the body may be arranged to extend through the plane defined by the edge (if applicable the mouth of the perforation). More in particular, in embodiments in which the second object has a perforation, the connector piece/the body may extend through the perforation.

A connector piece of the discussed kind may consist of a not liquefiable material. Alternatively, it may include a thermoplastic material. In an example, it includes a thermoplastic material that is capable of being welded to the thermoplastic material of the first object; it may be of a same thermoplastic material or at least include a same matrix polymer material.

A connector piece of the discussed kind may have one or a combination of the following functions:

The connector piece may form together with thermoplastic material an interface at which absorption of mechanical energy takes place. Thus, the connector piece provides an additional means to control the energy absorption and thereby the flow of the thermoplastic material.

The connector piece may be shaped to confine the flow of the thermoplastic material, especially inwardly with respect to radial direction, thereby causing the material to more pronouncedly flow around the second object near the edge, especially on its distal side.

The connector piece may have further functional elements, such as a connecting portion, flange, etc. Generally, the considerations in this text that apply to the shape and function of the connector piece also apply to a body of not liquefiable material that is part of the first object (such a body could be viewed as pre-mounted connector piece).

A body of not liquefiable material of the first object or a connector piece may carry structures serving for further functions, such as a thread, another mechanical connection, a contact or feedthrough, etc.

Independent of whether there is a body or a connector piece or not, in a group of embodiments, the method includes attaching a first object to a metal part that forms part of a car body.

In embodiments, the body or connector piece, respectively, has a surface with at least one retaining feature on a lateral surface part, which retaining feature cooperates with thermoplastic material the body to stabilize the relative position of the body, within embedding thermoplastic material.

The present invention also concerns a connector piece having the properties as defined in this text. The invention further concerns a kit of at least one connector piece and a first object and/or a sonotrode.

The invention moreover concerns a connector that is a first object according to any embodiment described in this text or of which such a first object forms part. The invention moreover concerns a fastener that is a second object described in this text and includes a fastening element.

In a group of embodiments, the first object includes a structured contact side that includes the thermoplastic material. The contact side is the side of the first object that is brought into contact with edge for the securing. The fact that the contact side is structured means that it is different from just being flat and even and that it includes protrusions/indentations. For example, it may include a pattern of ridges and grooves, for example a regular pattern.

It has been found that a structured contact side may have the effect of reducing the energy and force inputs required until the edge has penetrated into thermoplastic material of the first object to a sufficient depth. Especially, this required input may be reduced by more than just a proportionality factor corresponding to the portion of unfilled volumes of indentations. This may be attributed to additional flow channels being generated by the structure.

In an embodiment, the structure forms a pattern of radially extending ridges/grooves.

In embodiments in which the sheet portion of the second object has a protruding section projecting away from the sheet plane towards the contact side, the depth of the indentations may be chosen to be smaller than a height of the protruding section.

A further group of embodiments also addresses the issue of reducing the required force and/or energy input. In this further group of embodiments, the second object includes a plurality of for example smaller peripheral perforations arranged around a for example larger main perforation.

Such peripheral perforations may especially be arranged in a section of the second object that projects away towards the contact side from a second object sheet plane, i.e. the peripheral perforations may be arranged where the sheet material is sloped with respect to the sheet plane.

Such peripheral perforations have the effects of enhancing the footprint of the connection, of providing an additional securing against rotation, and of reducing the resistance during the process by providing further flow channels.

Referring to the hereinbefore discussed groups of embodiments, a reduction of the energy and force input may be desired especially if the involved materials are delicate and/or if the method is applied at a relatively advanced stage of manufacturing a complex article. For example, in embodiments the second object may include a lacquered/painted piece of sheet metal, and the lacquer/paint may be damageable. The approach according to these groups in such situations may be advantageous.

In many embodiments, if the method includes pressing the first object against the second object while vibration is coupled especially into the first object, a counter force to the pressing force is generated by the second object being held at a position different from the location against which the first object is pressed, such as a mounting frame or by the second object being part of a complex, comparably heavy item that stands on a ground. Then, consequently, the counter force relies on the stiffness of the second object. If needed, a dedicated support may be used to assist.

In a group of embodiments, in addition to the second object a dedicated anvil structure is used. An anvil of such structure may be placed distally of the second object, and it may have at least one of the following functions:

The anvil directs the flow of flowable thermoplastic material and consolidates. Thereby, the overall stability of the connection between the first and second objects after the process is enhanced, and this ultimately reduces the required penetration depth. Thus, also use of an anvil may be a measure for reducing the required force and energy input.

The anvil may also support the second object and avoid undesired deformation thereof, if for example the second object is comparably thin or weak.

Such anvil may be different from merely flat. Especially, it may include a directing protrusion outside of the edge (inward with respect to the center of the perforation if the edge extends along a perforation) and an indentation distally of the edge (and radially outward from the edge if the edge extends along a perforation) to direct a flow to "underneath" (distally of) the edge and the second object portions adjacent the edge.

A volume of such indentation may especially be smaller than a volume of the thermoplastic material available for becoming flowable, so that if the vibration input is maintained sufficiently long, a volume of the flow portion is higher than a volume of the indentation. Thereby, a sufficient shaping pressure may be built up during the process, whereby the filling of the indentation by the flow portion is controlled and predictable.

In a group of embodiments, the method includes adjusting a position of the first object and/or of a sonotrode relative to the second object. This especially pertains to an x-y (in-plane) position. For this, two basic configurations exist:

In a first basic configuration, the x-y-position of the sonotrode with respect to the second object is defined, for example by a mounting frame, and the step of adjusting includes adjusting a position of the first object that is arranged between the sonotrode and the second object, with respect to the sonotrode and the second object.

In a second basic configuration, one uses means for defining a position of the first object relative to the sonotrode, and the step of adjusting includes adjusting a position of the first-object-sonotrode assembly relative to the second object.

In accordance with the first basic configuration, the means by which the position of the first object is adjusted relative to the sonotrode and the second object (holders or similar) are by construction independent of the sonotrode. Then, one has to ensure that the mechanical vibrations can be coupled into the first object. To this end, according to a first option, the shape of a guiding tool used for this is adapted to the shape of the first object in a manner that only the transversal position is precisely defined but that there is some degree of freedom with respect to movements in axial directions (for longitudinal vibration coupled into the first object). According to a second option, that can be combined with the first option, the guiding tool includes a spring so that the first object is only loosely coupled to any mounting frame.

In accordance with the second basic configuration, the sonotrode and the first object may be adapted to each other for the lateral relative position being defined. For example:

The sonotrode may include a guiding protrusion cooperating with a guiding indentation of the first object, or vice versa. Optionally, such guiding protrusion/guiding indentation (or other guiding means) may be different from rotationally symmetrical to prevent any rotation of the first object relative to the sonotrode.

The sonotrode may include a peripheral flange encompassing the first object to define its position.

The sonotrode may include at least one penetrating guiding element (spike or similar) that during the process penetrates into material of the first object.

It would also be possible to secure the first object temporarily to the sonotrode, for example by screwing or similar.

In addition or as an alternative, other means may be used to temporarily couple the first object to the sonotrode, for example a vacuum being applied between the sonotrode and the first object, for example through suction channels through the sonotrode.

In addition or as yet another alternative, a separate guiding element may be used. Such separate guiding element may be laterally guided both, relative to the sonotrode and relative to the first object. Especially, it may be guided relatively loosely relative to the sonotrode so that the vibration is not coupled into the guiding means. Such guiding element may be a cylindrical element guided in aligned openings the first object and the sonotrode, the openings adapted to a cross section of the guiding element. Especially in embodiments in which the guiding element is loosely guided also relative to the first object, an additional axial support may be provided for preventing the guiding element from breaking loose from the assembly.

If applicable, the cylindrical shape of such guiding element may but does not need to be the shape of a rotational cylinder.

In addition or as an even further alternative, a hold-down tool that is different from the sonotrode and used in addition thereto, is used. Such hold-down tool is used to press the first object against the second object at least during an initial phase of the step of coupling mechanical vibration energy into the assembly. By such hold-down tool the issue is addressed that when longitudinal vibration is coupled from a sonotrode into a first object, wherein the sonotrode is pressed against the first object, during about a half-wave per oscillation cycle, the sonotrode does not exert any force on the first object. Absent any lateral guidance (for example as described above), this may cause a loss of control, with the first object "floating" relative to the second object. An additional hold-down tool ensures that the first object is pressed against the second object. Such additional hold-down tool may include a guiding structure defining a lateral position of the first object relative to the guiding tool, for example a peripheral flange.

The approach according to the invention features the substantial advantage that the attachment location defined by the edge that in the process is embedded in the flow portion does not have a precisely defined position, even if a precise positioning of the first object with respect to the second object is desired and achieved.

More in concrete, for the variation of the relative positions of the attachment location and of the first object, the following statements may be made:

- The lateral (x-y) variation largely depends on the lateral extension of the first object or of an attachment zone thereof, respectively. For relatively small attachment zones (for example small perforation, they may for example be between 0.1 mm and 5 mm. For larger attachment zones (for example a larger perforation), they may scale to higher figures.
- The axial (z-) variation if the first object has a flat distally facing surface depends on how far the section of the second object protrudes towards the first object. It may vary between 0.1 mm and 2 mm for relatively small heights of the protruding section any may be higher for larger dimensions.
- Depending on how far apart different attachment locations are, or more generally on the lateral extension of the attachment zone, an angle variation of up to 10°-20° may be compensated.
- In many embodiments, a restriction is given in that around the attachment zone thermoplastic portions not belonging to the flow portion should remain. A thickness of this non-liquefied zone for example may be at least 1 mm in all dimensions.

Due to this effect, the approach according to the invention may be used for tolerance compensation, for example by the following method:

- Step 1: measuring the tolerance mismatch, for example by optical methods and comparison with CAD data.
- Step 2: calculating the position correction x,y,z, angle.
- Step 3: Positioning the first object and the second object with respect to each other in the calculated corrected position x,y,z, angle (minus a z-offset accounting for a relative movement of the first and second objects during the subsequent step 4).
- Step 4: Performing the method according to any concept and/or embodiment described in this text, until the correct calculated position has been reached.

Optionally, there may be correction accounting for the softness of the structure by an external distance measuring system coupled to the device by which the vibration energy is applied, which correction system adapts the end z-position if necessary.

In embodiments, in addition or as an alternative to this, another measure for compensating for z-variations may be taken. By this other measure, the above-named range of z-variations (of for example between 0.1 mm and 2 mm) may for example be outdone, also this measure makes different kinds of control over the z variation compensation possible.

This other measure comprises:

- Providing an anchoring part and an adjustment part, wherein at least the anchoring part belongs to the first object (and in embodiments may be constituted by the first object).
- Adjusting a z-position of the adjustment part with respect to the anchoring part; and
- Fixing the adjustment part with respect to the anchoring part while it is in the adjusted position.

The z-direction may be a direction perpendicular to a sheet plane defined by the second object in a vicinity of the attachment location. Alternatively, for example if such plane is not defined, the z-axis may be defined to be the axis along which the pressing force acts during the step of applying the mechanical vibration for causing the edge to be embedded.

The following options may apply:

- The step of fixing may cause a non-releasable fixation of the adjustment part with respect to the anchoring part. For example, the step of fixing and/or the step of adjusting may include impinging the assembly of the anchoring part and the adjustment part with mechanical vibration to cause thermoplastic material of at least one of the parts to become flowable and to fix, after re-solidification the parts to each other.
  - Such fixing the parts to each other after re-solidification may according to a first option be caused by material of the objects fusing together, for example in a weld, or alternatively because the anchoring part and the adjustment part are of one piece, with a transition zone (collapse zone, expansible zone) between them that is deformable when the thermoplastic material is flowable (in this, flowable includes "pasty; plastically deformable by moderate force input").
  - According to a second option, the parts may be fixed to each other in that one of the parts includes liquefiable material (especially thermoplastic material) and the other one includes structures capable of being interpenetrated by the liquefiable material, whereby after re-solidification a positive-fit connection between the parts is achieved.
  - In addition or as yet another alternative, the parts may be fixed to each other by an adhesive connection between re-solidified material and other material it adheres to.
- The steps of adjusting and of fixing may be combined in a single-step procedure. For example, they may be carried out by a vibrating sonotrode pressing the parts against each other and, after material has become flowable, moving the parts relative to each other until a desired z-position has been reached, whereupon the movement and the energy input are stopped (depending on the configuration, the energy input may be stopped already some time before the desired position has been reached). After re-solidification, the re-solidified flowable material fixes the relative position. Optionally, during re-solidification, a holding force may be maintained.
- As an alternative, the step of adjusting may be carried out prior to the step of fixing. Then, for embodiments that include fixing by input of mechanical vibration energy, the anchoring part and the adjustment part may be equipped for their relative z-position being provisionally locked so that the joint action of mechanical vibration and a pressing force does not alter the relative z-positions. For example, the anchoring part and the adjustment part may have threaded portions cooperating so that the adjustment part can be screwed on the anchoring part. Other configurations for such provisional locking are possible. As an alternative to such provisional locking, the mechanical vibration may be coupled into the parts from a direction not parallel to the z-axis but for example essentially perpendicular thereto.

For example, initially measurement data concerning particulars of the second object (or an assembly that includes the second object) and/or particulars of any other part (first object, other object to be secured to the first object) may be obtained. Based on this, the desired z-adjustment may be calculated in advance.

The alternative of adjusting prior to fixing may be used for separating the steps in a manufacturing process. A manufacturing line then includes an adjustment station and a fixing (securing) station. Especially, if the second object is comparably large or belongs to a comparably large pre-assembly (for example a vehicle body), this may be advantageous because then the z-adjustment step may be carried out at a much smaller station and does not delay the main process.

The adjustment part may be a connector piece or a body of the above-described kind.

Alternatively, the anchoring part may include a connector piece or a body of the above-described kind, and the adjustment part may optionally be a further item that is equipped to be fixed relative to the connector piece/body in an adjustable position.

According to a further alternative, the adjustment part and the anchoring part both include thermoplastic material, and the adjustment part and the anchoring part are weldable to each other.

As yet another alternative, the anchoring part and the adjustment part are one-piece, but with a collapse zone or stretching zone between them, this zone being activatable by the energy input.

If the anchoring part and the adjustment part are not one-piece, the method may include positioning the adjustment part relative to the anchoring part prior to the step of adjusting.

The step of adjusting may be carried out after the step of securing the first object to the second object and/or may be carried out simultaneously These possibilities can be arbitrarily combined unless stated otherwise.

In embodiments that include fixing and/or adjusting by mechanical vibration energy input, the fixing and-or adjusting may according to a first option be carried out together with securing the first object to the second object. Alternatively, fixing and/or adjusting the parts with respect to each other may be carried out after securing. As an even further alternative, as mentioned hereinbefore and as discussed in some more detail hereinafter, fixing and/or adjusting the parts with respect to each other may be carried out prior to securing.

In either case optionally both, the step of coupling mechanical vibration energy into the assembly to embed the edge of the second object for securing, and the step of coupling mechanical vibration energy into the assembly for fixing and/or adjusting may include pressing a vibrating sonotrode against the assembly along a direction that is not perpendicular to the z-axis but for example along a direction parallel to the z axis or at a certain angle thereto.

In a first sub-group implementing this option, the pressing forces applied for securing and for fixing/adjusting have same directions. In a second sub-group, they have opposed directions.

In either case, in the step of coupling energy into the assembly and pressing a vibrating sonotrode against a coupling face for securing the first object to the second object, a portion of the second object may define a stop face for a movement of the first object relative to the second object during securing. After the first object has gotten in contact with the stop face, the mechanical resistance against a further movement raises drastically. Thereby, the relative positions of the first object and the second object are defined, and when subsequently a pressing force and mechanical vibration are coupled into the assembly for fixing and/or adjusting, the relative position of the first object and the second object will remain defined.

Such a stop face may for example be defined by a flat part of the second object around the attachment location/attachment locations.

The above-described approach of adjusting and fixing in the adjusted position may be implemented in embodiments of the herein described aspect of the invention. It may however, also be implemented independent thereof.

The invention also concerns a device that includes an anchoring part and an adjustment part according as described referring to any embodiment of a method mentioned in the present text.

In a group of embodiments, with or without a step of adjusting a z-position, the second object includes an extension opening (that is different from a perforation along which the edge that is caused to be embedded in the thermoplastic material extends). The first object (and/or a connector piece secured thereto) then may extend through the mouth of the opening. Thereby, there is more space and especially more depth available for functional parts of the first object and/or the connector piece, respectively.

The second object does not need to project towards the side of the first object along the extension opening and does not need to have any other shape that is specifically adapted for a fixing/securing step. Also, because of the space available due to the extension opening, the dimensions of the functional parts/connector piece may be chosen In embodiments of this group, the first object has an extending portion extending through the mouth of the extension opening.

A connector piece may be equipped to also extend through the mouth of the opening and to be secured relative to such extending portion. Especially, the connector piece may be capable of being secured in different depths, whereby it is an adjustment part with an adjustable z position in the above sense. Also, it is not necessary that a movement by which the connector piece is inserted into the extending portion is collinear with the movement during securing, so that adjusting the z position includes adjusting a z'-position with the z' axis being at an angle to the z axis. All in all, the parameters applicable for fixing the connector piece relative to the first object become independent of the securing process due to the extension opening.

In some embodiments that include an extension opening and a connector piece, the connector piece is equipped for a further object to be secured thereto. To this end, a joining element may be provided to secure the further object, especially if the further object has a relatively large extension in two in-plane dimensions. For example, in such embodiments, the further object may be clamped between head portions of the connector piece and the joining element.

A joining element of this kind may for example be capable of being clipped or screwed onto the connector piece or secured by a bayonet coupling like connection, or of being secured thereto by a material connection (adhesive connection, soldered connection, weld, etc.)

Also, in embodiments of this group, a size of the extension opening is larger than at least one in-plane dimension of the extending portion, whereby an x-y-position of the functional parts and/or connector relative to the second object becomes possible.

In embodiments, an extending portion includes a tube portion extending into the opening, whereby a connector piece can be placed at least partially in the tube portion.

Embodiments of the second object that include the extension opening may include a plurality of perforations of the above-discussed kind, especially perforations around which the second object has a section projecting towards the side of the first object (proximal side if the vibration is coupled into the first object, distal side if the vibration is coupled into the second object). Such perforations may especially be distributed around a periphery of the extension opening.

In such embodiments or other embodiments with a plurality of the perforations, the first object may especially be of the type including an attachment zone (for example an attachment zone per perforation) and a functional zone. Especially, the first object may be of a dimensionally stable material, for example a metal, a composite, ceramic, etc., with the exception of the attachment zone(s) that include the thermoplastic material.

Embodiments that include an extension opening are especially suited for set-ups in which the second object, the first object and/or, if applicable, the further object is not planar in the sense of extending straight into two dimensions but has a complex 3D shape. This is because the extension opening provides an additional degree of freedom for a connection—especially using the connector piece—that may extend into spaces and into directions that are not restricted by the geometry of the locations where the fastening takes place, for example around perforations of the kind described in this text.

In alternative embodiments, if the dimensions allow so, the first object may have an extending portion that extends into the perforation of the second object and through the sheet plane (if defined). Then, a separate extension opening may not be necessary. Also in these embodiments, the extending portion of the first object may have an attachment structure for securing a further object. Such attachment structure may include a thread, a bayonet fitting-like structures, a glue channel, a region of ductile material for a self-tapping screw to engage, etc.

Embodiments of the present methods and applications of the devices described in this text include a combination of the securing approach describe herein with the use of an adhesive.

Especially, if two objects are fastened to each other by an adhesive, often the waiting time until the adhesive connection is sufficiently strong and the lack of stability of the connection therebefore is an issue. This issue is even more severe if the adhesive connection and hence the thickness of an applied adhesive portion have to be comparably thick for example so that the connection exhibits a residual flexibility necessary for compensating different thermal expansion behaviours if necessary. Similarly, thick layers of adhesive are in many situations necessary if the adhesive has the additional function of sealing. Often one- or two-component Polyurethane adhesives are used for such purposes.

In accordance with a first option, therefore, a combination of the securing approach according to the invention with applying an adhesive may include positioning the objects to be connected, applying an adhesive (prior or after the positioning) and securing the objects to each other by the securing method described in this text.

In accordance with a second option, a portion of an adhesive is used as a sealant in addition to the mechanical connection caused by the securing approach described in this text.

According to an other aspect, a method of providing an anchor in a desired x-y-z position relative to a second object is provided, the method including the steps of:
Providing a first object including a thermoplastic material in a solid state;
Providing the second object including an attachment location, the attachment location including an edge of a not liquefiable material;
Positioning the first object relative to the second object to provide an assembly including the first and second object, in which assembly the attachment location is in contact with the thermoplastic material;
While the attachment location is in contact with the thermoplastic material, coupling mechanical vibration energy into the assembly until a flow portion of the thermoplastic material becomes flowable and least partially embeds the edge in the thermoplastic material;
Stopping the mechanical vibration and causing the thermoplastic material to re-solidify, whereby the re-solidified thermoplastic material at least partially embedding the edge anchors the first object in the second object,
providing an anchor piece equipped for anchoring a further object with respect to the second object,
Adjusting a position of the anchor piece with respect to a body of the first object; and
Fixing the anchor piece with respect to the body of the first object while it is in the adjusted position.

In this, the anchor piece may be an adjustment part of the above-described kind. The body of the first object (first object body) may be the first object, or a part thereof that is fixedly secured to the second object.

The above-discussed options for securing a first object to a second object as well as for adjusting a position of an adjustment part apply also for this aspect.

Especially, the step of fixing and/or the step of adjusting may include impinging an assembly of the anchor piece and the body of the first object with mechanical vibration to cause thermoplastic material of at the first object body or the anchor piece or both to become flowable and to fix, after re-solidification the anchor piece and the first object body to each other.

The invention also concerns a use of a method as described and claimed in this text for attaching a first and a second object to each other, wherein the second object has a at least one attachment location, especially a plurality of attachment locations, constituted by a (for example deformed) portion defining the edge and projecting towards the first object, wherein a first tolerance for the positioning of the attachment location on the second object is greater than a second tolerance corresponding to a tolerance for the final positioning of the first object with respect to the second object.

The invention even further concerns a method of mass producing a plurality of assemblies, each assembly including a first object secured to a second object, wherein the second object includes at least one attachment location, wherein a standard deviation of the position of the attachment location between the different assemblies is greater than a standard deviation of the position of the objects with respect to each other (and/or the position of one of the objects with respect to a third object to which the other object is secured) between the different assemblies (the standard deviation with respect to a respective average value).

A further group of embodiments concerns the reversible fastening of a further object to the second object by means of the first object. "Reversible fastening" in this context means that the further object can be fastened to the second object and removed therefrom a plurality of times without any irreversible operation (such as breaking, melting, etc.).

More in particular, a further object is provided including at least one connector portion for removably connecting a first object to it, for example by a clip-on connection. The method according to this embodiment includes securing the first object to the second object by the method described in this text.

In a special sub-group of this group, where the approach of the invention has particular advantages, concerns the situation where the further object has a plurality of connector portions for being fastened to the second object at a plurality of locations. In accordance with the prior art, a plurality of fixing connectors for a releasable clip connection had to be attached to the object with the flat surface (the second object in the terminology of the present text), at places corresponding to the positions of the corresponding connector portion of the removable other object. The challenge in this is that for the clip connection to properly work the positioning of the fixing connector portions has to be very precise. This requirement is in practice rather hard to be met in cost-efficient manufacturing.

In the embodiments of the here-discussed sub-group, this problem is solved by providing for every fastening location a first object. The first object or, if applicable, a connector piece of the hereinbefore discussed kind, is secured, by the reversible connection, to the corresponding connector portion of the further object. A corresponding number of perforations of the second object at positions that approximately correspond to the positions of the first object are provided. The process described in this text is then carried out for every one of the first object while the first object or connector piece is fastened to the respective connector portion. If the material of the involved objects is flexible enough, this may be done one by one for each first object. Alternatively, all or some of the first objects may be secured to the second object simultaneously.

The relative positioning of the first object and of the perforations of the second object in this need not be very precise and can, without adversely affecting the securing, vary within tolerances that are given by the dimensions of the first object relative to the dimensions of the perforations. Thus, the tolerances for the positioning of the fastening locations (the perforations and deformed sections) with respect to the positions of the connector portions of the further object are much more relaxed than for prior art methods. Nevertheless, the positions of the releasable clip-on connection are fixed precisely due to the fact that the first objects (or the connector pieces) are attached to the further object during the securing process.

In another group of embodiments, the first object serves as connector for securing a third object to the second object, especially in situations where the third object like the second object has a flat portion and where the assembly of the second and third objects is accessible only from one side. For example, the second and third objects may be metal objects, or fiber composite objects, or one of them may be a fiber composite object and the other one a metal object. Especially, the second and third objects may be of different materials having substantially different coefficients of thermal expansion $\alpha$.

According to the prior art, such connections were primarily achieved by blind rivets or by gluing. Blind rivets are technically rather complex. Further, both, blind rivets and glue connections feature the substantial disadvantage that they have a very limited suitability to compensate for shear loads that arise if the objects connected react differently to temperature changes due to different coefficients of thermal expansion. For example, the coefficient of thermal expansion of Aluminium is $\alpha_{Al}=2*10^{-5}$ K, whereas the coefficient of thermal expansion of a typical CFK (carbon fiber reinforced composite) may even have the opposite sign: $\alpha_{CFK}=5*10^{-6}$ K. For example, in industrial manufacturing processes sub-assemblies after the assembly process often undergo a cathodic electrodeposition (or other immersion bath) process, which will take place at an elevated temperature of for example about 180° C. For this reason, in industrial manufacturing, objects that after being assembled with each other are subject to an electrodeposition process will in addition to be bonded by an adhesive connection also be secured to each other by a (blind) rivet. When subject to temperature changes, for example during the electrodeposition process (if applicable) or during use in varying environmental conditions, this will lead to deformation around the rivet connection, and hence to permanent internal stress and/or bearing stress, depending on the set-up also to delamination, etc.

The approach according to the present invention provides a solution to this problem.

To this end, the second object is arranged distally of the third object, and the third object is provided with a through opening, especially a through opening having a larger diameter than the perforation of the second object along which the edge is formed. The step of positioning the first object relative to the second object includes causing a distal portion of the first object to reach through the third object through opening until the edge is in contact with the thermoplastic material. After the step of coupling the vibration energy into the assembly, the thermoplastic material by having flown around the edge will have portions distally of the second object, which portions after re-solidification may be viewed as forming a foot portion of the first object, which first object by this becomes a blind rivet.

In addition, in embodiments in which both, the second and third objects have a defined attachment location, the requirements in terms of positional accuracy are low. The fact that the flow portion flows during the process ensures that any eccentricities etc. are compensated for by flown thermoplastic material.

Generally, the diameter of the distal portion (or shaft portion) of the first object will be approximately equal to or smaller than the diameter of the third object opening but will be larger than the diameter of the perforation so that when being pressed towards a distal direction relative to the second object, the first object encounters a resistance by the second object. When the first object is subject to the mechanical vibration, this will lead to the liquefaction at the interface between the second and first objects.

In embodiments of this group, the first object is provided having a head portion (or possibly a head portion is formed during the process). The step of coupling the mechanical vibration energy into the assembly, which step then includes pressing the first object towards a distal direction relative to the second object (and also the third) object may then be carried out until a distally facing shoulder formed by the head portion rests against the proximally facing surface of the third object around the mouth of the opening.

In a sub-group of embodiments of this group, the thermoplastic material of the first object is chosen to have a glass transition temperature that is smaller than a temperature of the temperature reached during a subsequent electrodeposition process, which electrodeposition temperature is for example 180° C. or 185° but to have a melting temperature substantially higher than this electrodeposition temperature. Due to this, when the assembly is heated to the electrodeposition temperature, the thermoplastic material is in a rubber-like, flexible state that allows significant deformation (creep), and the material has a very high ductility to deform without failing, so that different coefficients of thermal expansion may be compensated for by controlled temporal deformation of the thermoplastic material. If in embodiments the glass transition temperature is above room temperature, the thermoplastic material and as a consequence the connection will automatically stiffen out again when the assembly is cooled back to the temperature at which it is used. In embodiments, if the capability of compensating for thermal distortions is important, the thermoplastic material of the first object may at least at the attachment location, be chosen to be a thermoplastic elastomer.

In embodiments of this group, the first object may especially have a body of a not liquefiable material. Especially, such a body may form a core of the shaft portion. Optionally, if applicable, the body may also form the head portion. If the body forms the core of the shaft portion, the body shaft portion may optionally have an axial extension sufficient for it to reach through the perforation. Then, the diameter of the body shaft portion may be approximately equal to the diameter of the perforation, or it may be smaller than this or it may be larger than this and will then cause a further deformation of the second object around the perforation when the first object is pressed against the second object.

In this text, the word "diameter" does not necessarily imply that the according structure (perforation, opening, shaft cross section, etc.) needs to be circular, although often circular shapes may be an option, especially because they are easy to manufacture. In case the according structure is not circular, "diameter" denotes the average diameter, unless specified otherwise.

In embodiments, especially (but not only) of this group, if the first object has a body of a not liquefiable material, the body may be equipped to perforate the second object to cause the perforation. For example, a distal piercing tip or punching edge may be initially brought into contact with the second object, and a punching force is applied, optionally also mechanical vibration energy or other energy may be coupled into the first object. Thereafter, or already during this perforation step, the thermoplastic material comes into contact with the edge generated by the perforation step and by the (simultaneous or subsequent) energy input starts becoming flowable.

In embodiments of this group, the sheet portion around the perforation is deformed to project towards the distal side, i.e. to project away from the side from which the first object is brought into contact with it and away from the third object. However, it would be possible to provide the second object in a shape essentially flat around the perforation or even projecting towards the proximal side, into the third object opening.

An even further group of embodiments also concerns securing a further, third object to the second object by the first object. In accordance with this even further group, the third object like the second object has a generally flat sheet portion, with the sheet portion having an edge. As an option, the third object sheet portion may have a third object perforation, with the edge running along the perforation.

For example, in embodiments of this even further group both, the second and third objects may include metal sheets (or consist of metal sheets), of a same or of different material, the metal sheets forming the respective edges.

For the embodiments of this further group, the step of coupling mechanical vibration energy into the assembly includes coupling mechanical vibration energy into the assembly including the first, second and third objects until a flow portion of the thermoplastic material due to friction heat generated between the edge and the thermoplastic material becomes flowable and flows around the edge to at least partially embed the edge in the thermoplastic material and flows around the third object edge to embed the third object edge in the thermoplastic material, whereby after the step of stopping the mechanical vibration the re-solidified thermoplastic material embeds both, the (second object) edge and the third object edge to secure both, the second and third objects relative to the first object, whereby the second and third objects are secure to each other.

In this, the flow portion does not necessarily have to be contiguous. Rather, the flow portion may optionally have sub-portions that become flowable in contact with the second object edge and the third object edge, respectively, with non-flowable portions of the first object between them.

In embodiments of this further group, both, the second object edge and the third object edge form a contour that is different from a simple straight edge but that includes at least one bend or corner. This is for example the case if the respective edge runs along a perforation. For example, both, the second and third objects each may have a perforation, with the respective edge along the perforation, and with the option of the perforations being, after the step of positioning, arranged approximately concentrically. With corresponding geometries, by this also connections that are secured against relative rotation or connections at corners may be realized.

As an alternative to running along a perforation, the edges (or at least one of the second and third object edges) may run along a peripheral part of the respective object, with this peripheral part forming an according bent structure or structure having a corner, such as a wave-like structure etc.

Due to being bent or having a corner, the shape of the edge gives the connection additional stability, especially with respect to shear along the sheet plane.

In a first sub-group of embodiments of this further group, the second and third objects in the step of positioning are brought into contact with the first object from opposite sides, i.e., the first object is sandwiched between the second and third objects. For example, the second object may be arranged so that the edge comes into contact with a generally distally facing surface of the first object, and the third object edge comes into contact with a generally proximally facing surface of the first object. The second and third objects are thus anchored from opposed sides of the first object.

In this first sub-group, the mechanical vibration may be coupled into the assembly via the third object or the second object, with the other one of these objects and/or the first object resting against a non-vibrating support. Alternatively, the mechanical vibration energy may be coupled into both, the third object and the second object. In addition or as yet another alternative, the vibration may be coupled directly into the first object, with the second and third objects being pressed against the first object from opposite sides.

In a second sub-group of embodiments, the second and third objects are brought into contact with the first object from a same side. In this the edges of the second and third objects may be adjacent to each other and in embodiments run approximately parallel. For example, if the edges run along respective perforations, the perforations of the second and third objects may have different diameters and be arranged approximately concentrically.

In embodiments of this second sub-group, the mechanical vibration may be coupled into the assembly by being coupled into the first object. It is also possible to couple the vibration directly into the second and/or third object. In the latter case, an intermediate element, for example of a polymer, may be put between the sonotrode and the respective object, for example of silicone, PTFE, etc.

In embodiments, optionally but not necessarily of this group, in which the vibration energy is coupled into the assembly via the second object (and/or, if applicable, via the third object), the first object and the vibrating tool (sonotrode), by which the vibration is coupled into the assembly, may be adapted to each other so that in addition to a contact face between the tool and the second/third object, there is a contact face between the tool and the first object, wherein in the step of coupling the vibration energy into the assembly, thermoplastic material of the first object is caused to become flowable at the interface to the tool and is caused to flow relative to the tool.

For example, the first object may include at least one protrusion protruding from the respective face against which the edge of the second/third object is pressed. The protrusion may especially protrude from the plane defined by the edge beyond a sheet plane if the deformed section along the edge is deformed to project towards the first object. This protrusion is by the effect of the vibration energy at least partly made flowable and caused to flow, especially to fill gaps and to provide another contribution to the securing.

In addition or as an alternative to the first object including a protrusion, the sonotrode may include a protrusion so that the named contact face arises.

The present invention also concerns an arrangement for carrying out the invention. The arrangement includes the first object having a thermoplastic material in a solid state, the second object with a generally flat sheet portion, with the sheet portion having an edge, the first object and second objects being capable of positioned relative to one another to provide an assembly including the first and second object, in which assembly the edge is in contact with the thermoplastic material, the arrangement further optionally including a sonotrode capable of coupling mechanical vibration energy into the assembly, and/or further optionally including a connector piece of the kind described in this text. In addition or as an alternative, the arrangement may include a membrane interface between the sonotrode and the respective object, for example as intermediate piece of the kind mentioned hereinbefore.

More in general, parts of the arrangement may have the properties described referring to the different embodiments of the method taught in this text. For example, the sheet portion may have a perforation along which the edge runs.

The invention even further concerns a reinforcer portion or connector piece having the properties described in this text.

Moreover, the invention includes an object as described as further object referring to the special sub-group mentioned hereinbefore, namely an object including a plurality of connector portions, and for each connector portion a first object including a thermoplastic material, the first objects shaped to be releasably/reversibly fastened to the respective connector portion.

Generally, the first and second and, if applicable, third objects are construction components (construction elements) in a broad sense of the word, i.e. elements that are used in any field of mechanical engineering and construction, for example automotive engineering, aircraft construction, shipbuilding, building construction, machine construction, toy construction etc. Generally, the first and second objects as well as a connector piece (if applicable) will all be artificial, man-made objects. The use of natural material such as wood-based material in the first and/or second object is thereby not excluded.

The second object may be any object that has a flattish sheet portion. "Sheet portion" in this does not imply a necessarily homogeneous thickness. The second object may especially be a metal sheet. Alternatively, the second object may be another object having a sheet portion, for example a more complex object having a part of a metal sheet, which part constitutes the sheet portion, or an object in which a sheet portion is constituted not by a metal sheet in the narrow sense of the word (manufactured by rolling) but by a for example metallic part manufactured in a cast process, such as a die cast object.

Turning back to the thermoplastic material of the first object, in this text the expression "thermoplastic material being capable of being made flowable e.g. by mechanical vibration" or in short "liquefiable thermoplastic material" or "liquefiable material" or "thermoplastic" is used for describing a material including at least one thermoplastic component, which material becomes liquid (flowable) when heated, in particular when heated through friction i.e. when arranged at one of a pair of surfaces (contact faces) being in contact with each other and vibrationally moved relative to each other, wherein the frequency of the vibration has the properties discussed hereinbefore. In some situations, for example if the first object itself has to carry substantial loads, it may be advantageous if the material has an elasticity coefficient of more than 0.5 GPa. In other embodiments, the elasticity coefficient may be below this value, as the vibration conducting properties of the first object thermoplastic material do not play a role in the process. In special embodiments, the thermoplastic material therefore may even include a thermoplastic elastomer.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably includes a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally include a polymeric component that is not cross-linked covalently or cross-linked in a manner that the cross-linking bonds open reversibly upon heating to or above a melting temperature range. The polymer material may further include a filler, e.g. fibres or particles of material which has no thermoplastic properties or has thermoplastic properties including a melting temperature range which is considerably higher than the melting temperature range of the basic polymer.

In this text, generally a "non-liquefiable" or "not liquefiable" material is a material that does not liquefy at temperatures reached during the process, thus especially at temperatures at which the thermoplastic material is liquefied. This does not exclude the possibility that the material would be capable of liquefying at temperatures that are not reached during the process, generally far (for example by at least 80° C.) above a liquefaction temperature (melting temperature for crystalline polymers for amorphous thermoplastics a temperature above the glass transition temperature at which the becomes sufficiently flowable, sometimes referred to as the 'flow temperature' (sometimes defined as the lowest temperature at which extrusion is possible), for example the temperature at which the viscosity drops to below $10^4$ Pa*s (in embodiments, especially with polymers substantially without fiber reinforcement, to below $10^3$ Pa*s)), of the thermoplastic material. For example, the non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C. or 100° C.

In this text, "melting temperature" is sometimes used to refer to the named liquefaction temperature at which the thermoplastic material becomes sufficiently flowable, i.e. the conventionally defined melting temperature for crystalline polymers and the temperature above the glass transition temperature at which the thermoplastic material becomes flowable sufficiently for extrusion.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface.

In many embodiments, especially embodiments that include coupling the vibration into the first object, the vibrating tool (e.g. sonotrode) is e.g. designed such that its contact face oscillates predominantly in the direction of the tool axis (the proximodistal axis, corresponding to the axis along which the first object and second objects are moved relative to one another by the effect of the energy input and pressing force when the edge is caused to penetrate into material of the first object; longitudinal vibration) and with an amplitude of between 1 and 100 μm, preferably around 30 to 60 μm. Such preferred vibration is e.g. produced by ultrasonic devices as e.g. known from ultrasonic welding.

In other embodiments, the vibration is transverse vibration, i.e. oscillation predominantly at an angle, for example perpendicular, to the proximodistal axis and hence for example parallel to a contact face between the first and second objects. Vibration energy and amplitude in this may be similar to the above-mentioned parameters of longitudinal vibration.

In a further group of embodiments, which may be viewed as a sub-group of embodiments with transverse vibration, the oscillation may be rotational oscillation, i.e. the vibrating item vibrates in a back and forth twisting movement. For rotational oscillation to be an option, the second object should not have a rotation preventing geometry in that for example the edge extends circularly around a perforation. Also, this kind of oscillation is especially suited for set-ups in which the first object is comparably small, especially if it is a connector or belongs to a connector.

Depending on the application, a vibration power (more specifically: the electrical power by which an ultrasonic transducer is powered) may be at least 100 W, at least 200 W, at least 300 W, at least 500 W, at least 1000 W or at least 2000 W.

In this text, the terms "proximal" and "distal" are used to refer to directions and locations, namely "proximal" is the side from which an operator or machine applies the mechanical vibration, whereas distal is the opposite side.

The side of the first object that is brought into contact with the second object in this text is sometimes called "contact side". In embodiments, in which the first object is positioned proximally of the second object and the vibration is applied to the first object that is pressed against the second object, the contact side is the distal side and includes the distally facing face into which the edge of the second object is pressed.

BRIEF DESCRIPTION OF THE DRAWINGS

In the following, ways to carry out the invention and embodiments are described referring to drawings. The drawings are all schematical. In the drawings, same reference numerals refer to same or analogous elements. The drawings show:

FIGS. 1a and 1b an embodiment of a second object with a securing location;

FIGS. 2a and 2b an alternative embodiment of a second object;

FIGS. 3a-5b in cross section, different configurations in an initial stage of the method and after the method has been carried out;

FIGS. 18*a* and 18*b* a configuration in which a third object is secured to the second object by the first object in an initial and a final stage, respectively;

FIGS. 19-22 different first objects for a configuration substantially as shown in FIGS. 18*a* and 18*b*;

FIGS. 50*a* and 50*b* a configuration for guiding the first object during the process;

FIG. 51 attaching a holder by the approach according to the invention;

FIG. 52 a snap connector attached by the approach according to the invention;

FIGS. 57*a* and 57*b* an anchoring part and an adjustment part of an other embodiment;

FIGS. 58*a*-58*c* yet another embodiment of an anchoring part and an adjustment part and details thereof;

FIGS. 59-60 further configurations of a first object, and adjustment part, and a second object, wherein the first object serves as anchoring part;

FIGS. 119 and 120 a configuration with a first object having an attachment structure; and FIG. 121 a flowchart of a method that includes adjusting a position.

DETAILED DESCRIPTION OF THE INVENTION

Figure 5A:
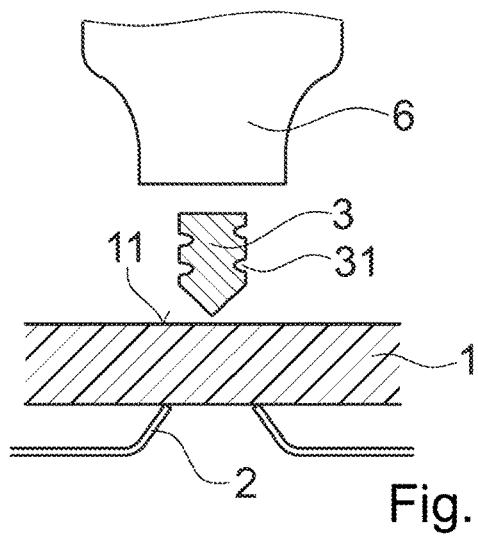

FIGS. 1*a* and 1*b* show, in a top view and in cross section, an example of a metal sheet 2 being a second object. The metal sheet includes a perforation 20, for example made by a punching tool. For example, the perforation may be made by slowly pressing a tool with a tip against the metal sheet while the same is placed against a support with an opening at the place where the tool acts, until the tip of the tool comes through. The shape of the perforation will be irregular, with a plurality of tongues. Alternatively, the shape could be regular if a corresponding geometry had been punched or cut (by a water jet or laser) before or been shaped in a prior sheet forming process. Around the perforation 20, the metal sheet forms an edge 21 that in the subsequent steps has the function of an energy director. The parameters height h, (average) diameter d of the perforation, diameter D of the d section that is deformed to project away from the metal sheet plane and—in some situations better defined than the diameter d of the perforation—the angle $\alpha$, here defined as the angle between the deformed section and the vertical to the metal sheet plane—are depicted in FIG. 1b; the according definition is used throughout this text.

As an alternative to being perforated irregularly, by means of a suitable punching device in combination with pre-cutting the central hole geometry (e.g. by laser) one can also manufacture an irregular or regular, for example circular perforation as shown in FIGS. 2a and 2b.

With reference to FIGS. 3a and 3b basic principles of many embodiments as well as a particular embodiment of the method according to the invention are described.

The first object 1 includes thermoplastic material. In the depicted embodiment, the first object is illustrated to have a panel shaped section that consists of the thermoplastic material and defines a proximally facing face 11—serving as the mentioned coupling face—and a distally facing face 12 that when the first object is positioned relative to the second object 2 is brought into contact with the projecting section around the perforation 20. However, more generally, the first object 1 may have other shapes, and may have an inhomogeneous material composition. A few examples are shown in embodiments described hereinafter.

More in general, the first object may be the part to be connected, or a portion thereof, or a connecting element (dowel, base of a clip, rivet, etc.).

If the first object is the part to be connected—that includes a portion of the thermoplastic material as many parts in mechanical engineering and construction do—itself, then the approach of the invention in addition to the general advantages of the invention (low cost assembly and parts, sound anchoring, sealingly tight connection possible) also features the advantages:
  that in contrast to the fastening of the by fasteners cooperating with well-defined fastening structures, the position with respect to the first object needs to be defined with generally much less precision, thus with substantially increased tolerances, and
  that fewer parts and fewer assembly steps are required.
If the first object is a separate connecting element, in addition to the general advantages the approach according to the invention brings about a substantial flexibility with respect to the choice of shape and properties of the connecting element as well as, for example together with the approach described referring to FIGS. 14a-14c hereinafter, also the advantage of the less tight tolerances than prior art methods.

For securing the first object to the second object, a vibrating sonotrode 6 presses the first object against the second object in a vicinity of the perforation 20. Mechanical vibration energy thereby coupled into the first object propagates via the first object 1 and is absorbed at the places where the first object is in contact with the edge 21 that thereby serves as an energy director. As a consequence, the thermoplastic material around the edge is heated and becomes flowable, allowing the projecting section of the sheet material to be pressed into the body of the first object. After re-solidification, this leads to an anchoring at least of the projecting section in the first object and thereby to a mechanical positive-fit connection between the first and second objects. The resulting arrangement is shown in FIG. 3b. This Figure schematically illustrates material portions 14 that have flown to underneath the second object and thereby cause the mentioned anchoring.

Figure 114:
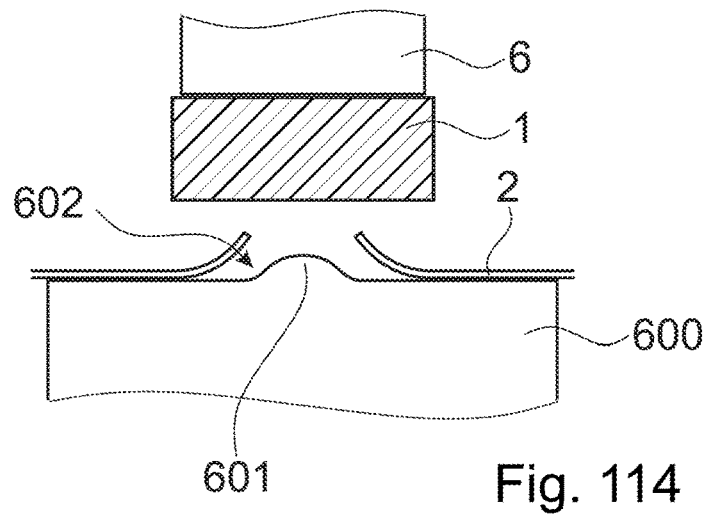
FIGS. 114 and 115 a first configuration with an anvil.
Figure 115:
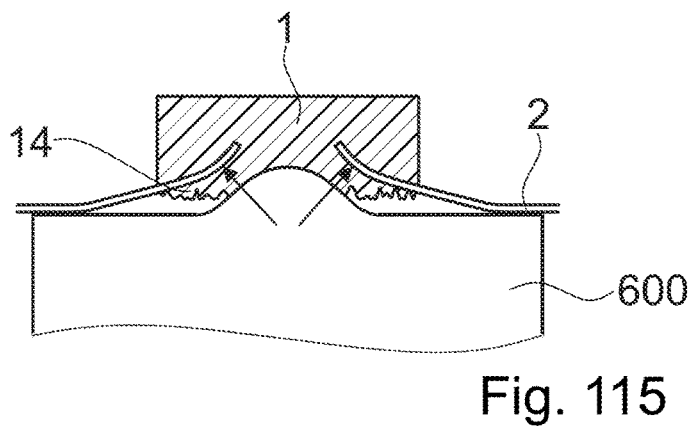

In a group of embodiments, the material flow underneath the second object is assisted and/or directed by an appropriately shaped anvil structure. The principle of this—that may be used in any embodiment of the invention that allows access of the securing location from the distal side, i.e. the side opposite to the side from which the sonotrode impinges, including embodiments described referring to other figures not in the present text, which other figures do not explicitly show such anvil structure—is schematically illustrated in FIG. 114. An anvil 600 is used to support the second object during the securing process. The anvil 600 is different from being just flat but includes a directing protrusion 601 and a receiving depression 602 around it. As shown in FIG. 115 by arrows, the directing protrusion 601 assists to consolidate the thermoplastic material distally of the second object and thereby enhances the overall stability and reduces the required penetration depth.

In the embodiment of FIGS. 4a and 4b, the first object 1 is not panel shaped but rather is stud-like. In addition to the portion 15 of the thermoplastic material it has a reinforcer portion 16 of a material that is not liquefiable under the conditions that apply during the process. Especially, the reinforcer portion may be metallic. In the depicted embodiment, the reinforcer portion 16 is a bushing, optionally with a thread or other structure that allows securing a further element to it. As can especially seen in FIG. 4b, such a reinforcer portion 16 in may in addition to an other function it may have (such as, as mentioned, be suitable for securing a further element to it) may also bring about additional mechanical stability to the connection between the first and second objects. For example, as in the depicted configuration, it may extend into the perforation and thereby stabilize the connection between the first and second objects with respect to possible shearing forces acting on it.

A further function of the reinforcer portion 16 is that it assists the control of the flow of the thermoplastic material by forcing the thermoplastic material to flow towards distally and sideways. Thereby the reinforcer portion 16 has a similar function as the anvil described referring to FIG. 114, with the difference that the location does not need to be accessible from distally.

In some embodiments like the one of FIG. 4a/4b it may be advantageous to ensure that the mechanical vibration is not coupled directly into the reinforcer portion to prevent any situation in which the thermoplastic material around the reinforcer portion is liquefied and the position of the reinforcer portion thereby is de-stabilized. To this end, the first object and the sonotrode may be shaped so that the coupling face is restricted to areas around the reinforcer portion, as described hereinafter for example referring to FIGS. 87-91.

Figure 5B:
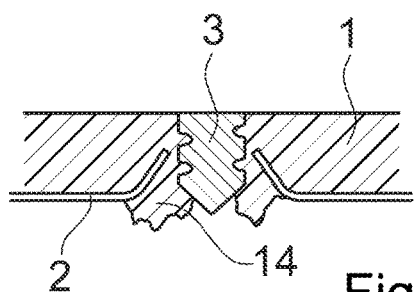

In a group of embodiments, the method includes the further step of providing a further connector piece 3 that is initially separate from the first and second objects and that in the method of securing is assembled together with the first and second objects to yield a monolithic assembly. FIG. 5a illustrates an example of such a connector piece 3. The connector piece in the depicted embodiment has a distal tip and retaining structures 31 along a lateral periphery. Prior to the step of coupling the mechanical vibration energy into the first object, the sonotrode 6 is used to couple energy and a pressing force into the connector piece thereby driving the connector piece into the first object 1, wherein material of the first object is locally liquefied by absorbed mechanical energy where the connector piece 3 is in contact with it. Once the proximal end face of the connector piece 3 is flush with the proximally facing face 11 of the first object 1, the process continues as described referring to FIGS. 3a and 3b. By suitable sonotrode designs (see for example FIGS. 11 and 12 described hereinafter), the depth by which the connector piece is driven into the assembly of the first and second object may be set. The retaining structures in the assembled state will be interpenetrated by liquefied and re-solidified thermoplastic material, whereby they bring additional mechanical stability. FIG. 5b depicts the assembly after the process.

A connector piece 3 may have a similar function as a reinforcer portion of the hereinbefore mentioned kind, and teachings in this text referring to properties of the reinforcer portion may be applicable also for connector pieces, and vice versa, the main difference being that the reinforcer portion is initially, prior to the coupling of energy into the arrangement, a part of the first object, in contrast to the connector piece.

Figure 6:
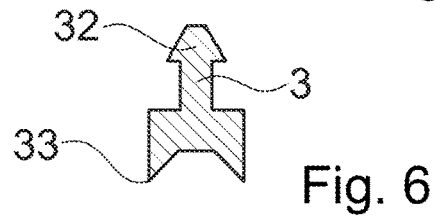
FIGS. 6-8 different embodiments of connector pieces.
Figure 7:
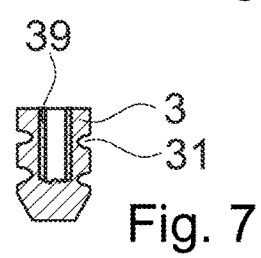
Figure 8:
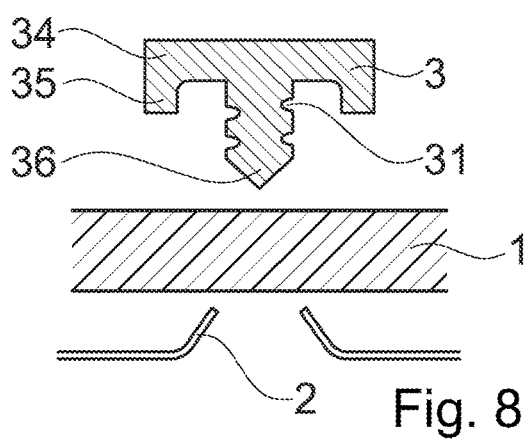

FIGS. 6, 7, and 8 yet show variants of connector pieces 3 (or of reinforcer portions). The connector piece 3 of FIG. 6 has an attachment peg 32 onto which a further element may be clipped. Optionally, after the securing process, it may have a similar function as the fastening clips described referring to FIGS. 14a-14c hereinafter, the difference being that the portion to which the further element is clipped is a portion of the connector piece 3 (or reinforcer portion) and not of the thermoplastic portion.

For the process with the connector piece 3 of FIG. 3, it may be advantageous to use a ring sonotrode (tubular sonotrode; see FIG. 13 hereinafter) so that the attachment peg 32 is not in direct contact with the sonotrode.

As a further difference to the embodiment of FIG. 5a, which difference is independent of the attachment peg, the distal end does not have a tip but a distally facing edge 33 that has a similar function as the tip but will have an influence on the material flow control by increasing the tendency of the thermoplastic material to flow into distal directions—depending on the assembly situation, this may be desired or not.

The connector piece 3 embodiment of FIG. 7 is a bushing with an inner thread 39 and outer retaining structures 31.

In the embodiment of FIG. 8, the connector piece in addition to a distal tip 36 and to retaining structures 31—and independently of these—has a head portion 34 with a proximally facing flange portion 35 that contributes to the flow control of thermoplastic material. Especially, it prevents thermoplastic material of the first objet 1 from flowing sideways at more proximal positions, thereby forcing it to flow where the second object 2 is arranged, thus contributing to a more pronounced mechanical securing.

Figure 9:
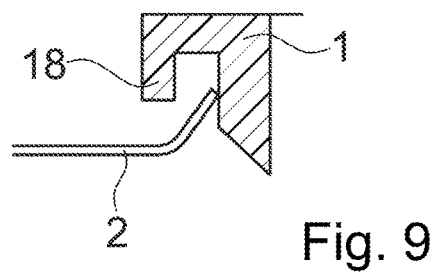
FIGS. 9 and 10 are further alternative configurations.

Referring to FIG. 9, a similar principle is shown but with a flange portion 18 constituted by thermoplastic material of the first object—also this will at least initially cause a flow control to prevent a sideways flow. Combinations, for example with a not thermoplastic flange portion attached to thermoplastic material of the first object, are possible.

Figure 10:
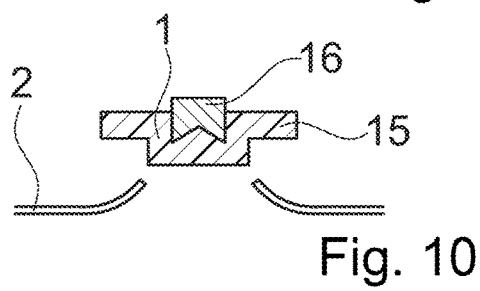

In the variant of FIG. 10, the first object 1 has a reinforcer portion 16, which, however, protrudes on the proximal side above the proximal end face of the thermoplastic portion 15, whereby the first object is designed for the reinforcer portion 16 to be moved relative to the thermoplastic portion 15 during the process, whereby thermoplastic material of the thermoplastic portion 15 is displaced.

Figure 16:
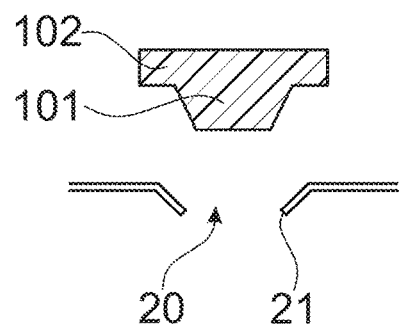

The embodiment of FIG. 10 may especially be advantageous if the reinforce itself is of a plastically deformable material. Then, the distal portions of the reinforcer portion 16, such as distal feet portions as shown in FIG. 16, are, by the pressure caused by the thermoplastic material distally of it, deformed outwardly and thereby contribute to the anchoring strength. In this, the reinforcer portion itself may be of a thermoplastic material that is such that the mechanical vibration and the pressing force are capable of being transmitted through the reinforcer portion at least in part while the reinforcer portion 16 is nevertheless deformable. For example, to this end the reinforcer portion may be of a thermoplastic material with a higher liquefaction temperature than the material of the thermoplastic portion 15, or of a material based on the same polymer but with a higher filling grade so that its viscosity is higher. Alternatively, it may be of a bendable metal in which case the portions that are to be deformed are accordingly sufficiently thin.

This process of deforming a reinforcer portion 106 may especially be assisted by an anvil (not shown in FIG. 10), for example with a central directing protrusion 601, as for example illustrated in FIG. 114.

Figure 11:
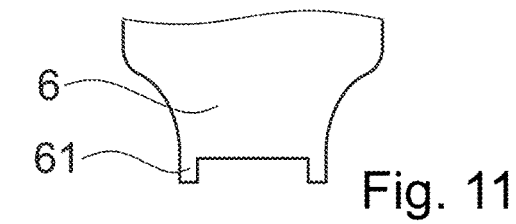
FIGS. 11-13 alternative sonotrode designs.
Figure 12:
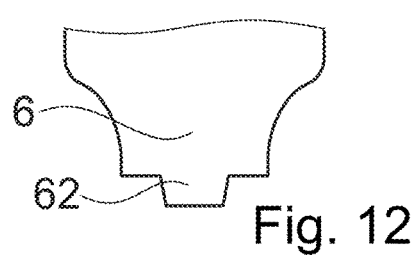
Figure 13:
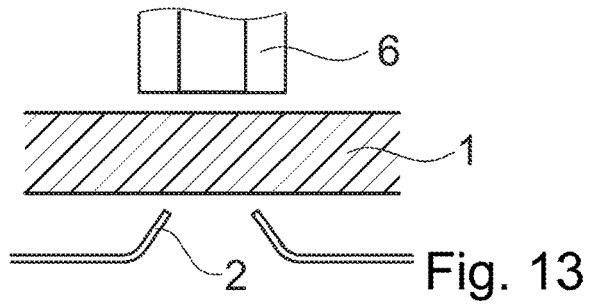

FIGS. 11, 12, and 13 show alternative sonotrode designs. The sonotrode 6 of FIG. 11 has a distal peripheral flange 61 that may depending on the set-up, either confine the lateral flow of thermoplastic material or press the reinforcer portion/connector piece to a into a different depth than the material around it or both. The distal protrusion 62 of the sonotrode 6 of FIG. 12 may have a guiding function, for example together with a guiding indentation of the first object or the connector piece, and/or may have the function of driving the connector piece or reinforcer portion further into the assembly of the first and second objects. The sonotrode 6 of FIG. 13 is a ring sonotrode. In most embodiments, the ring sonotrode will be designed such that the distal outcoupling end face of the sonotrode covers lateral positions of the projecting section of the second object 2.

Figure 14A:
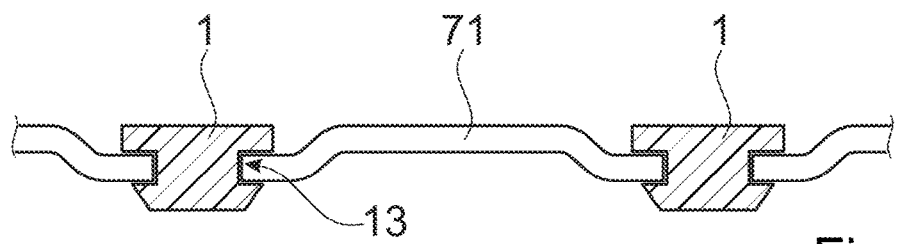
FIGS. 14a-14c an embodiment of the reversible fastening of a further object to the second object by means of the first object.
Figures 14B, 14C:
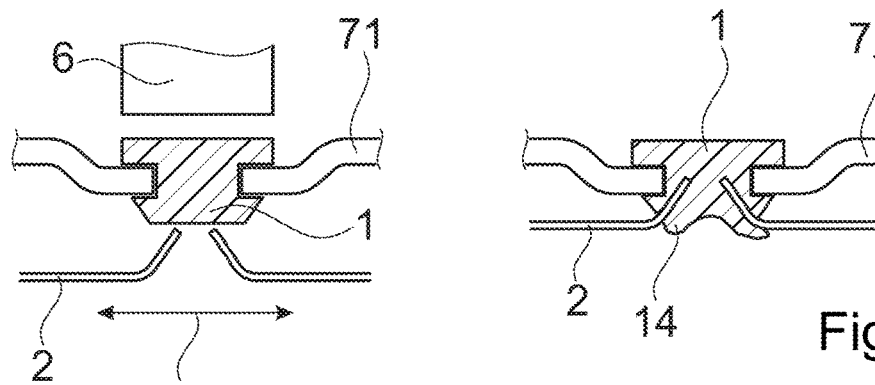

With respect to FIGS. 14a-14c a particular configuration suitable for embodiments of the invention is described. The configuration relates to reversibly fastening a further object to the second object at a plurality of fastening locations. FIG. 14a shows a flattish plate element 71 as an example of such a further object to be removably fastened to a surface of an object with a flat surface (the second object). An application of this configuration for example includes the fastening of number plates to a car body.

In accordance with embodiments of the invention, in contrast, the fixing connectors are provided as first objects 1 (or as connector pieces of the above-defined kind) in a method as described herein. To this end, the first objects 1 (as illustrated in FIG. 14a) or the connector pieces (for example as shown in FIG. 6) are provided with a clipping connection structure 13, illustrated to be a peripheral groove in FIG. 14a, which clipping connection structure cooperates with an according structure of the further element (the plate element 71 in FIG. 14a) to yield a releasable clip-on connection. For securing the fixing connectors to the second object 2, the first objects 1 are brought into contact with correspondingly positioned projecting sections of the second object 2 while they are fastened to the further element (the plate element 71 in the depicted embodiment). Thereafter, the process is carried out as described hereinbefore. As illustrated by the double arrow 73 in FIG. 14b, the relative positioning of the first object and of the protruding sections in this need not be very precise and can, without adversely affecting the securing, vary within tolerances that are given by the dimensions of the first object relative to the dimensions of the projecting sections. Thus, the tolerances for the positioning of the attachment points (the perforations and deformed sections) with respect to the positions of the attachments structures (connector portions) of the further element 71 are much more relaxed than for prior art methods. Nevertheless, the positions of the releasable clip-on connection are fixed precisely due to the fact that the first objects 1 (or the connector pieces) are attached to the further element during the securing process. FIG. 14c shows the resulting assembly with the further element (the plate element 71) being releasably clipped to the second object 2.

Figure 15:
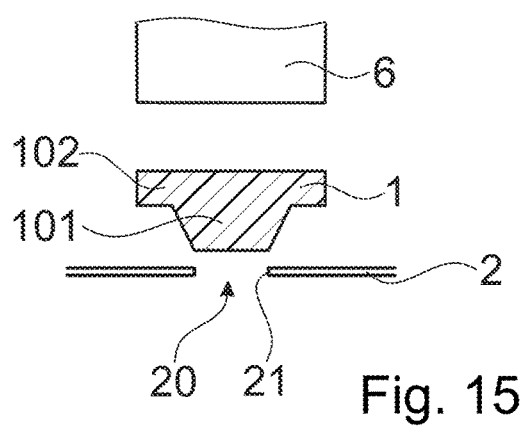
FIGS. 15-16 yet other configurations for carrying out the invention.

FIG. 15 yet shows an embodiment in which the second object does not have a section that projects into the proximal direction, i.e. towards the first object. Rather, the perforation 20 is punched out (or drilled or otherwise removed), with its rim being in the sheet plane. In contrast to the previously described embodiments, method then does not work for a simply plate-shaped first object. Rather, the shape and position of the first object needs to be adapted. More in concrete, in the depicted embodiment the first object 1 is an attachment bolt with a tapering section 101 and a head section 102, wherein the tapering section is dimensioned so that upon insertion into the perforation and movement to distal directions it encounters a substantial and rising difference by the second object. When the sonotrode 6 presses the first object into the perforation while energy is coupled into it, this will similarly to the above-described embodiments cause the liquefaction of thermoplastic material of the first object.

Simultaneously, the connector piece 3 (or alternatively a reinforcer portion) driven into the thermoplastic material will generate an outwardly directed pressure on the flowable material. As a result, the rim of the perforation becomes embedded in the thermoplastic material. The process may be carried out until the distally facing face of the head section 102 abuts against the sheet material of the second object. Due to the used effect of the connector piece 3 (or reinforcer portion) driven into thermoplastic material of the first object 1, the shape of the inserted section 101 does not necessarily need to be tapering.

Instead of having a tapering section, the first object may have other shapes, including stepped or cylindrical with a diameter slightly larger than the diameter of the perforation.

Embodiments that include driving a connector piece or reinforcer portion into the thermoplastic material to generate an outwardly directed pressure, the connector piece/reinforcer portion has an effect similar to the effect of a structured anvil as mentioned hereinbefore. However, such embodiments feature the advantage that they are applicable also in situations in which the fastening location is not accessible from the distal side.

In the variant of FIG. 16, the metal sheet that constitutes the second object around the perforation has a section that projects away from the first object. Especially, the second object may be formed as shown in FIGS. 1a and 1b, but upside-down, so that it has a plurality of tongues between which the thermoplastic material may flow. Also in this embodiment, the dimensions of the perforation/deformed section on the one hand and of a projecting portion of the first object are adapted to each other in a manner that there is substantial resistance against a forward (distal movement) of the first object with respect to the second object when the projecting portion of the first object is inserted in the perforation. Also this embodiment may be combined with a connector piece or a reinforcer portion of the kind discussed in this text hereinbefore.

Figure 17A:
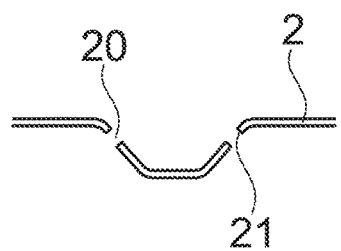
FIGS. 17a and 17b yet another second object with a securing location including a plurality of perforations.
Figure 17B:
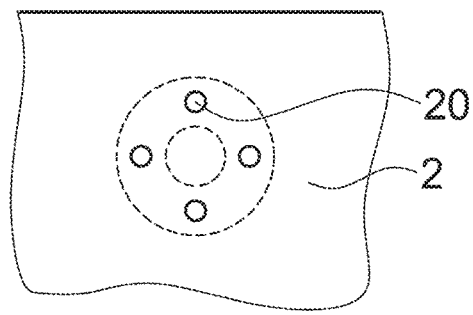

FIGS. 17a and 17b yet show an example of a second object in which a plurality of perforations 20 are arranged within a common deformed section projecting away from the proximal side. A single first object 1 of the kind illustrated in FIGS. 15 and 16 may be anchored in the dint formed by this deformed section, by the process as described hereinbefore.

Applications include fastening a plastic part to a metal part (wherein the second object is the metal part or a portion thereof) for example in the automotive industry or the aviation industry. For example, in the automotive industry, lightweight parts of plastic or composites often have to be attached to the car body.

Whereas all described embodiments rely on the coupling of the mechanical energy into the assembly generally from the side of the first object (from the top in the figures), embodiments in which the mechanical vibration energy is coupled into the second object are also possible. For example, in a configuration such as the one of FIG. 3a, the sonotrode 6 could act from the side that is shown as the lower side in the figure.

FIGS. 18a-24 show embodiments of the group that includes securing a third object to the second object by the first object, especially in situations with accessibility only from one side, i.e. the proximal side (depicted as the top side in the Figures). In all these embodiments, the third object 8 is illustrated as a flat CFK part. However, the embodiments of this group also work for third objects being for example metallic or of ceramic material or of a plastic (that is for example not liquefiable in the sense that it does not liquefy at the temperature reached during the process) or any other suitable material used in construction. Also, the second object is depicted as metal sheet. However, the method works also for other materials capable of forming an edge around a perforation. The method is especially advantageous for configurations in which the second and third objects have different coefficients of thermal expansion; however, this is not a requirement for the method to be useful.

The first object 1 in FIG. 18a serves as a connector for securing the third object 8 to the second object 2. The first object has a portion 15 of the thermoplastic material as well as a reinforcer portion 16 being a non-liquefiable core portion, for example of a metal. The core portion 16 forms a head portion 91 of the first object and runs in an interior of a shaft portion. In the depicted configuration, the core portion 91 is coated by the thermoplastic material portion 15 along the entire shaft, however, it would be possible to provide the thermoplastic material portion only as partial coating, for example leaving the distal end of the core portion free of any coating or leaving certain sections around the periphery free of any coating.

The third object has a third object opening 81 being a through opening. The second object 2 has a shape substantially similar to the shape shown in FIG. 16. The diameter (compare FIG. 1b) of the perforation is smaller than the diameter of the third object opening. More in particular, the cross section of the shaft portion 92 is such that it fits through the opening but does not fit through the perforation.

After the first object has been inserted through the opening and pressed against the distal direction, against the second object 2 by a sonotrode 6 by which at the same time mechanical vibration energy is coupled into the first object 1, thermoplastic material becomes flowable. The process is continued until the head portion 91 causes the advance movement (movement into the distal direction) of the first object to stop. Then, the vibration energy input is stopped and the sonotrode removed. FIG. 18b shows the result with the material portions 14 having flown to distally of the second object forming a blind rivet-like foot portion. Thus, in the configuration of FIG. 18b, first object after the process forms a rivet, with the second and third objects being clamped between this foot portion and the head portion 91. If the glass transition temperature of the thermoplastic material used is somewhere between room temperature and about 160° C., the rivet connection has the hereinbefore-discussed advantages in terms of compensating for different coefficients of thermal expansion in an electrodeposition process, for example of a painting/lacquer. As an example, acrylonitrile has a glass transition temperature of about 130° C.-140° C.

FIG. 19 shows a variant of a first object in which the core portion 16 has a distal punching edge 93. Such distal punching edge may in the process be used to punch out the perforation.

As a further variant, FIG. 20 shows a first object with the (metallic) core portion forming a distal piercing tip 94. Such piercing tip may be used to cause the perforation including the deformation around the mouth (as shown in FIG. 18a) by piercing the metal sheet that forms the second object.

In embodiments that include piercing, optionally a waisted portion 96 may be present so that after the piercing step the sheet portion does not clamp the core portion any more, and relative vibration becomes possible.

In both embodiments, the one of FIG. 19 and the one of FIG. 20, the process may be continued after the punching/piercing step substantially as described referring to FIGS. 18a and 18b.

FIG. 21 shows, as an even further variant, a first object suitable for the group of embodiments that includes securing a third object to the second object by the first object, which object does not have a core portion or other reinforcer portion but which consists of the thermoplastic material. Also in this embodiment, a head portion 91 may be present as an option, in addition to the shaft portion 92.

The embodiment of FIG. 22 shows further feature that may be realized in combination or on their own, or independently of each other.

The core portion 16 includes structures 95 suitable of making a positive-fit connection (here: with respect to relative movements in axial directions) or otherwise enhancing the connection between the core portion 16 and the thermoplastic material portion 15.

The core portion has a smaller axial extension (extension along the proximodistal axis) so that it does not necessarily reach through the perforation. More in general, there is no requirement of a particular extension/dimension of the core portion (if any), although in configurations in which substantial shear forces are to be expected between the second and third objects, it may be advantageous if such core portion reaches both, through the opening and the perforation.

Figure 23:
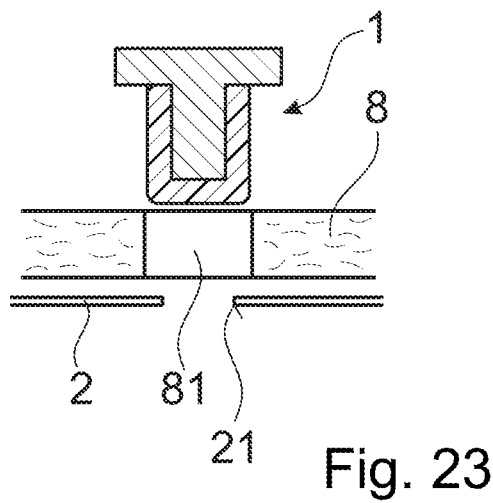
FIGS. 23 and 24 variants of this configuration.

In the variant of FIG. 23, the second object 2 around the perforation is not bent to project away from the third object (in contrast to what is shown in FIG. 18a) but is essentially flat.

While an anvil may be beneficial in many embodiments of the invention, including embodiments the description of which does not mention the anvil in an embodiment like the one of FIG. 23 an anvil with a corresponding surface structure, as described hereinbefore, may be especially beneficial to direct a material flow to distally of the portions of the second object along the edge 21.

Figure 24:
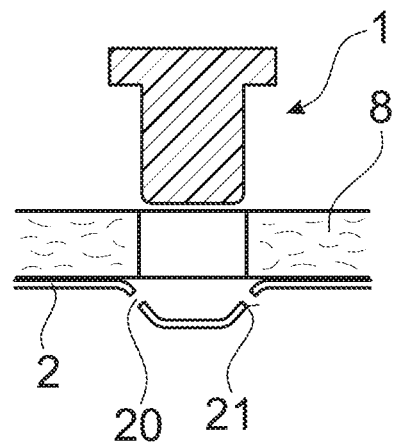

In the variant of FIG. 24, the second object has a shape substantially as described referring to FIGS. 17a and 17b, with a plurality of smaller protrusions instead of one bigger protrusion.

Figure 25A:
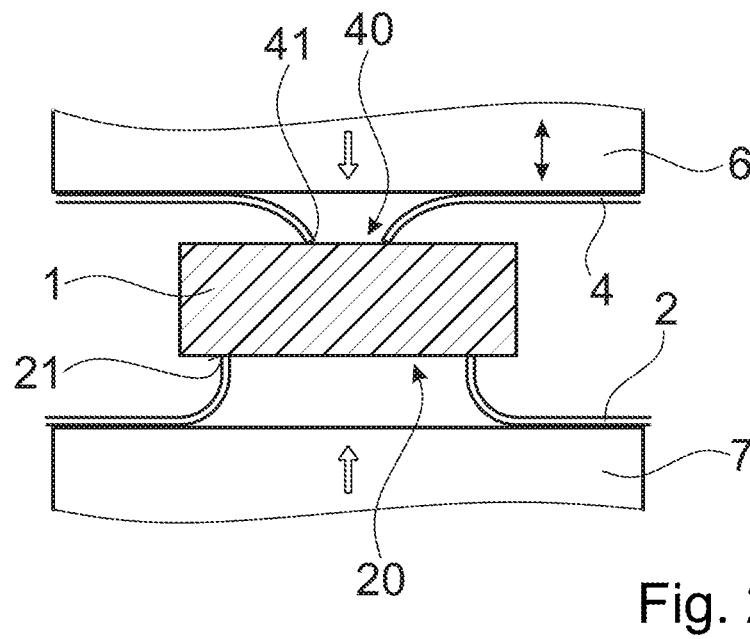
FIGS. 25*a* and 25*b* a further configuration in which a third object is secured to the second object by the first object in an initial and a final stage, respectively.

FIG. 25a shows an example of an arrangement for securing a third object 4 to a second object 2 by means of a first object 1, wherein both, the second and third object have a generally flat sheet portion, with the sheet portion having an edge.

In the embodiment of FIG. 25a, the second object has a second object perforation 20 along which the second object edge 21 runs, and the third object 4 has a third object perforation 40 along which the third object edge 41 runs. Along the perforation, the respective objects 2, 4 are deformed so that the sheet material projects away from the respective sheet plane.

The objects 1, 2, 4 are arranged so that the first object is sandwiched between the second and third objects and that the sheet material of the second and third objects projects towards the first object 1, i.e. projects towards the proximal side for the second object 2 and projects towards the distal side for the third object 4.

During the process, opposite pressing forces are applied to the second and third objects, whereby the first object is clamped between the second and third objects. At the same time, mechanical vibration energy is coupled into the assembly. To this end, for example a vibrating sonotrode 6 presses the third object 4 against the first object 1, whereby the first object 1 is pressed against the edge 21 of the second object, which in turn is placed against a non-vibrating support 7 that applies the opposite pressing force as the normal force.

In the embodiment of FIG. 25a, the vibration is coupled into the arrangement via the third object. At the onset of the vibration, before material portions become flowable, the vibration of the third object causes the first object to vibrate also. If the parameters (angle α, acuteness of the edge, length of the edge, stiffness of the materials, etc.) of the objects are chosen appropriately the heating process at the interface to the second object edge 21 sets in before it starts at the interface to the third object edge 41, or approximately simultaneously. Especially, the second object edge 21 may be formed to have a stronger tendency to absorb energy at the interface (for example by being steeper) than the third object edge 41. Thereby, anchoring of both, the second and third objects in the first object may be achieved even if the vibration is coupled only into the third object.

Figure 25B:
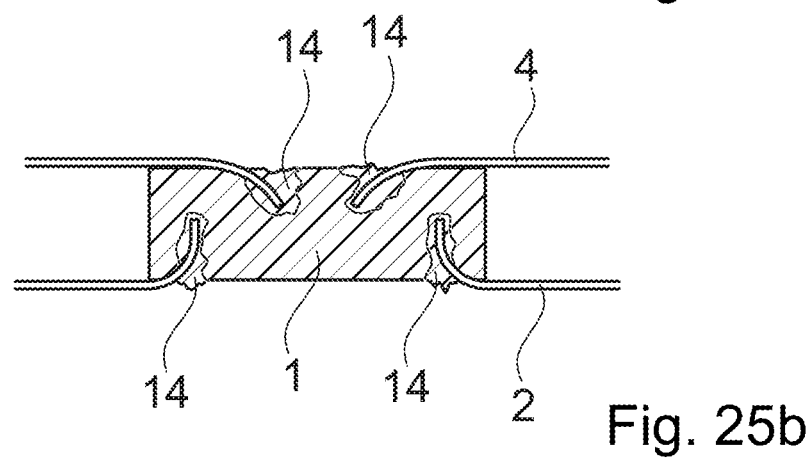

FIG. 25b schematically shows the situation after the energy input has stopped, with the flow portion 14 having sub-portions having flown along the edges of the second and third objects.

Figure 26:
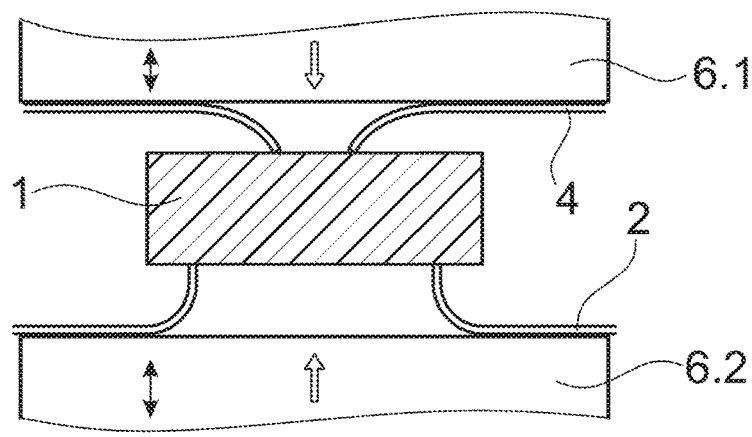
FIG. 26 a variant of the configuration of FIG. 25*a*.

In accordance with the variant shown in FIG. 26, both, the second object 2 and the third object 4 are subject to mechanical vibration, wherein the assembly of the second object 2, the first object 1, and the third object 4 is clamped between two vibrating sonotrodes 6.1, 6.2 applying opposite pressing forces. This embodiment is less sensitive to the properties of the edges of the second and third objects.

Figure 27:
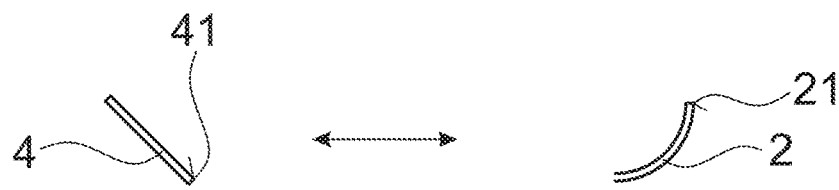
FIGS. 27-29 variations of properties of the sheet portions along the edge.
Figure 28:
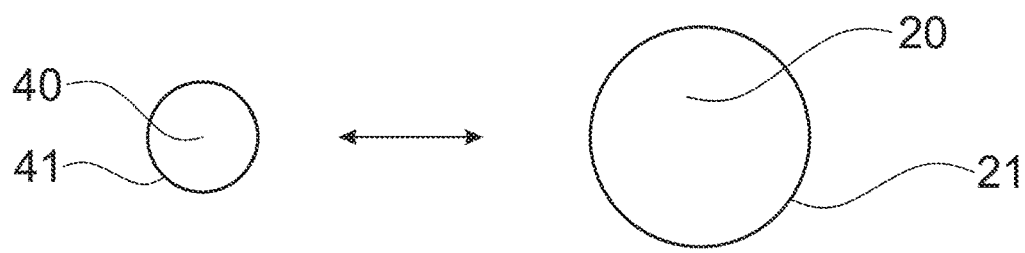
Figure 29:
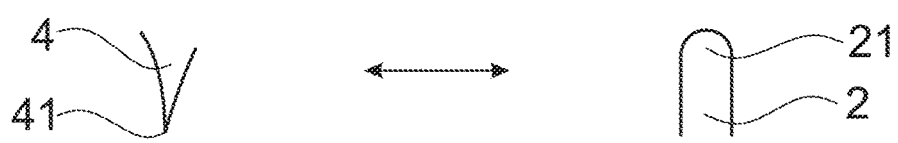

FIGS. 27-29 illustrate how properties of the edge may be varied to influence the energy absorption, for example for asymmetrical set-ups with energy input only from one side, as discussed referring to FIG. 25a. Parameters that may be varied include the steepness (angle α, FIG. 27), the length of the edge (FIG. 28), the acuteness of the edge (FIG. 29) and others.

Figure 30:
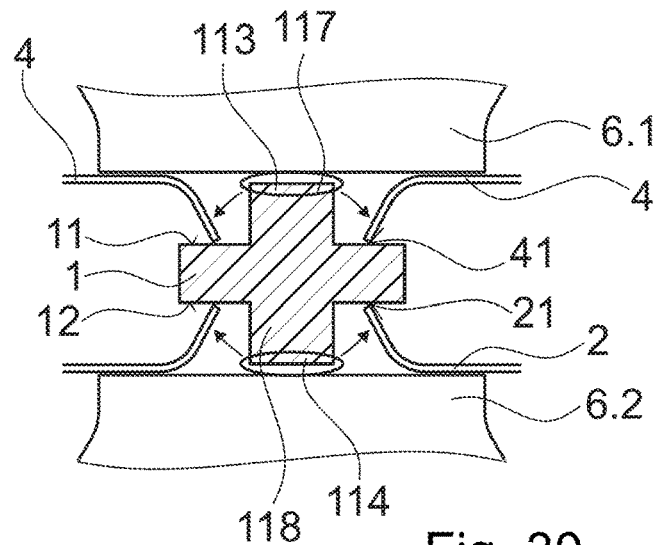
FIG. 30 an even further configuration in which a third object is secured to the second object by the first object at an initial stage.

FIG. 30 depicts another example of an embodiment the second and third objects in which the second and third objects are brought into contact with the first object from opposite sides. In contrast to the embodiments of FIGS. 25a and 26, however, the first object includes at least one protrusion—two ridges 117, 118 in the depicted embodiment—, that projects from the respective proximally/distally facing face 11, 12 against which the edge 21, 41 of the second/third object is pressed. The ridges 117, 118 (or other protrusion(s)) are designed so that their height is larger than or equal to or only a bit smaller than the height h (see FIG. 1b) of the respective deformed section along the edge. When the sonotrodes 6.1, 6.2 are pressed against the third and second objects 4, 2, they therefore come into direct contact with the sonotrode so that during the process mechanical vibration energy impinges on their end portions 113, 114, whereby the material at these end portions becomes flowable and may fill spaces along the edge, as illustrated by the arrows in FIG. 30. In addition or as an alternative to protrusions of the illustrated height, the respective sonotrode 6.1, 6.2 could be provided with a protrusion.

The flowable material that has been generated at the interface between the protrusion and the sonotrode may contribute to securing the second/third object to the first object, for example by contributing to a positive-fit connection.

The concept of FIG. 30 may be applied to arrangements with only one sonotrode (compare FIG. 25*a*), for example by providing only the one side of the first object that faces the sonotrode with a protrusion, or by providing both sides with a protrusion, with the side facing away from the sonotrode having energy directing structures or being otherwise designed to be more inclined to absorb mechanical vibration energy than the side that faces the sonotrode.

The embodiment of FIG. 30 is an example of the concept of the portion (especially protrusion) of the first object that is in direct contact with the sonotrode while the sonotrode acts on the second object 2 (or a third object) so that a sub-portion of the flow portion is formed at the interface between the sonotrode 6 and the first object 1 to fill spaces.

This concept may also be used in configurations that are not according to the principle of providing a second and a third object, both with edges embedded in the first object material during the process. Rather, it may also be applied to embodiments in which merely the first object is secured to the second object (and the first object optionally may be configured to serve as anchor for any further object). This is schematically sketched in FIG. 31. In this configuration, the sonotrode acts from the side of the second object 2 (the lower side in FIG. 31) and presses the assembly of the second object 2 and the first object 1 against a non-vibrating support (not shown in FIG. 31).

Figure 31A:
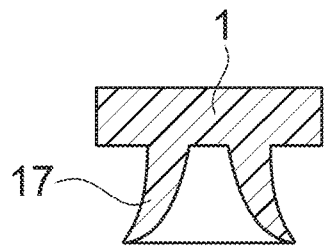
FIG. 31*a* a variant of the first object for a configuration as the one of FIG. 31.
Figure 31:
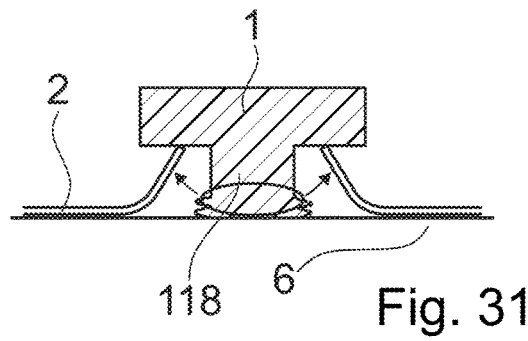
FIG. 31 a further configuration of a first object and a second object.

In embodiments like the ones of FIGS. 30 and 31 in which end portions of the first object are caused to become flowable, the end portions may optionally have shapes that favor such liquefaction. FIG. 31*a* schematically shows an according example in which a tubular portion 17 with a reduced (lower in the orientation of FIG. 31*a*) edge forms the end portion. This shape will cause an energy directing effect, and liquefaction at the contact between the tubular portion and the sonotrode (or, in another configuration, if the sonotrode acts from the side that in FIG. 31*a* is shown to be the upper side, between the tubular portion and a non-vibrating support or a portion of the second object or other non-vibrating object) will set in more swiftly than for shapes as illustrated in FIGS. 30 and 31.

Figure 32:
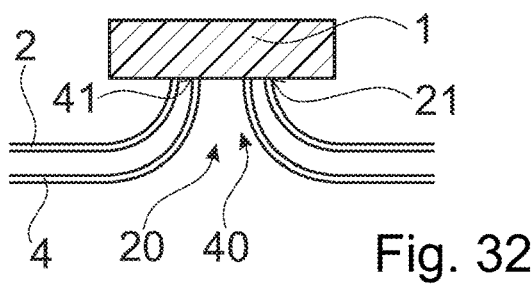
FIGS. 32 and 33 yet further configurations for securing a third object to the second object by the first object.

FIG. 32 depicts an embodiment of the sub-group that includes bringing second and third objects 2, 4 into contact with the first object 1 from a same side. In FIG. 32, both, the second object 2 and the third object 4 have a perforation 20, 40, around which the sheet material is deformed to project towards the first object 1. For securing the second and third objects together by the first object, the second and third objects are positioned one on the other, wherein the perforations are arranged approximately concentrically.

In the configuration of FIG. 32, similarly to FIG. 3*a* the vibration may act on the first object from the side facing away from the first and second objects to embed the edges 21, 41 in the thermoplastic material, while the third object is placed against a non-vibrating support. It would be possible also to cause the mechanical vibration to impinge from the third object side or from both sides.

Figure 33:
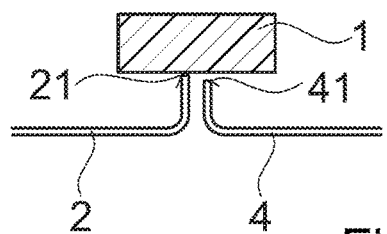

In the variant of FIG. 33, the second and third objects to be secured to each other by the first object are not placed on top of each other but besides each other. In this embodiment, the second object does not have a perforation. Rather, a peripheral edge 21 of the sheet portion is used for the process. A third object peripheral edge 41 is arranged adjacent the second object peripheral edge 21, and the edges are, by the process (similarly to FIG. 3*a*/3*b*) embedded in the thermoplastic material to secure the first, second and third objects to each other.

Figure 34A:
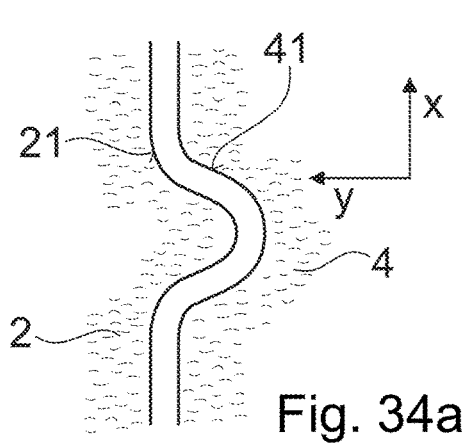
FIGS. 34*a* and 34*b* different edge structures.

In arrangements in which the edge is not an edge along a perforation but is especially a peripheral edge, it may advantageous if the peripheral part along which the edge runs is provided with a bent structure or structure having a corner so that the edge does not extend straight. This is especially the case if in-plane forces (shear forces) may be expected to act on the connection between the objects. FIG. 34*a* very schematically depicts peripheral parts of a second object 2 and a third object 4 adjacent to each other, wherein the peripheral parts are provided with a bend, here as part of a wave-like shape. Due to this, in-plane forces in both in-plane directions x and y can be absorbed by the connection.

Figure 34B:
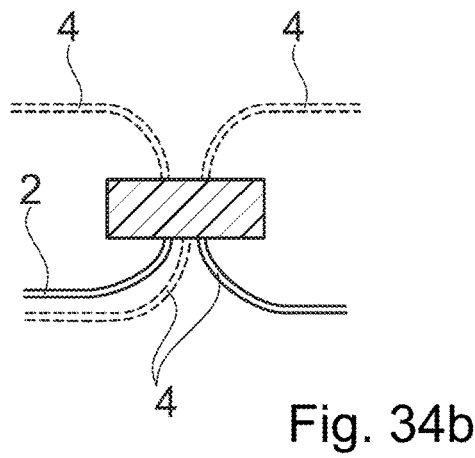

As illustrated in FIG. 34*b*, such a not straight structure of the peripheral part may not only be advantageous if the third object 4 is arranged beside the second object (solid line), like in FIG. 33. Rather, the dashed lines show further possible arrangements of the third object that is to be secured to the second object by the process.

Referring to FIGS. 3*a*, 33 and others the principle of coupling mechanical vibration energy into the first object for transferring the vibration energy to the interface with the second (and if applicable third) object was described. In this, the parameters will generally be chosen so that the thermoplastic material does not substantially liquefy in contact with the sonotrode. FIGS. 30 and 31 describe embodiments in which in contrast to this targeted liquefaction at the sonotrode-first-object-interface is used to liquefy further portions of the thermoplastic material in order to fill structures.

Figure 35A:
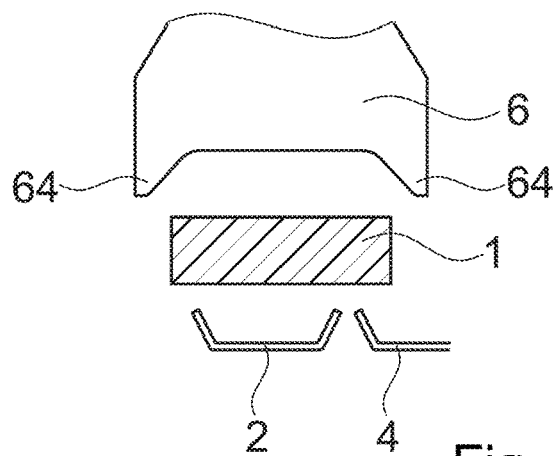
FIGS. 35*a* and 35*b* a further variant of a configuration.
Figure 35B:
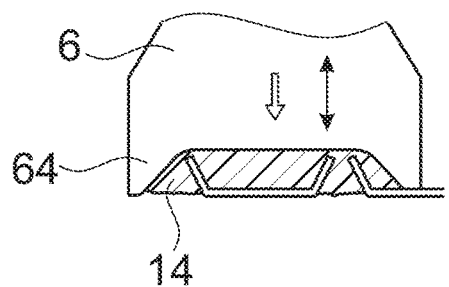

FIGS. 35*a* and 35*b* schematically show another example where this is the case. In FIG. 34*a*, the sonotrode is depicted to have a peripheral protrusion 64 with a sloping shoulder that is equipped for making flowable and deforming an edge portion of the first object and for laterally confining the flow of the flowable material. This will lead to a well-defined smooth edge region of the assembly including the first and second (and, if applicable, third) objects.

In FIGS. 35*a* and 35*b* a further optional feature is shown that is realizable independent of the 'liquefaction at the sonotrode-first-object-interface' and/or confinement features. The combination of this optional feature with the well-defined shape caused by the protrusion or other dedicated sonotrode shape may however, have particular advantages in special embodiments. This further optional feature is that the second object 2 has a deformed edge projecting towards the first object, which edge goes along its full periphery of the second object and is entirely embedded in the first object material (FIG. 35*b*). Therefore, the interface between the (proximally facing, upper in FIGS. 35*a* and 35*b*) surface of the second object and the surface of the first object (the distally facing surface in the configuration of FIGS. 35*a* and 35*b*) is fully sealed. If an element (not shown) is for example attached to the second object at the surface that faces the first object, the approach results in a package that completely seals off the element and protects it from moisture and other possible environmental influences.

This feature of causing a full periphery of the second object to become embedded in thermoplastic material of the first object can be done in combination with securing a third object 4 (as shown in FIGS. 35*a* and 35*b*) or without such combination, i.e. in a set-up without a third object having a sheet-like portion with an edge to be embedded in the thermoplastic material.

Figure 36:
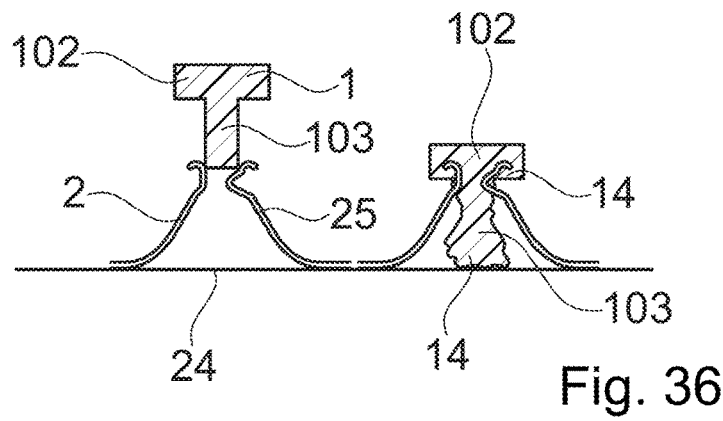
FIGS. 36 and 37 further alternative configurations.

FIG. 36 shows a further embodiment of a first object 1 (or a plurality of first objects) to be mechanically secured to a second object. This further embodiment is an example of an embodiment in which the thermoplastic material is not only made flowable in contact with the edge but also at a contact face with a further portion of the second object. More in particular, in the shown embodiment the second object has a first portion 24 that is for example constituted by an essentially flat metal first sheet and a second portion 25 that includes the edge and here may be formed by a second metal sheet attached to the first metal sheet and forming at least one hump with a perforation at the top of the hump. The first object has a head portion 102 and a shaft portion 103, and for the process the shaft portion is introduced through the perforation until a distal end of the shaft portion 103 abuts against the second object's first portion 24 and/or a distally facing shoulder formed by the head portion 102 abuts against the edge of the second object's second portion. When the mechanical vibration energy impinges, both, the edge becomes embedded in the thermoplastic material and a distal end of the shaft portion becomes deformable and is pressed outwards for the shaft portion to laterally expand so that the first object is additionally anchored by a kind of blind rivet effect. To this end, the dimensions of the shaft portion may optionally be such that a substantial portion of the volume defined underneath the hump (between the first and second portions of the second object) is filled by the thermoplastic material.

A second object's first portion 24 in embodiments like the one of FIG. 36 by the described approach may work as an anvil of the above-described kind. Optionally, it may be deformed as described hereinbefore for the anvil to yield a flow guiding structure. According to an even further alternative, it may be replaced by a separate item having an anvil function.

In FIG. 36, the first object 1 shown on the right is depicted after the process, with the flow portion 14 including parts towards the distal end and at the interface with the edge.

Figure 37:
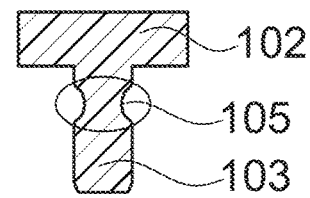

FIG. 37 illustrates the option of a first object for an embodiment like the one of FIG. 36 being collapsible, with a neck portion 105 forming a default collapse location.

In variants of the embodiments of FIGS. 30, 31, 36, 37, the distal and of the first object may be shaped similarly to what is illustrated in FIG. 31*a* to cooperate with the portion (second object part, sonotrode, anvil) to work in a flow directing manner.

Figure 38:
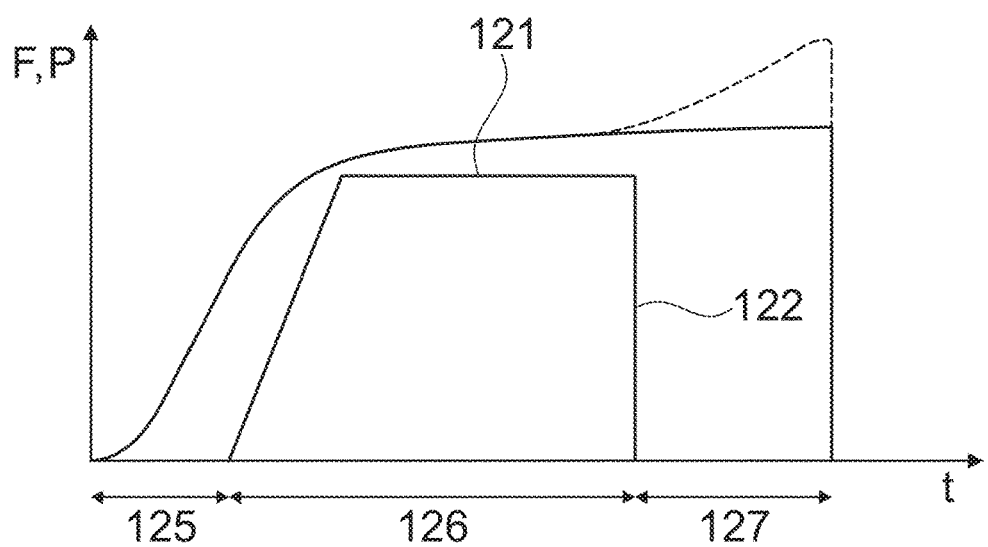
FIG. 38 a process diagram.

FIG. 38 depicts a process diagram for embodiments of the method described in this text. Curve 121 shows the pressing force applied between the first and second objects, and curve 122 the vibration energy power, both as a function of the time. As shown in FIG. 38, in an optional first phase 125 (pre-pressing), which first phase can be short or can even be omitted, the first object is pressed against the second object without any vibration acting. This first phase may for example be advantageous so as to make sure that when the vibration sets in, the pressing force and thereby a coupling force between the sonotrode and the first object (or, if applicable, the second or other object of the assembly) is so that there is efficient coupling between the sonotrode and the object, for example thereby preventing melting at the interface between the sonotrode and the first object. In a second phase 126, the vibration is coupled into the assembly while the pressing force is maintained. Depending on the configuration, the pressing force instead of being constant as illustrated may follow a dedicated profile. In a third phase 127 (post-pressing phase), the vibration is switched off, but the pressing force is maintained for some more time until the flow portion has re-solidified to a sufficient extent to prevent any undesired loosening or spring-back effects etc. During this third phase 127, the second object along the edge may be even further pressed into the first object. To this end, optionally (dashed line), the pressing force may even be enhanced during the third phase.

Figure 39:
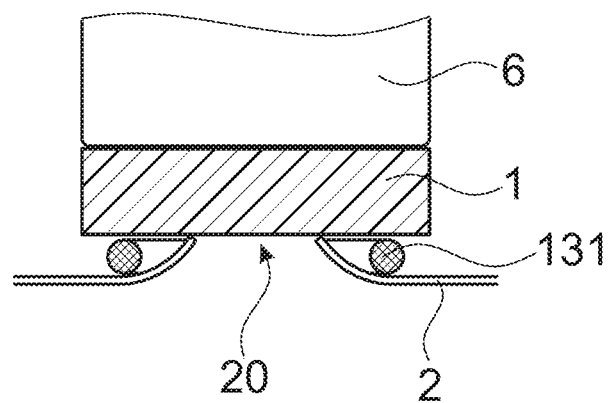
FIG. 39 a configuration with an elastomeric sealing element.
Figure 40:
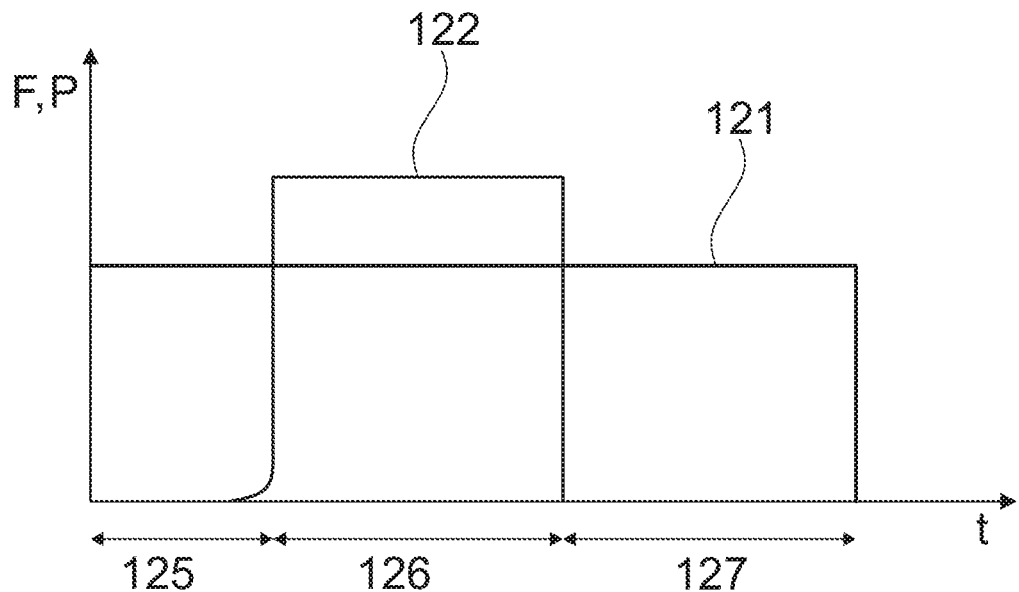
FIG. 40 a process diagram for the configuration of FIG. 39.

FIG. 39 shows a configuration similar to previously described configurations (for example the configuration of FIG. 3*a*), but with an additional element: An elastomeric sealing element 131 is placed relative to the first and second objects prior to the step of applying the pressing force and the mechanical vibration. The sealing element is placed at a location where the pressing force and the thereby caused relative movement of the first and second object after onset of the liquefaction (making flowable) compresses the sealing element 131, here between the first and second objects. Thereby, an additional sealing effect may be achieved. In the depicted configuration, the sealing element 131 is a sealing ring surrounding the perforation 20 in the second object, whereby the connection between the first and second objects is completely sealed towards the first object side (the upper side in FIG. 39).

Also in embodiments with a sealing element compressed between the first and second objects, the processing diagram may be similar to the one shown in FIG. 38, however, the third phase 127 (post-pressing phase) may be particularly long because of the spring-back effect that would be caused by the sealing element if the flow portion has not sufficiently hardened.

Figure 41:
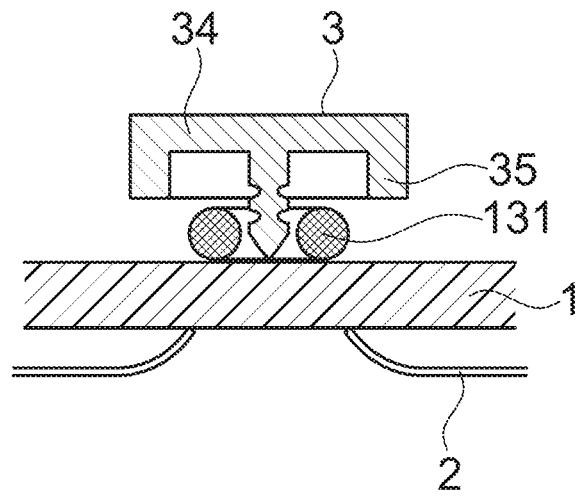
FIG. 41 a further configuration with an elastomeric sealing element.

Another example of an embodiment in which a sealing element 131 is placed relative to the first and second objects prior to the onset of the pressing force and the vibration is shown in FIG. 41. In this embodiment, which otherwise is similar to the embodiment of FIG. 8, the sealing element 131 is compressed between a connector piece 3 and the first object 1, thus on the other side of the first object relative to the second object. Also in FIG. 41, the sealing element is illustrated to form a sealing ring. There is the option of placing an additional sealing element at the location shown in FIG. 39 also in the embodiment of FIG. 41.

In embodiments like the ones of FIG. 39 and of FIG. 41, instead of an elastic sealing element 131, also a corresponding dose of an adhesive may be used, for example dispensed to form a closed ring as is the case for the sealing elements 131 illustrated.

Figure 42:
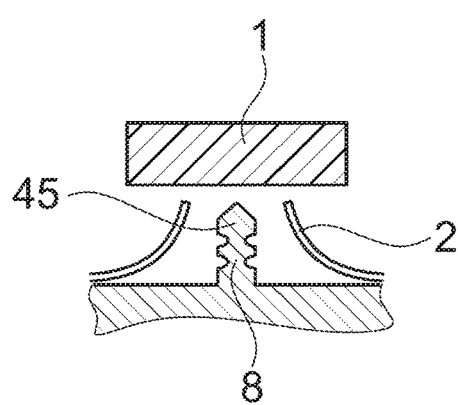
FIGS. 42 and 43 even further configurations for securing a third object, the second object and the first object to each other.

FIG. 42 illustrates the principle that a third object 8 to be secured to the first and second objects 1, 2 (or to be secured to one of the first and second objects by means of the other one of the first and second objects) may be connected to the first object by an additional positive-fit connection between the first and third objects. To this end, the third object 8 includes a structure that includes undercuts with respect to at least one direction (the axial direction in FIG. 42) into which thermoplastic material of the first object may flow. In the embodiment of FIG. 42, the structure is provide on a protrusion 45 of the third object 8 which during the process is pressed into material of the first object while mechanical vibration energy is coupled into the system. The objects are placed relative to one another so that the portion of the second object around the perforation is between the first and third objects and the protrusion 45 the process reaches through the perforation of the second object and thereby comes into contact with the first object.

The protrusion 45 of the embodiment of FIG. 42 is comparable to a corresponding structure of a connector piece described hereinbefore, for example referring to FIG. 5a/5b or referring to FIG. 6 or 7 or 8.

A further feature of the embodiment of FIG. 42, which is independent of shape of the third object that includes the protrusion with the positive-fit structure, is that the third object 8 in contrast to the embodiments of FIGS. 5-8 is placed on the same side of the first object as the second object. The process of causing vibration energy to impinge that results in embedding the edge of the second object and parts of the third object (here: of the protrusion) will thus cause a backflow of thermoplastic material towards the side of the second and third objects, whereby the space between the protrusion 45 and the sheet portion will be at least partially filled.

Also, in configurations like the one of FIG. 42, the process will result in the second object 2 being clamped between the first and third objects.

Figure 43:
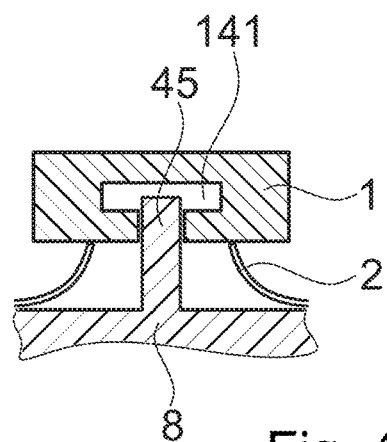

FIG. 43 depicts a variant of the embodiment of FIG. 42, in which a positive-fit connection between the first and third objects includes causing material of the third object 8 to penetrate into an undercut structure 141 of the first object 1. To this end, the third object may comprise, at least in a region of the protrusion 45, thermoplastic material that becomes flowable by the impact of the vibration energy and the pressing force. The thermoplastic material of the third object in such embodiments may be of a same composition as the one of the first object, or it may be different.

Depending on the material pairing of the thermoplastic materials of the first and third objects, in such embodiments also weld may result between these objects, with or without an undercut structure being present in one of the objects.

In embodiments, the method includes providing the second object with a plurality of attachment locations, each attachment location including an edge of the sheet portion, and coupling, for each attachment location, mechanical vibration energy into the assembly until a flow portion of the thermoplastic material due to friction heat generated between the edge and the thermoplastic material becomes flowable and flows around the edge to at least partially embed the edge in the thermoplastic material. This may be done simultaneously for all attachment location or for subgroups of attachment locations, or may be done sequentially for the attachment locations. Each attachment location may for example include a perforation 20 of the kind described hereinbefore, with the edge running along the perforation.

Figure 44:
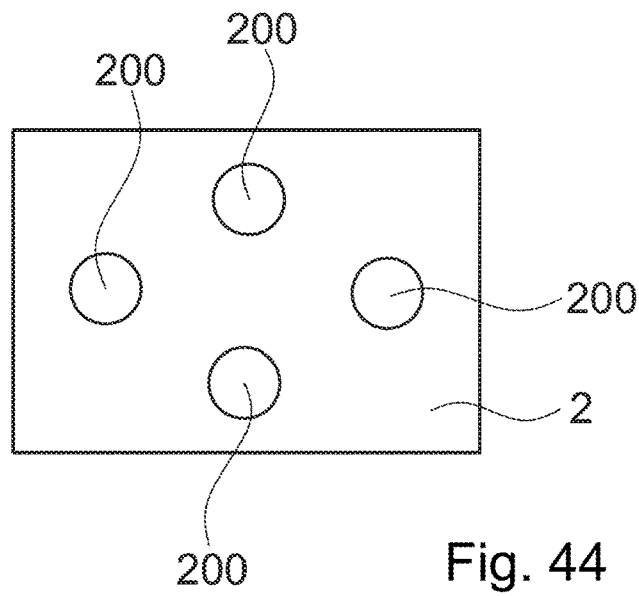
FIG. 44 the principle of a second object with a plurality of attachment locations.

FIG. 44 very schematically illustrates a second object 2 with a plurality of attachment locations 200. Generally, such attachment locations may be place in a regular or irregular arrangement, distributed in a two-dimensional or one-dimensional (along a line) manner. Especially, a two-dimensional arrangement of attachment locations will bring about stability with respect to tilting forces in all directions even if the attachment locations themselves are relatively small and/or if the height h (see FIG. 1b) is comparably small, for example due to a limited thickness of the first object. Thus, such a two-dimensional arrangement may cause a mechanically stable connection even with very thin first objects.

One feature of the connections described hereinbefore in this text is that the connection between the first and second objects (in embodiments like the one of FIG. 34a/34b including the third object) may absorb relative forces in all in-plane directions in that the edge(s) comprise(s) portions running into different in-plane directions and projecting into opposing directions.

This fact—that the edge includes both, portions that project at least partially into opposing direction (i.e., the directions into which one of these portions projects has a component along an axis of the direction into which an other one of these projections projects, which component has an opposite sign), and having edges running into different directions, may be advantageous in many cases, because it may provide a form locking into all in-plane directions. In hereinbefore described embodiments, such portions are formed around one single perforation.

Figure 45A:
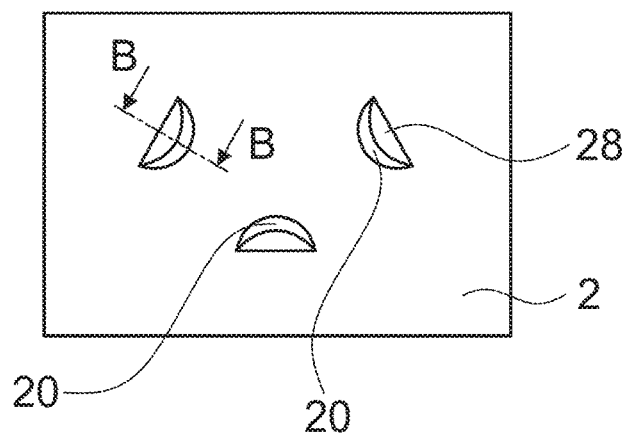
FIGS. 45*a* and 45*b* a second object with a plurality of attachment locations in which the attachment locations together lock the first object relative to the second object in all in-plane directions.
Figure 45B:
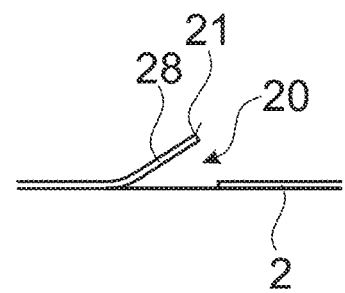

FIGS. 45a and 45b (FIG. 45b showing a section along plane B-B in FIG. 45a) show an alternative, in which the tongues 28 that form the deformed section lock the first object only in one in-plane direction per perforation 20. However, the tongues 28 belonging to different perforations project into different directions, including directions having components in opposite directions. Together, they lock the first object in all in-plane directions.

Figure 46:
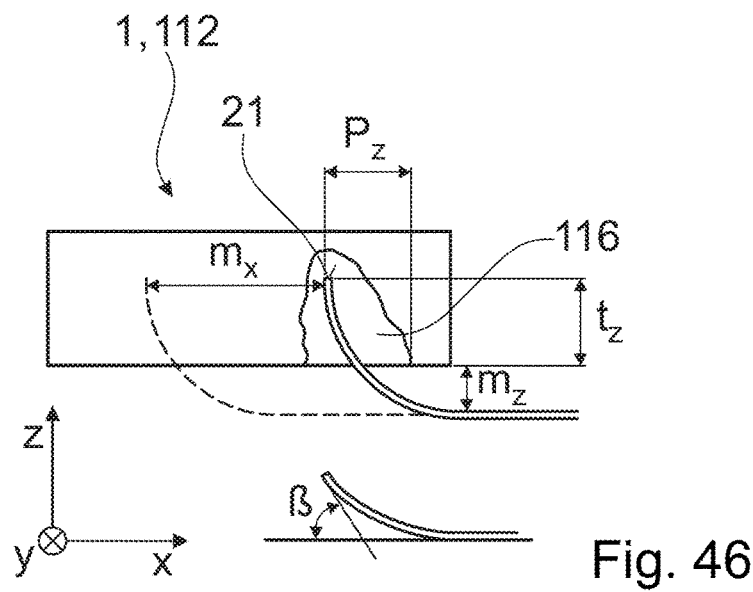
FIG. 46 the principle of tolerance compensation.

FIG. 46 illustrates principles of tolerance compensation. Mechanical connections by the present invention are suitable for tolerance compensation in many ways: The location of attachment at the first object does not need to be pre-defined and can vary, the only condition being that the edge is embedded in thermoplastic material—thus at the location of the edge 21 as well as where the material is to be embedded there has to be thermoplastic material.

Thus, the lateral position, the x-y position in the depicted coordinate system, of the edge 21 (or to be more general: of the attachment location) may thus vary within the according lateral dimensions of the first object 1 or of a thermoplastic attachment zone 112 thereof. In FIG. 46, $m_x$ denotes a potential mismatch of the relative, lateral, x-position between two possible arrangements.

Also the relative axial position (z-position) can vary. In order to have sufficient strength against axial pulling forces, the dimension of the embedded portion $P_z$ in a z-projection has to have a certain minimal value $P_{z,\,min}$. In practice, minimal z-projection values of the embedded portion between 0.2 mm and 1 mm may be sufficient (this does not exclude higher values of course), depending on the application. As long as this minimal dimension is reached, the degree of how far the edge is pressed into the first object ($t_z$) does not need to be pre-defined. Thus, the relative z-position of the first and second objects with respect to each other can vary within limits only given by geometrical constraints (for example if surfaces abut against each other) and by the named minimal dimension. In FIG. 46, $m_z$ illustrates a possible mismatch of relative z-positions between two possible arrangements.

The zone that is affected by material flow when the sheet portion is pressed into the first object in FIG. 46 is denoted by 116.

Figure 47:
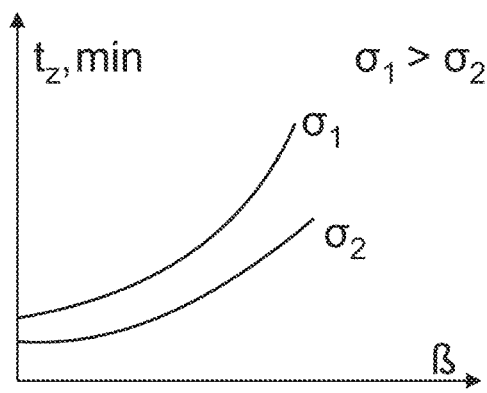
FIG. 47 a dependence of the minimal depth on the angle.

In view of the considerations about the depth in z-direction and a possible z-tolerance, the angle α (see FIG. 1b; FIG. 46 shows the angle β=90°−α) is a possibly useful parameter. Generally, the larger the angle β the larger the required minimum depth $t_{z, min}$, as sketched in FIG. 47 for different mechanical stress values σ for the connection to withstand.

Due to the illustrated possibility of tolerating a z-mismatch, also an angle mismatch may possibly be compensated by connections according to the invention. This is very schematically illustrated in FIG. 48, where there is an angle mismatch γ between the sheet plane of the second object 2 and a corresponding plane of the first object.

Figure 48:
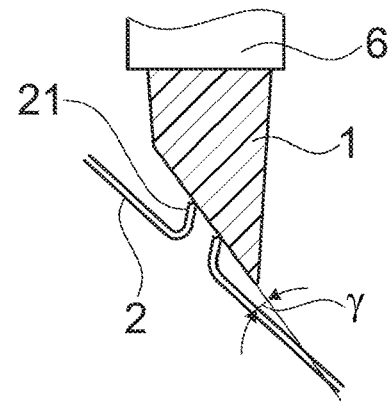
FIG. 48 a configuration with a second object having a sheet plane not perpendicular to the axial direction and also illustrating the principle of angle mismatch compensation.

FIG. 48 also illustrates (independently of tolerance compensation) the principle that the axial direction into which the sonotrode 6 presses the first and second objects against each other does not have to be perpendicular to the sheet plane.

Figure 49:
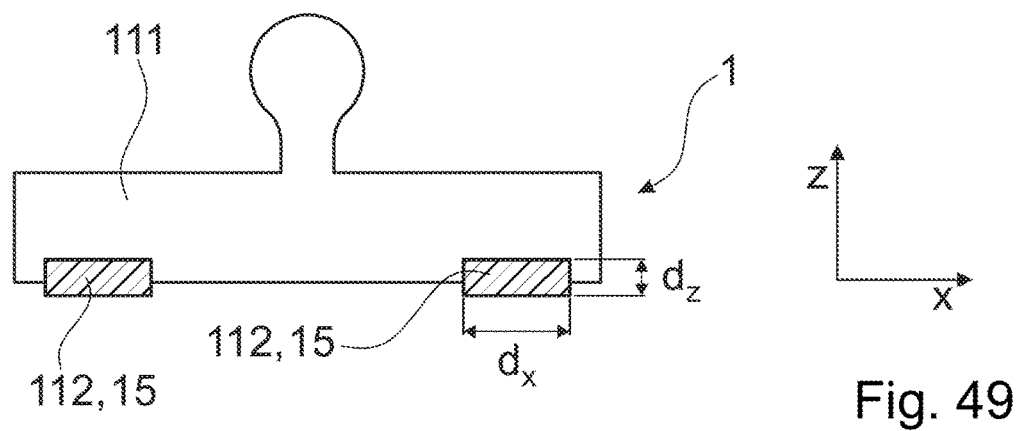
FIG. 49 a first object with a functional zone and attachment zones.

In a many embodiments, the first object to be secured to the second object will not consist of the thermoplastic material but will have in addition to thermoplastic portions also other portions. Especially, a first object 1 may have a functional zone 111 in addition to at least one attachment zone 112, as sketched in FIG. 49. The lateral dimensions and z-dimension of the attachment zone 112 or attachment zones 112 may be designed in accordance with the required tolerances.

In embodiments, the first object includes at least one functional zone 111 that is unsuitable for attachment to an attachment location of a second object, and a plurality of attachment zones 112 including the thermoplastic material.

In a group of embodiments with a functional zone and an attachment zone, the first object includes two thermoplastic material parts, the first thermoplastic material part including the thermoplastic material that is used for embedding the edge, and the second thermoplastic material part including a different thermoplastic material, which different thermoplastic material has different properties.

Figure 72:
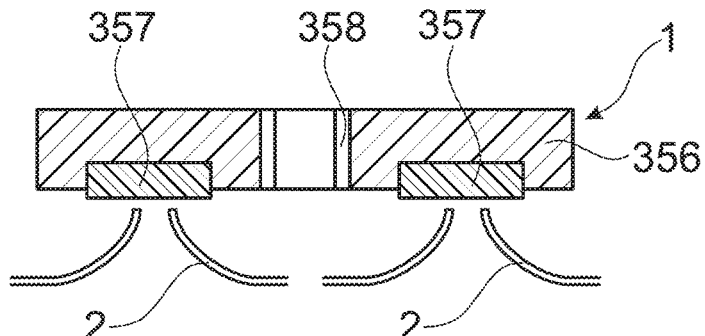
FIG. 72 a first object with different thermoplastic material parts.

FIG. 72 illustrates an according example. The first thermoplastic material part 356 defines and/or holds the functional elements. In FIG. 72, schematically an inner thread 358 is illustrated. The second thermoplastic material part/parts 357 serves/serve for attaching the first object 1 to the second object 2.

The thermoplastic material parts have different material properties.

The modulus of elasticity E of the first part may be greater, for example much greater, than the according modulus of the second part.

The (elastic) extensibility of the second part(s) 357 may be much higher than the extensibility of the first part 356.

By this, for example different thermal expansion behaviors between the first object and the second objects may be compensated for.

Especially, a first object including two kinds of thermoplastic material according to the present embodiments may be manufactured by two-component injection molding.

In embodiments, the invention concerns use of a method as described and claimed in this text for attaching a first and a second object to each other, wherein the second object has a at least one attachment location, especially a plurality of attachment locations, constituted by a (for example deformed) portion defining the edge and projecting towards the first object, wherein a first tolerance for the positioning of the attachment location on the second object is greater than a second tolerance corresponding to a tolerance for the final positioning of the first object with respect to the second object.

In other words, the invention is especially suited for situations where a comparably precise relative positioning of the objects with respect to each other (this includes the requirement of a positioning of one of the objects with respect to a third object to which the other object is secured) may be required but where there is no precise positioning of the attachment locations. By this, therefore, a substantial gain in efficiency may be achieved, as precise relative positioning of attachment locations may be a challenge in complicated set-ups, whereas the present invention does not require such precise positioning. Nevertheless, the position of the one part (for example first object) relative to a complicated set-up that includes the other part may be very precisely defined, including the possibility of a manual position adjustment prior to the application of the vibration energy.

For example, the invention may include producing a plurality of assemblies, each assembly including a first object secured to a second object, wherein the second object includes at least one attachment location, wherein a standard deviation of the position of the attachment location between the different assemblies is greater than a standard deviation of the position of the objects with respect to each other (and/or the position of one of the objects with respect to a third object to which the other object is secured).

FIGS. 50a and 50b show one possible way to precisely guide the position of the first object 1 relative to the second object prior to the application of the mechanical vibration energy. A guiding tool 162 having at least one guiding protrusion 163 holds the first object 1 by the guiding protrusion 163 engaging in a lateral guiding indentation 161 of the first object, wherein the guiding protrusion has a more pronounced curvature than the guiding indentation 161, whereby the guiding tool may hold the first object and precisely define its lateral position, x-y-position in the coordinate system used in this description, whereas free vibration along the z-axis is still possible when a sonotrode is used to impinge on the first object 1. FIG. 50b illustrates that for example a first object may have three lateral guiding indentations into which guiding protrusions of the guiding tool may engage in a finger-like manner.

A further possibility of guiding the position of the first object with respect to the second object for the attachment is by the sonotrode, as for example illustrated in FIGS. 11 and 12.

The different embodiments of the invention have a large number of applications in various sectors of mechanical engineering and construction. A first example is very schematically illustrated in FIG. 51. The first object 1 is a holder (with a holding structure 151) for an article 152 to be positioned to a frame, to which frame the second object 2 belongs. The frame may have a complicated configuration, and the attachment locations 200 may for example be difficult to be positioned precisely.

In an embodiment relating to the automotive industry, the frame may for example be a car body or a part thereof, and the article may be a device with a location visible for the user, such as a technical, functional or optically decorative element in the interior of the car, or any other object. The mechanic responsible for assembly may place the holder 1, for example with the article 152 already integrated, in a precise manner with respect to visible markings and/or reference points, so that a pleasant impression is generated.

Attachment to the different attachment locations 200 may be done simultaneously or one after the other.

A special feature of the embodiment of FIG. 51 (that is an option also for embodiments in which the first object has a purpose different from being a frame) is that the first object has an attachment flange 156 against which the sonotrode 6 may be placed for attachment, the attachment flange defining an attachment zone surrounding a functional zone.

An attachment flange forms a peripheral, laterally protruding portion of the first object 1. It may consist of the thermoplastic material; at least a distal face includes the thermoplastic material. It defines a proximally facing incoupling surface 158, which is parallel to the distal surface of the first object where the latter is in contact with the edge of the second object 2. Thereby, even if the first object due to its function has a complex shape that may be different from a shape having a plane distal surface (FIG. 51 for illustration purposes shows a plane distal surface, but different surface shapes are possible), a less complex shape at the attachment location(s) becomes possible.

An attachment flange may but does not need to run around a full periphery of the first object.

For attaching, if the dimensions permit so, a single sonotrode running around the periphery of the first object may be used. Alternatively, especially if the energy input of such single sonotrode solution would be too high, a plurality of sonotrodes may be used to impinge on the first object at different attachment locations simultaneously.

According to an even further option, one sonotrode or a plurality of sonotrodes may be used to impinge on the object at the different attachment locations sequentially. If this is the case, the vibrational coupling between the respective attachment location against which the sonotrode is pressed and the rest of the first object may be an issue. Especially, it may be necessary for the process to work properly that not too much vibration energy is conducted away from the attachment location and coupled into the rest of the first object. Mechanical coupling between the part that has the attachment location and the rest of the object may also be an issue because the anchoring process includes moving the first object towards distally relative to the second object (or vice versa) at the attachment location at which the energy is coupled into the first object (or second object), whereas at the other attachment locations such movement is not possible.

Figure 69:
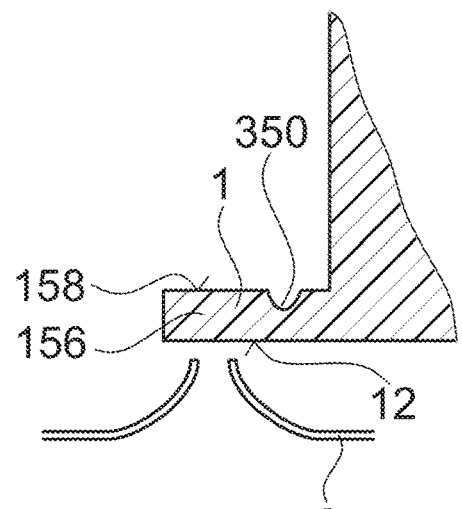
FIGS. 69 and 70 attachment flanges with an elastic joint.
Figure 70:
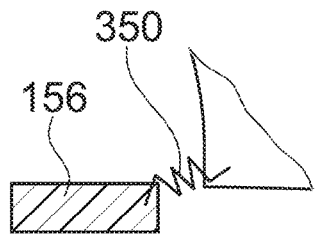

Depending on the construction the use of an attachment flange being peripheral and constituting a relatively flexible structure may as such may be sufficient for dealing with these requirements. In an alternative group of embodiments, the first object includes an elastic joint 350 between the attachment flange 156 and a first object body. This is for example illustrated in FIGS. 69 and 70. In the embodiment of FIG. 69, the elastic joint includes a neck that vibrationally de-couples the attachment flange from the first object body. In FIG. 70, rather generally a spring element that constitutes the elastic joint is depicted.

Figure 71:
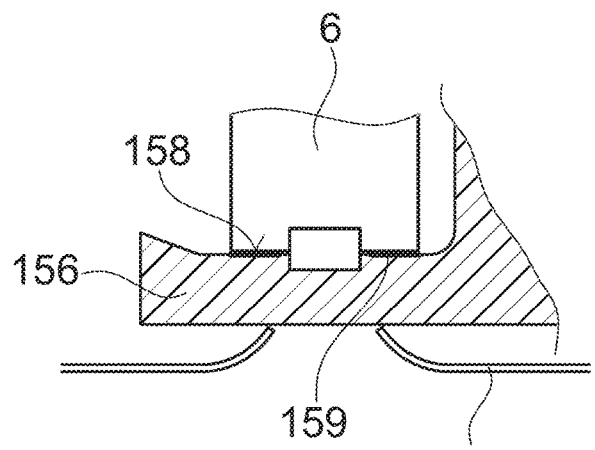
FIG. 71 an attachment flange with a dedicated coupling surface portion.

A further optional feature of embodiments, especially but not only with an attachment flange, is shown in FIG. 71. The first object may include at least one, for example a plurality of, dedicated, possibly marked, proximally facing coupling surface portions 159 that are positioned to correspond to attachment locations defined by the second object 2 (for example at positions corresponding to positions of second object perforations along which the edge extends). Such coupling surface portions are parallel to the distal surface portion that comes into contact with the edge of the second object.

FIG. 119 shows an embodiment in which the attachment structure is not an annular flange but includes a plurality of attachment tongues 650 that extend from a main body 660 outwardly. In the embodiment of FIG. 119, an optional elastic joint 350 is illustrated between the main body and the attachment tongues. Embodiments with a plurality of discrete tongues instead of a flange that surrounds the main body are especially, but not only, suited for situations in which the second object is not flat but has a more complex 3D-shape as also schematically illustrated in FIG. 119.

A further, independent feature is also shown in FIG. 119. The sonotrode 6 includes a marking stamp feature. By this, a marking 671 is generated in the process, as sketched in FIG. 120 showing a top view on one of the attachment tongues after the process. Such marking 671 may be advantageous in production stages after the securing process, for example for an operator to see where the second object underneath has a perforation, for example so that he can drive an element (screw, pin, etc.) through the assembly if necessary.

FIG. 52 illustrates a further application, namely the first object 1 is a base for fixing an article 172 with a frictional and/or snap-in engagement. For the snap-in engagement, the article 172 includes a lateral protrusion 173 for engaging in a snap-in indentation 171 of the first object.

Figure 53:
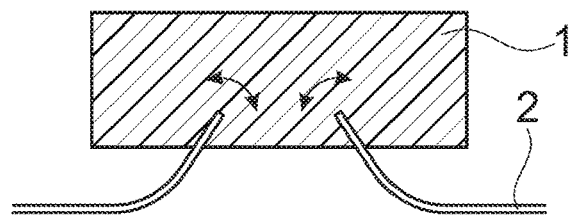
FIG. 53 a vibration decoupling.

An even further application is illustrated very schematically in FIG. 53. The deformed section of the second object 2 in this has a sufficient dimension for the first object 1 to be attached while the non-embedded portions of the deformed section have still a considerable extension so that the first object does not abut against the sheet plane. Depending on how the edge runs, and if the second object is sufficiently elastically deformable, this leaves the possibility of tilting movements of the first object with respect to the second object, so that the first and second objects are vibration-decoupled with respect to each other.

Figure 54:
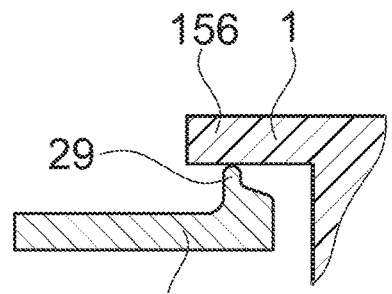
FIG. 54 an embodiment with a die cast second object.

FIG. 54, shows an embodiment in which the second object 2 does not have a metal sheet in the narrow sense of the word, an edge of which forms the edge. Rather, the second object is a die-cast metal object, for example manufactured without any deformation step. The edge is belongs to a ridge-like protrusion 29 that is shaped by the die-cast process.

By this, arbitrary edge shapes become feasible. This includes the possibility to have a plurality of ridge-like protrusions 29 and hence edges adjacent to each other.

Also, while in many embodiments, like in FIG. 54, the second object will have an extended flat, plate-like or sheet-like portion, this is not a requirement. Rather, because the edge is formed by die-casting, the object may have any basic shape and nevertheless include the edge. For example in the embodiments of FIG. 54, the sheet-like portion is formed by the relatively small ridge-like protrusion 29 that ends in the edge.

Hereinafter, principles of embodiments of the invention that include the concept of adjusting a z-position of an adjustment part relative to an anchoring part are described. Generally, the z-direction in the described and illustrated embodiments is assumed to be the direction perpendicular to the plane defined by the second object 2 around the attachment location (sheet plane), and it may correspond to the direction (axis) into which the vibrating tool is pressed for securing the first object to the second object. The principles described hereinafter are to be understood as general principles of adjusting a z-position and are not meant to be restricted to the shown specific geometries and configuration. In all of the figures illustrating this concept, the second object is illustrated to have an attachment location of the kind illustrated and described in FIGS. 1a-2b. However, the concept also applies to embodiments with other kinds of attachment locations implementing the approach according to the invention.

Figure 55:
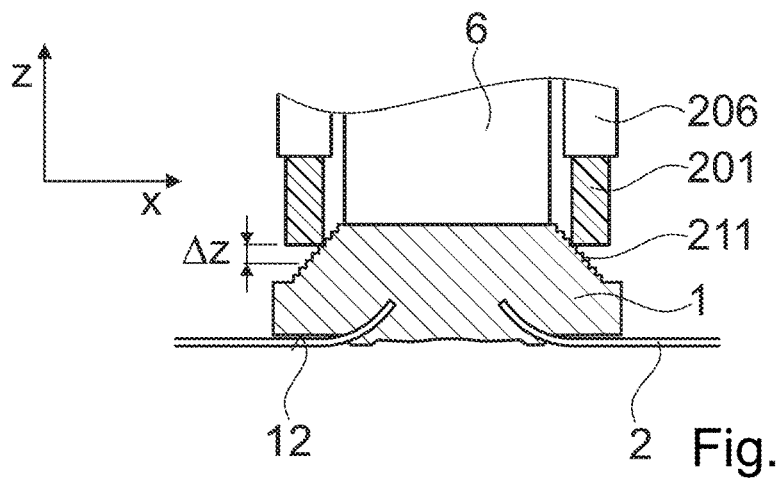
FIGS. 55-56 configurations with an anchoring part and an adjustment part.

FIG. 55 illustrates a first example of an embodiment of the method that includes adjusting a z-position of an adjustment part 201 relative to an anchoring part, which anchoring part is constituted by the first object 1. The embodiment belongs to the group of embodiments in which the adjustment part 201 includes thermoplastic material and is capable of being welded to the anchoring part.

As for the other embodiments described in this text, the adjustment part may optionally include functional elements, such as a connecting portion, a flange, an integrated function carrier (such as an electronic/decorative or otherwise functional device), etc.

For carrying out the method, for example in a first stage, the first object 1 is secured to the second object 2 using a sonotrode 6 in the way described hereinbefore. The step of pressing the first object towards distally while the energy is coupled into the assembly in this may be carried out until the distal face 12 comes into contact with the flat portion of the second object, whereupon the mechanical resistance against a further distal movement of the first object 1 rises substantially. Thereby, the z-position of the first object relative to the second object is well-defined.

In a second stage, the position of the adjustment part 201 relative to the first object 1 is adjusted and fixed. To this end, a further sonotrode 206 advances the adjustment part towards distally against a mechanical resistance while vibration is coupled into the sonotrode and from the sonotrode into the assembly. Because of the mechanical resistance, friction heat is generated at the interface between the first object 1 and the adjustment part 201 so that material of both parts becomes flowable. As a consequence, firstly a further distal movement of the adjustment part becomes possible, and secondly, after re-solidification, a weld is generated between the first object 1 and the adjustment part 201. The advance movement is carried out until a desired z-position is reached, especially to compensate for tolerance variations. The designation Δz shows the variation of possible relative z-positions.

The sonotrode 6 and the further sonotrode 206 are illustrated to be separate devices. In alternative configurations, this is not necessary. For example, if the sonotrode is not symmetrical about the axis, this sonotrode may after an adjustment of its orientation (for example 90° twist) also use for the step of advancing and fixing the adjustment part.

According to yet another alternative, the (first) sonotrode 6 and the further sonotrode 206 may act simultaneously or partially simultaneously (in the latter case for example the further sonotrode starts acting before the—first—sonotrode 6 has stopped). The relative position of the first sonotrode 6 and the further sonotrode 206 defines the adjustment of the z position.

In the depicted embodiment, the required mechanical resistance against a forward (distal) movement of the adjustment part is achieved by the following geometrical properties:

The first object 1 (anchoring part) has an outer surface that is stepped or tapering towards proximally;
The adjustment part has a tube shaped distal portion put over the tapering portion of the anchoring part.

Figure 56:
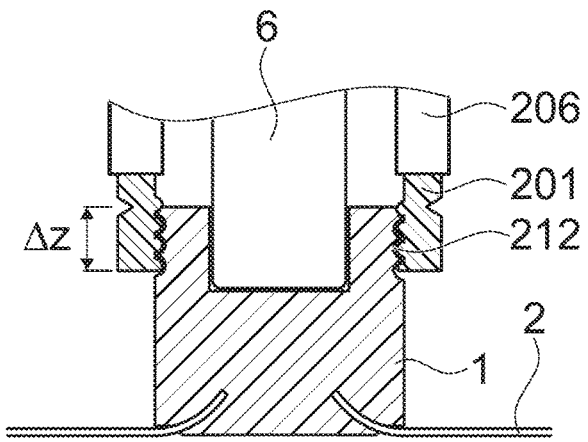

The embodiment of FIG. 56 is based on similar principles as the embodiments of FIG. 55. In contrast to the latter, however, the adjustment of the z-position of the adjustment part 201 relative to the anchoring part (first object 1) is not made by pressing advancing the further sonotrode by an adjustable distance but, for example previously to positioning the further sonotrode 206, by a movement of the adjustment part 201 relative to the anchoring part prior to the energy input that fixes the adjustment part. In the depicted embodiment, the anchoring part has an outer thread 212 cooperating with an inner thread of the adjustment part 201 so that the position can be adjusted by turning the adjustment part 201 relative to the anchoring part secured to the second object 2. Thereafter, an energy input by the further sonotrode 206 may act to weld the adjustment part relative to the anchoring part (first object 1) to fix the adjustment part to the anchoring part.

Instead of having an outer thread, the first object 1 could also have an inner thread cooperating with an outer thread of the adjustment part. Also other means for provisionally locking the z-position for the subsequent fixing step are possible, for example a bayonet-like coupling with different fixation depths (discrete adjustment), etc.

FIGS. 57a and 57b show an embodiment of an anchoring part (first object 1) and a corresponding adjustment part 201, respectively. The adjustment part 201 has a ring shaped section shaped to be placed relative to the anchoring part so that a it is guided by a central proximal portion of the anchoring part. The adjustment part 201 is thereby rotatable relative to the anchoring part. In this, a ramp section 262 of the adjustment part lies on a ramp section 261 of the anchoring part, whereby a rotation of the adjustment part relative to the anchoring part causes the relative z position to shift, similar to a threaded connection. At least one of the ramp sections 261, 262 may be corrugated (as schematically sketched) so that when in the subsequent fixing step the sonotrode presses the parts against each other, the parts do not shift relative to each other.

FIG. 58a shows an anchoring part being a first object 1 and an adjustment part 201, wherein one of the parts (in FIG. 58a the adjustment part) has a pattern of protrusions 221 facing towards the other one of the parts. For the adjustment and fixation, the adjustment part 201 is pressed against the anchoring part by a sonotrode while energy impinges so that the adjustment part is welded to the anchoring part. The protrusions in this serve both, as energy directors and as collapsible distance holders. The degree of how far the adjustment part is advanced into the anchoring part serves to adjust the relative z position. FIGS. 58b and 58c show different cross section profiles of protrusions 221. The protrusions are arranged so that they do not form closed contours so that air trapped between the parts can escape.

FIG. 59 illustrates a cross section of a corresponding arrangement after the welding process. The degree to which the openings 228 between the anchoring part and the adjustment part 201 remain depends on the adjusted relative z position.

The adjustment part in FIG. 59 for illustration purposes is shown to include a fastening portion 231 for clipping a further object onto the arrangement. Instead, as in the other embodiments, the adjustment part 201 could include other structures or functional elements.

Instead of initially being separate parts, the adjustment part and the anchoring part can be provided as an already pre-assembled unity with the adjustment part welded to the anchoring part. Then, the assembly of both parts serves as the first object. For the process, a (single) sonotrode acting on the proximal end face is used to couple energy into the assembly and pressing the assembly against the second object. Due to the superior energy directing characteristics of the edge of the second object, initially the thermoplastic material at the interface to this edge will become flowable, and the assembly will be pressed into the portion of the second object that protrudes towards the proximal side. Only when the distal face 12 reaches the plane part, the resistance will increase and the zone formed by the protrusions 221 will start collapsing until a desired relative z position is reached.

Figure 60:
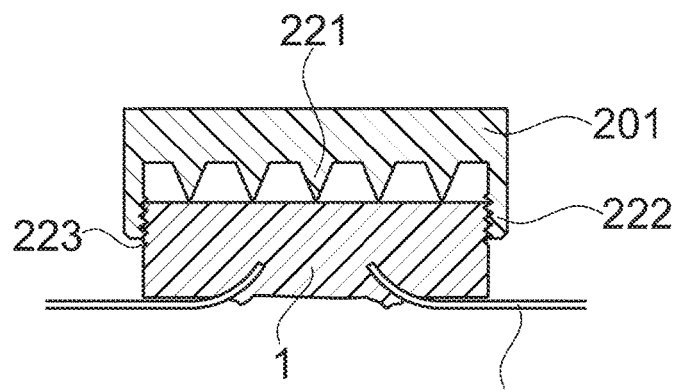

FIG. 60 shows a variant in which in addition to the protrusions, a peripheral portion 222 of the adjustment part 201 at least partially encompasses a portion of the anchoring part (here: first object 1). By this measure, the guidance of the adjustment part during the process is facilitated, and along the periphery 223 of the encompassed portion of the anchoring part another connection, for example weld, may be generated.

Figures 61A, 61B:
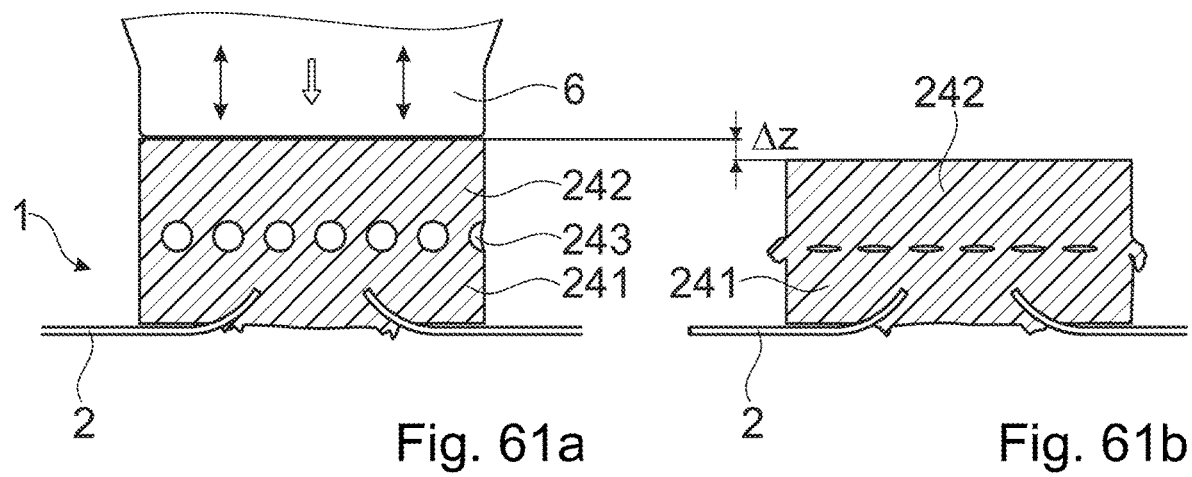
FIGS. 61*a* and 61*b* a configuration of a second object and a first object during different stages of adjusting.

FIG. 61*a* depicts another variant in which both, the anchoring part 241 and the adjustment part 242 belong to the first object 1 and are one-piece with each other. A series of cavities 243 defines a collapse zone between the anchoring part 241 and the adjustment part 242. For the process, the sonotrode 6 acting on the proximal end face of the first object couples energy into the first object 1 and presses it against the second object 2. Due to the superior energy directing characteristics of the edge of the second object 2, initially the thermoplastic material at the interface to this edge will become flowable, and the assembly will be pressed into the portion of the second object that protrudes towards the proximal side (FIG. 61*a*). Only when the distal face 12 reaches the plane part, the resistance will increase and the zone formed by the protrusions 221 will start collapsing until a desired relative z position is reached. FIG. 61*b* shows the result with a largely collapsed collapse zone. The degree to which the collapse zone is cause to collapse defines the z position adjustment.

The embodiments described referring to FIGS. 55-61 are all based on the fixing of the adjustment part relative to the anchoring part being a material fixing, i.e. after the process the adjustment part and the anchoring part are fused together.

In an alternative group of embodiments, instead the above-described concept of providing a connector piece, which may but does not need to be initially separate from the first object, is used for implementing the concept of adjusting a z-position of an adjustment part relative to an anchoring part. If the connector piece is not initially separate, the corresponding piece in this text is also denoted "body of a not liquefiable material. In this alternative group of embodiments, a relative position of a first object thermoplastic material body (which may constitute the whole first object) and the piece (connector piece, not liquefiable body) is adjustable during the process. In this, the connector piece serves as the adjustment part, and the first object relative to which it is anchored as the anchoring part.

Figure 62:
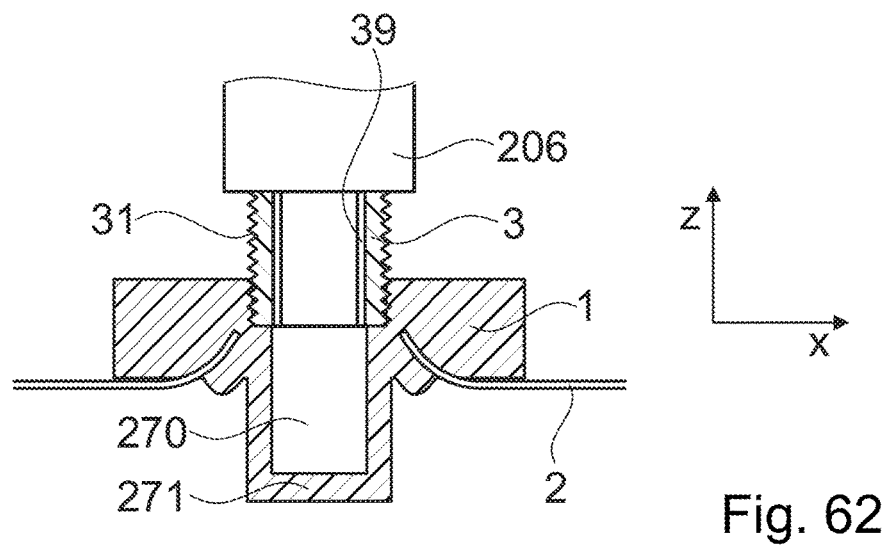
FIGS. 62-63 configurations in which a connector piece serves as adjustment part.

FIG. 62 shows a first embodiment of this concept. The connector piece 3, similarly to FIG. 7, is a nut with an inner thread 39 and outer retaining structures 31. For the step of adjusting and fixing, a sonotrode 206 may be used to press the connector piece into the first object, for example after the step of securing the first object 1 to the second object 2, and to couple vibration energy into the connector piece 3 at the same time for making portions of the thermoplastic material flowable to allow the connector piece to move into the material of the first object. The forward movement and the energy input are stopped once the connector piece 3 has reached the desired z position. After the portions of the thermoplastic material are re-solidified, by their interpenetrating the retaining structures they fix the z position and anchor the connector piece in the material of the first object 1.

In the depicted embodiment, the first object 1 is provided with an undersized (compared to the outer dimensions of the connector piece) opening 270 into which the connector piece is advanced. Optionally, as shown in FIG. 62, the opening is not a through opening but terminated by a bottom portion 271 so that the first object as in previously described embodiments provides a sealing that seals the proximal side of the second object from the distal side thereof.

Alternatively, the connector piece could 3 itself be such that the opening that carries the thread is not a through opening but a blind opening, similarly to the connector piece of FIG. 7.

In even further alternatives, a sealing between the proximal and distal sides is not necessary, as is the case in examples described further hereinafter.

Figure 63:
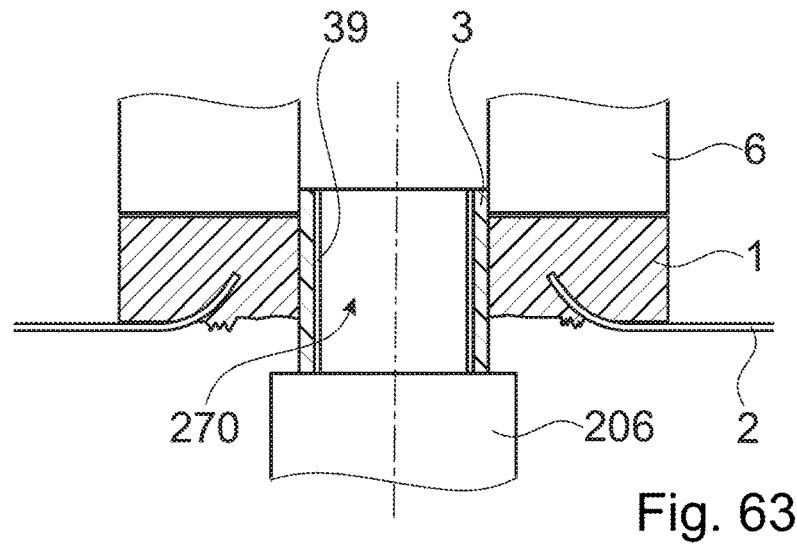

FIG. 63 shows a variant in which the opening 270 is a through opening and in which also the connector piece 3 is a nut with a through opening.

As a further optional feature of the embodiment of FIG. 63, the further, second sonotrode 206 that acts to press the connector piece into the first object and to adjust the z position acts not from the proximal side but from the distal side, i.e. not from the same side as the first sonotrode 6 that is used to secure the first object 1 to the second object 2.

Independent of whether the z position of the connector piece is adjusted from the proximal side or from the distal side, a screw or other fastener subsequently secured to the connector piece may be placed from the proximal or from the distal side.

Of course, instead of inserted/fixed by the effect of mechanical vibration, the connector piece 3 may be inserted also by being pressed or, if it has a self-locking (external) thread, by simply being screwed into the first object. The concept of adjusting the z position independent of the securing process remains the same.

Figure 64A:
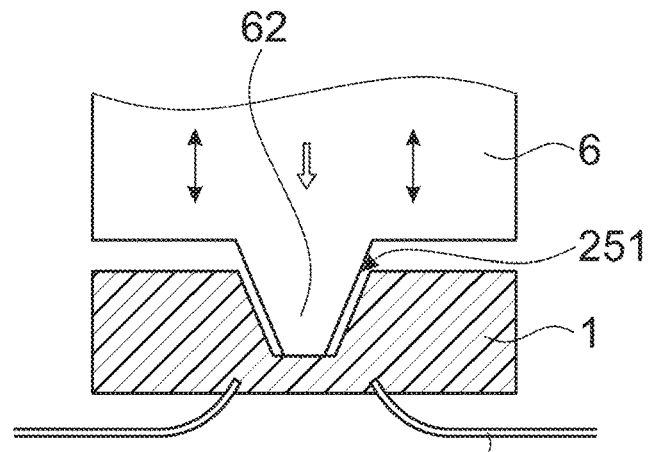
FIGS. 64*a* and 64*b* a configuration in which the connector piece has a tapered portion cooperating with a tapered opening during different stages.
Figure 64B:
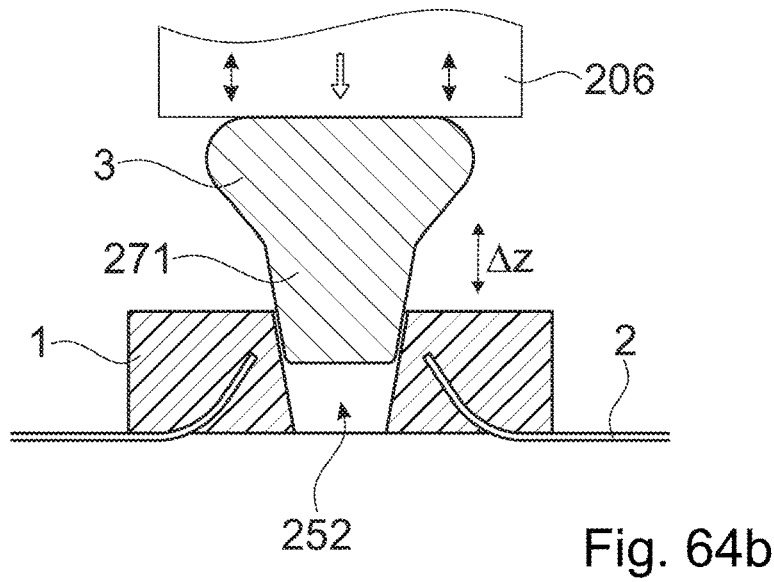

FIGS. 64*a* and 64*b* depict a configuration in which the connector piece 3 has a tapered portion cooperating with a tapered opening 252 of the first object. The degree to which the tapered portion of the connector piece 3 is pressed into the opening 252 by the sonotrode 206 defines the relative z position. As in the previous embodiments, the connector piece may include outer coupling structures/retaining structures that cooperate with liquefied and re-solidified thermoplastic material portions to yield a positive-fit fixation of the connector piece relative to the first object 1.

The following additional optional features shown in FIGS. 64*a* and 64*b* are independent of this concept and independent of each other:

- The connector piece has a head portion forming a base for a clip-on connection for a further part;
- The first sonotrode 6 has a distal protrusion 62 that is used for shaping and for example also at least partially generating the opening 252. To this end, the first object initially, prior to being secured to the second object 2, only has an undersized preliminary opening 251, so that material of the first object is displaced by the first sonotrode 6 during the process of securing to the second object 2.

The concept of FIGS. 64*a* and 64*b* may work both, with a through opening 252 or with a tapering blind opening.

Figure 65:
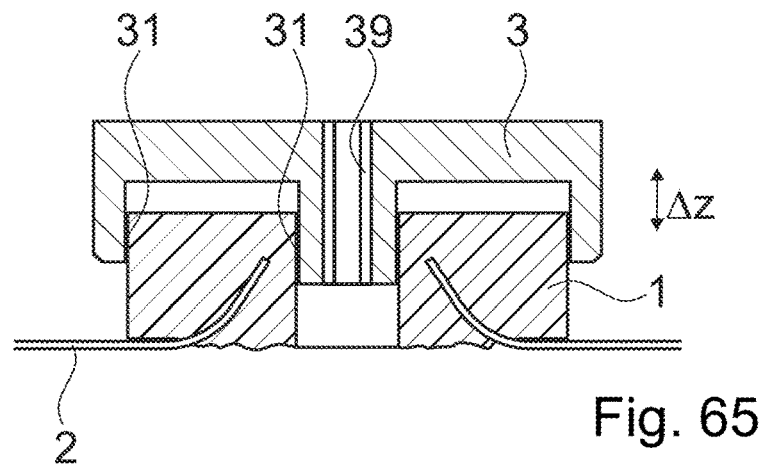
FIG. 65 another configuration in which a connector piece serves as adjustment part.

FIG. 65 shows an embodiment in which the connector piece is not just an insert (as in previously described embodiments, especially FIGS. 4*a*, 5*a*, 6-8, 15, 62-64*b*) but has a peripheral collar portion encompassing and guiding a proximally facing portion of the first object. The peripheral collar portion may be provided with inwardly facing retaining structures 31. Similarly, a central portion, here with an inner thread 39, may have outwardly facing such retaining structures for cooperating with first object material into an opening of which the central portion is pressed (see FIG. 65).

Figure 66:
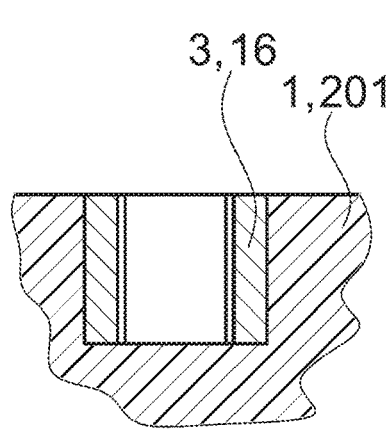
FIGS. 66-68 inserts that may serve as connector pieces or as parts of an adjustment part that also includes liquefiable material.
Figure 67:
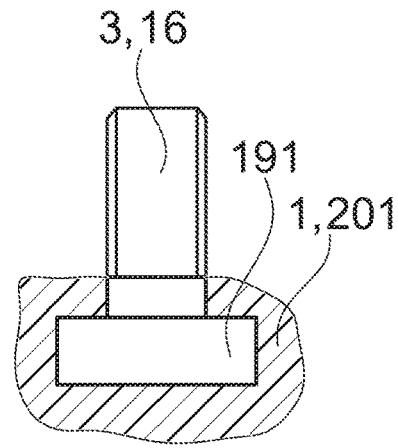
Figure 68:
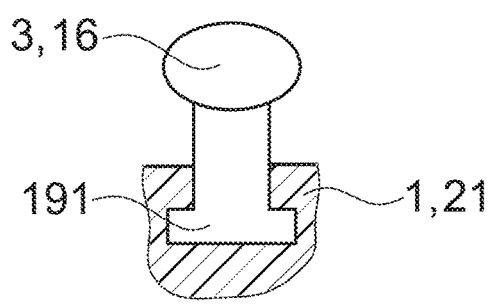

FIGS. 66-68 illustrate different coupling structures for inserts. The inserts may be inserts 16 that are present in an adjustment part 201, for example of the kind described referring to FIGS. 55-61 so that the assembly of the anchoring part and the adjustment part may serve as anchor for connecting a further part to the second object. Alternatively, the inserts may be inserts that are bodies of not-liquefiable material in the sense described hereinbefore. As yet another alternative, the inserts may be connector pieces for example serving as adjustment parts in the hereinbefore discussed sense.

In FIG. 66, the insert is a nut with an inner thread and for example outer retaining structures. In FIG. 67, the insert includes a threaded bar to which a nut or other piece can be screwed. An anchored part 191 is embedded in the thermoplastic material of the first object 1 or adjustment part 201, respectively. FIG. 68 similarly shows an insert with a fastening head for a clip on connection. Other structures would of course also be possible.

Instead of being fastened to the thermoplastic material by having a portion that is embedded in it, also other connections, including releasable connections, are possible. For example, the insert and the first object/adjustment part may be provided with a bayonet coupling structure, whereby the insert can be inserted in a coupling recess and secured by a twisting movement.

The concept of adjusting a z-position of an adjustment part relative to an anchoring part hereinbefore has primarily been described referring to embodiments in which securing the first and second objects to each other is carried out prior to the step of adjusting the z position. In embodiments in which this is the case, the steps of securing and of adjusting may optionally be carried out at different locations, for example at different stations of a manufacturing line.

According to a further group of embodiments, adjusting the z-position may be carried out prior to securing. For example, initially measurement data concerning particulars of the second object (or an assembly that includes the second object) and/or particulars of any other part (first object, other object to be secured to the first object) may be obtained. Based on this, the desired z-adjustment may be calculated in advance. Then, the z-adjustment may be carried out, for example based on any concept described in this text. Only after the z-adjustment has been carried out, in these embodiments the securing takes place.

Figure 107:
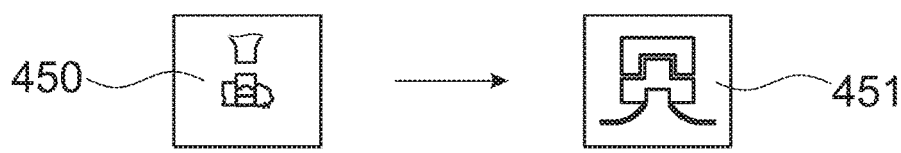
FIG. 107 a two station manufacturing line.

This sub-concept may be used for separating the steps in a manufacturing process. Especially, if the second object is comparably large or belongs to a comparably large preassembly (for example a vehicle body), this may be advantageous because then the z-adjustment step may be carried out at a much smaller station and does not delay the main process. This principle is very schematically illustrated in FIG. 107, in which 450 illustrates a z-adjustment station and 451 illustrates a securing station.

FIG. 121 shows a flowchart of a possible process according to embodiments of the invention which process includes an adjustment of the position of a connector (or similar) with respect to the second object for example for tolerance compensation.

After start (S), in a first step 701 a possible tolerance mismatch is measured. Thereafter, a correct position or a position correction is calculated (Step 702). If the connector or other functional part belongs to the first object and is integral with it, thereafter the first object and the second object are positioned with respect to each other in the calculated corrected position x,y,z, (angle) (Step 703); for example minus a z-offset accounting for a relative movement of the first and second objects during the subsequent step. Then, the securing step 704 for securing the first object to the second object is carried out as described in this text.

If, however, the connector includes an anchoring part and an adjustment part (if it is not one-piece or includes a collapsible/expandable zone for example), a further distinction is made. In a first group, the a position of the adjustment part relative to the anchoring part is adjusted (step 706) and fixed (step 707) prior to the securing step 708 in which the anchoring part is secured to the second object. The adjusting/fixing steps, which may optionally be combined, may be carried out at a same station as the subsequent securing step, or may be carried out at a different station.

In a second group, firstly the securing step 7011 securing the anchoring part to the second object is carried out, and then the adjustment and fixing steps (that again may be combined) are carried out.

In embodiments of both groups, the fixing step and possibly also the adjustment step may be combined with the securing step, as explained hereinbefore.

In embodiments of the second group, in contrast to what is shown in the flowchart, the measurement and calculation steps 701, 702 may be carried out after the securing step 711.

In embodiments with or without z-adjustment, the extension of the connection in z-direction may be an issue. For example, the first object may be a connector or belong to a connector for fastening a further object to the second object, and this further object needs to be relatively close to the second object (low height connection).

For example the embodiments of FIGS. 62, 63, 64b, 65 address this issue by providing the first object with an extending portion that extends into the perforation 20 of the second object and through the sheet plane (if defined), and by for example providing this portion of the first object with a retaining structure (inner thread 39) or other attachment structure for securing a further object to the second object via the first object.

Figure 116:
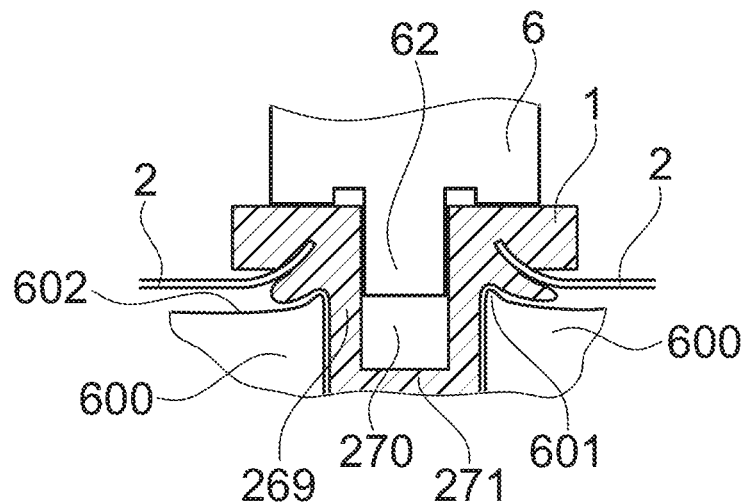
FIGS. 116-118 further configurations with an anvil.

An even further embodiment is illustrated in FIG. 116. The first object has a structure similar to the structure shown in FIG. 62. In contrast to this embodiment, an anvil 600 is used. The anvil includes radially-inwardly of the edge (referring to a center of the perforation) a directing protrusion that directs material flow distally of the second object 2 edge towards radially outwardly into an annular receiving depression 602. The anvil includes a recess for accommodating the extending portion 269 that extends into the perforation and includes the opening 270.

The sonotrode 6 shown in FIG. 116 includes a guiding protrusion 62 cooperating with the opening 270 to guide the sonotrode and further implements the principle described hereinafter for example referring to FIG. 87. Both these features are independent of other features of the embodiment of FIG. 116 but may assist an optimized securing process.

Figure 117:
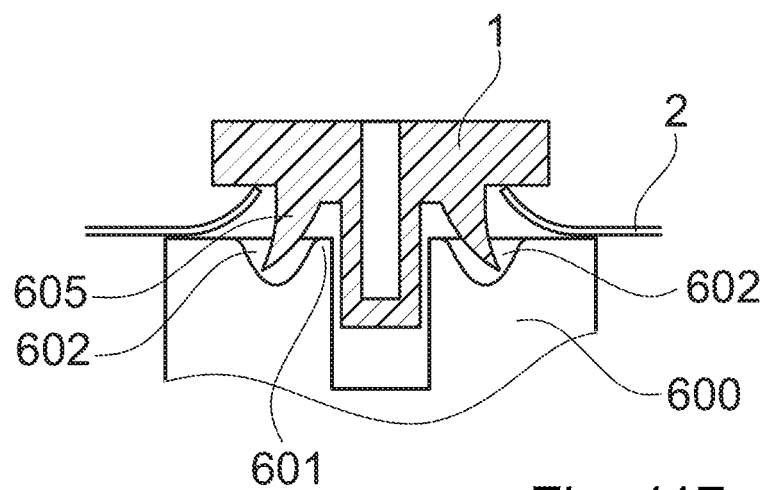
Figure 118:
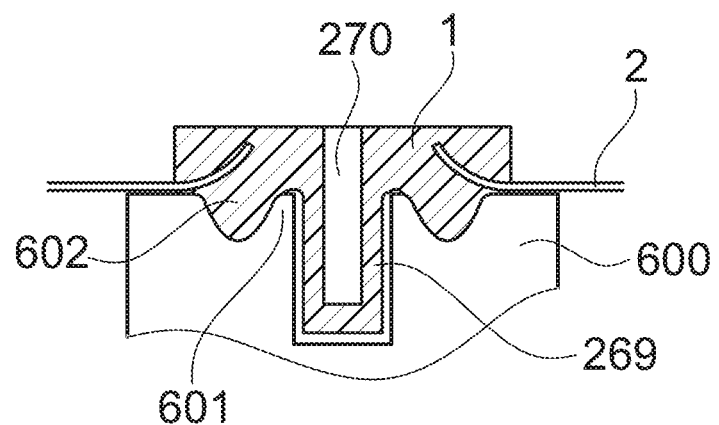

FIG. 117 shows yet another embodiment (the sonotrode is not shown in FIG. 117). Similarly to the embodiment of FIG. 116, an anvil is used to direct material flow, and the anvil has a recess (which could alternatively to the shown embodiment be a through opening) for accommodating the extending portion 269.

A possible principle of any embodiments that include an anvil is also illustrated in FIG. 117. A volume of the receiving indentation 602 (below the dashed line in FIG. 117) may be chosen to be somewhat smaller than a volume of the thermoplastic material portion available for flowing.

In FIG. 117, this available material portion corresponds to the volume of an annular protrusion 605 of the first object. If the volume of the receiving structure of the anvil is smaller than the available volume of the thermoplastic material, by applying a pressing force between the first object on the one hand and the second object and anvil on the other hand a beneficial shaping pressure may be achieved.

Figure 111:
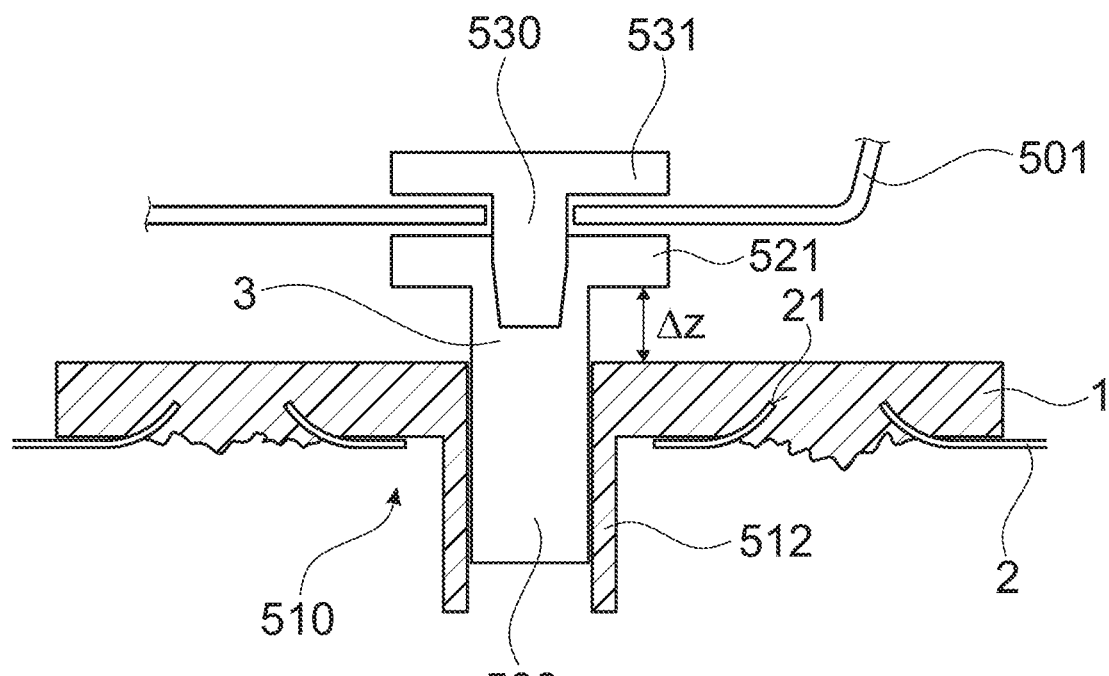
FIGS. 111-113 configurations, in which the second object has an extension opening.
Figure 112:
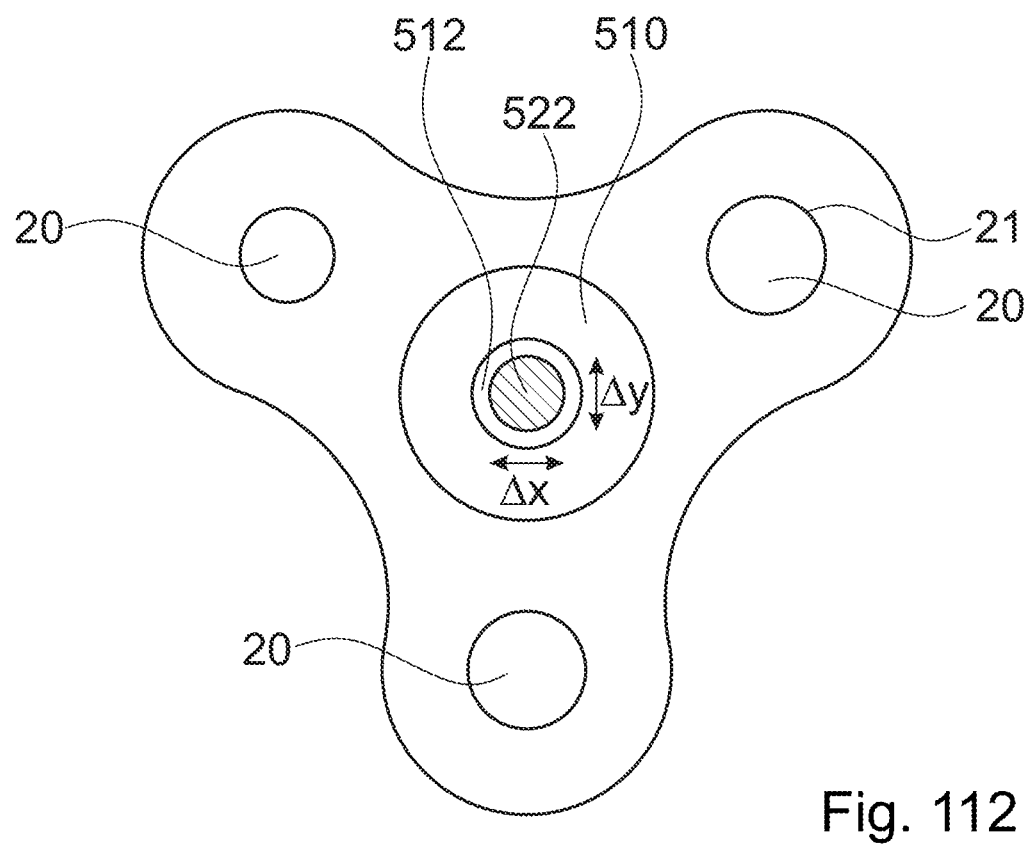

A further option is sketched in FIGS. 111 and 112. The second object in addition to at least one perforation 20 (three perforations 20 in the depicted embodiment), along which the edge 21 extends, also includes an extension opening 510.

In contrast to the locations of the perforation(s), the second object does not project towards the side of the first object along the extension opening 510. Therefore, the first object's z-extension around the extension opening may be chosen freely, depending on the requirements. Also shape and dimensions of the fastening opening may be chosen independently of any properties required for the securing process.

In the embodiment of FIGS. 111 and 112, the first object 1 is has an extending portion being a collar 512 extending into the opening through the mouth of the extension opening 510. The collar may be essentially tube-shaped, as illustrated in the figure. The connector piece 3 extends into the extension opening. The connector piece 3 cooperates with a joining element 530 to secure a further object 501 to the second object. To this end, the joining element 530 is illustrated to have a head portion 531 to clamp the further object 501 to the connector piece. Other structures for securing the further object 501 to the connector piece could be applied alternatively or in addition to the illustrated one.

The connector piece 3 includes a head portion 521 and a shaft portion 522, wherein the shaft portion can be secured to the collar 512 in different z positions, as illustrated by the double arrow Δz. The mechanical connection between the collar 512—or more generally: the first object—on the one hand and the shaft portion 522—or more generally: the connector piece 3—on the other hand may be any suitable connection, including a screwed connection, other kinds of positive-fit connection and/or force fit connection a material connection (such as a weld or an adhesive connection or a soldered connection), etc.

FIG. 112 moreover illustrates that the dimension of the collar that extends through the mouth of the extension opening 510 may be such that some adjustment of the in-plane position (x-y-position) of the first object relative to the second object is possible.

Figure 113:
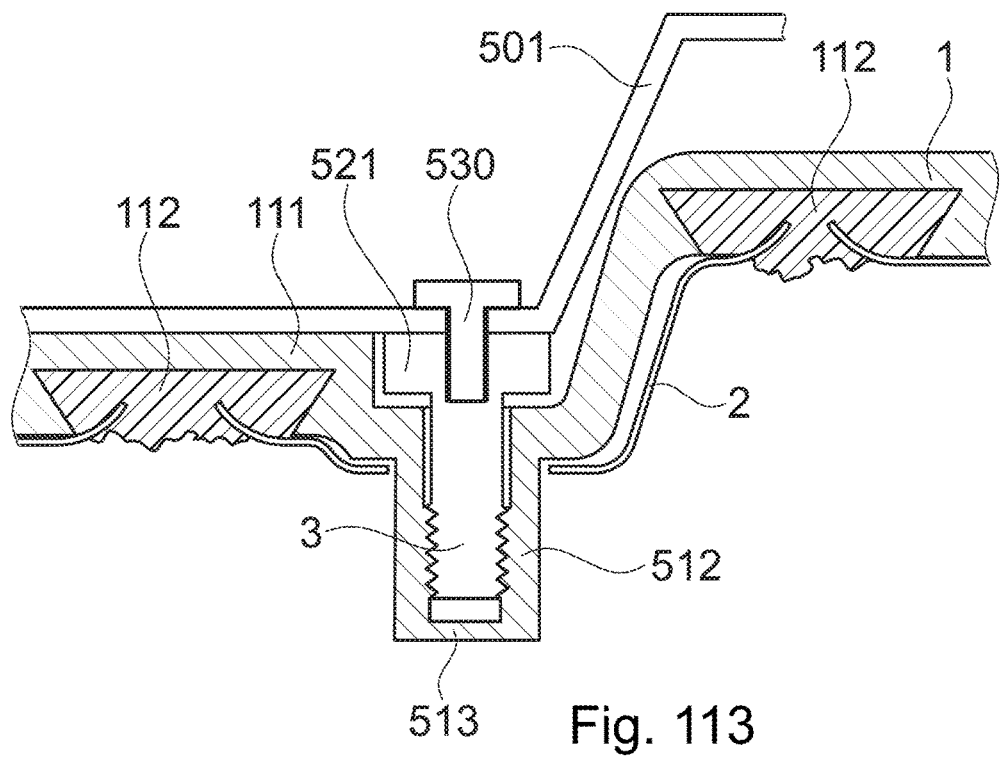

FIG. 113 shows a variant of the configuration of FIGS. 111 and 112 in which the following additional features are realized:

- The second object 2 and/or the further object are not essentially plane but have an arbitrary 3D-shape. Accordingly, a sheet plane is defined only locally around the perforations 20 and around the extension opening. The shape of the first object is accordingly adapted.
- The extending portion of the first object that extends through the mouth of the extension opening and away from the side of the further object 501 is not a collar open towards this side, but the collar 512 is closed-off towards by a bottom portion 513.
- The first object 1 does not consist of the thermoplastic material but includes a first portion (body) constituting a functional zone 111 and second portions constituting attachment zones 112. The functional zone may be of a different material than the attachment zones, especially a non-thermoplastic material. Thereby, the functional zone material may for example have a superior dimensional stability. Especially, the functional zone may be metallic or of a harder plastic material than the thermoplastic material of the attachment zones, such as a composite material.
- Especially, the second portions 112 that constitute the attachment zones may be held relative to the first portion constituting the functional zone by a positive-fit, optionally in addition to other connection, such as adhesive connection. In FIG. 113, the first portion is depicted to have undercut indentations that are filled by the thermoplastic that constitutes the second portions 112.
- In FIG. 113, the first object 1 is depicted to form a fastening structure being an inner thread that cooperates with an outer thread of the connector piece. Other fastening structures, including a sequence of bayonet fitting like structures at different depths, glue channels, etc. are possible.

These features are independent of each other, i.e. it would be possible to realize them individually or in any combination.

Referring to FIGS. 73-79, the principle of providing the contact side with structures, for example a pattern of indentations and protrusions, for reducing the required energy and force inputs, is described.

Figure 73:
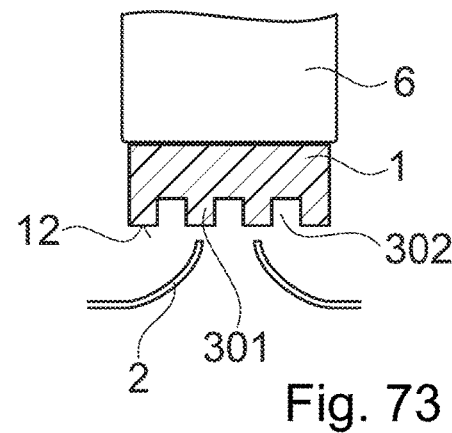
FIG. 73-76 configurations implementing the principle of providing the contact side with structures.

FIG. 73 shows an arrangement of a first object 1, a second object 2, and a sonotrode 6 positioned proximally of the first object 1. The first object on the contact side (distal side in the shown arrangement) has a pattern of protrusions 301 and, between the protrusions, indentations 302. Thereby, the flow portion of the thermoplastic material that flows relative to the second object during the process has a space to flow to. This is in contrast to embodiments without the structure on the contact side, where excess material displaced by the second object has to be squeezed out either through the perforation or sideways or has to flow back towards the second object against the pressing direction, in which case the forces and energy to be applied need to be higher.

Figure 74:
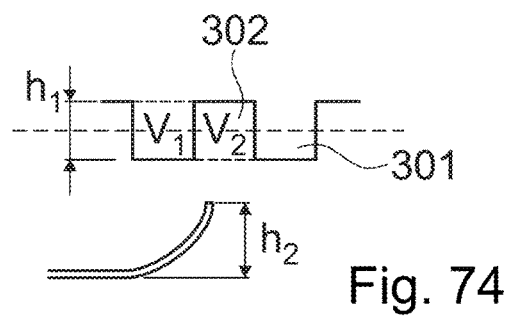

As shown in more detail in FIG. 74, the following possible design criteria may apply:

- The overall volume $V_1$ of the protrusions may be approximately equal to the overall volume $V_2$ of the indentations, i.e. the middle plane of the contact side surface may be at approximately equal distances from the peaks and valleys of the protrusions and indentations, respectively.
- The depth $h_1$ of the indentations may be smaller than the height $h_2$ of the protruding section. This design criterion especially applies of the connection between the first and second object has to be sealing.

These criterial are independent of each other.

Figure 75:
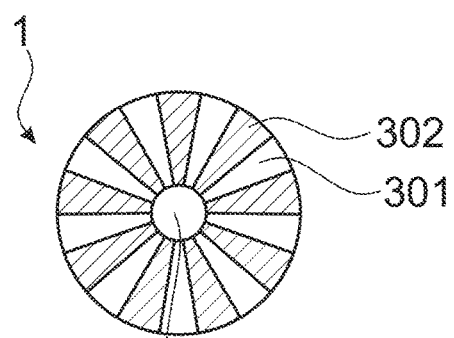
Figure 76:
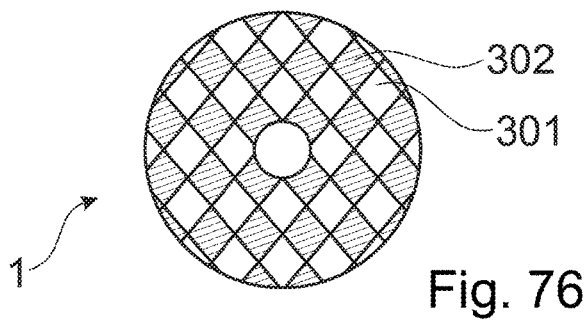

FIGS. 75 and 76, schematically showing views of the first object from the contact side, show possible patterns of indentations/protrusions. The radial pattern of FIG. 75 includes indentations 302 and protrusions 301 that run radially from a central portion 304, which central portion in the process is aligned with the perforation of the second object and has a smaller diameter than the latter. FIG. 76 illustrates a chess board like pattern.

Figure 77:
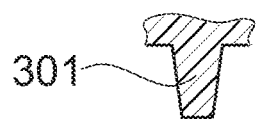
FIGS. 77-79 different cross sections of protrusions of first objects that implement the principle illustrated in FIGS. 73-76.
Figure 78:
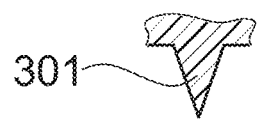
Figure 79:
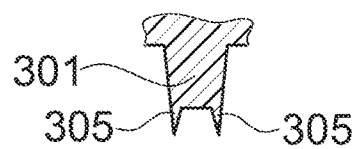

FIGS. 77-79 show alternative cross sections of protrusions that form the pattern of protrusions and indentations. The cross section shape of FIG. 77 is similar to the rectangular shape of FIGS. 73 and 74 but is slightly tapered. FIG. 78 illustrates a pointed shape that has energy directing properties (in many embodiments, the energy directing properties of the edge of the second object are sufficient but additional energy directing properties of the first object may be beneficial in some situations). FIG. 79 shows a combination that includes a rectangular-cross-section main body of the protrusion 301 plus energy directing ridges 305.

Figure 80:
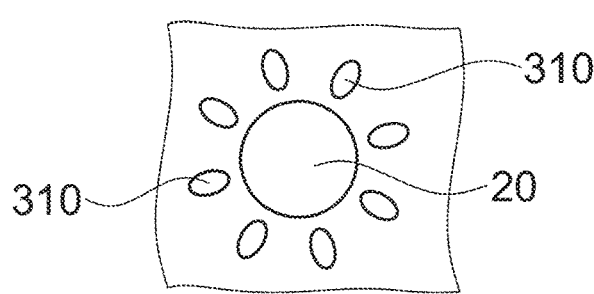
FIGS. 80 and 81 a configuration with the second object having a main perforation and a plurality of peripheral perforations.
Figure 81:
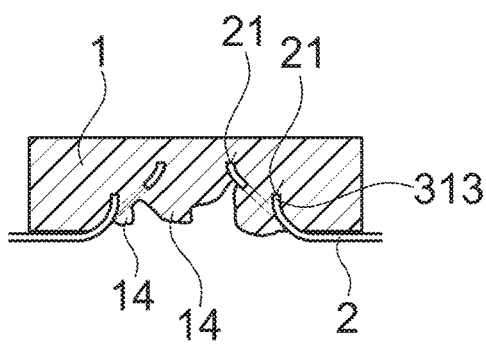

In FIGS. 80 and 81, an embodiment of a second object having a main perforation 20 and a plurality of peripheral perforations 310 distributed along a periphery of the main perforation is depicted. FIG. 80 shows a top view on a second object, and FIG. 81 shows a first object 1 attached to the second object 2 after the process. The peripheral perforations are smaller than the main perforation and are arranged in a section of the second object that projects away towards proximally from a second object sheet plane, i.e. the peripheral perforations are arranged where the sheet material is sloped with respect to the sheet plane (see FIG. 81). Moreover, the sheet along one or more of the peripheral perforations is deformed to project away, especially towards proximally, from the curved surface defined by the projecting section, as illustrated in FIG. 81, where a peripheral perforation deformed section 313 is illustrated to be bent towards proximally with respect to the dashed line illustrating the curved surface.

Figure 82:
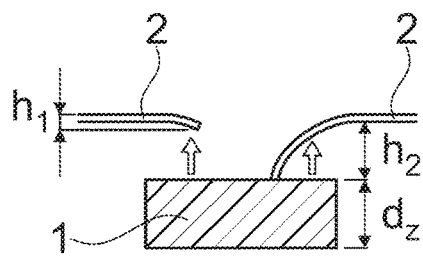
FIGS. 82-84 configurations with a second object having an asymmetrical deformed section.

FIG. 82 illustrates an embodiment in which the deformed section of the second object along the periphery is asymmetrical in that the height h of the projecting section differs as a function of the position along the edge of the second object. In the shown sectional view, the relation $0 \leq h_1 < h_2 < d_z$ holds.

Figure 83:
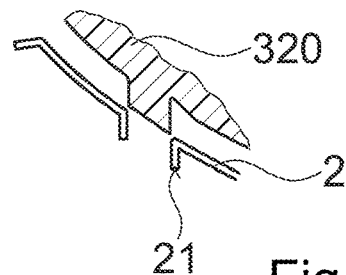

An asymmetrical deformed section like the one in FIG. 82 may be desired for example if asymmetrical loads are to be expected to impinge on the connection between the objects. An asymmetrical deformed section may also be present because of manufacturing conditions. For example, the fastening axis (proximodistal axis; vertical axis in FIG. 82) may be different from a deformation axis, especially if the second object is not just plane but has a more complicated, 3D shape on a large scale. FIG. 83 illustrates this very schematically by showing a punching tool 320 that causes the perforation and the deformation leading to the deformed section around the perforation.

Figure 84:
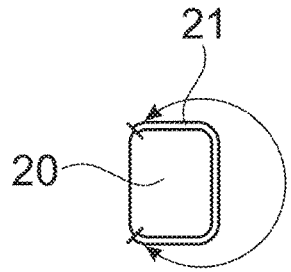

If the deformed section does not run around the full periphery, i.e. if there are portions with h=0, a possible condition may be that the deformed section extends by more than 180° around the periphery, as illustrated in FIG. 84. Depending on the application and the configuration, this need not be the case, however (c.f. for example FIG. 15).

Figure 85:
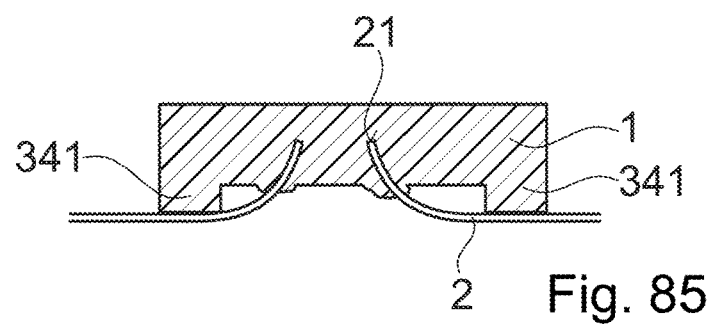
FIGS. 85 and 86 the principle of z position control by the first object having a spacer.

FIG. 85 illustrates the possibility of z position control by an appropriately shaped first object contact side. The first object has a distally facing foot portion 341 peripherally of the location where it comes into contact with the edge of the second object. The foot portion is also placed more laterally than the projecting section of the second object, whereby, when the first and second objects are pressed against each other when the vibration impinges, a relative movement of the first and second objects against each other can be caused until the foot portion abuts against the sheet portion where the sheet plane is defined. Thereby, the z-position of the first object relative to the second object is defined by the dimension of the foot portion that serves as a spacer.

Figure 86:
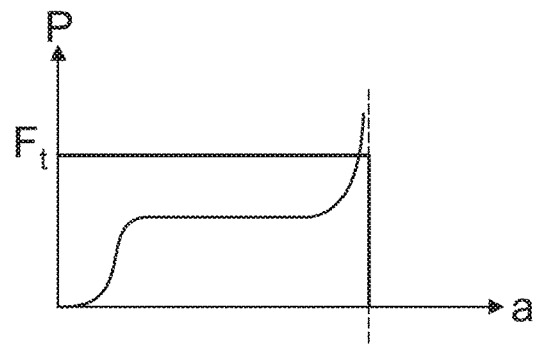

FIG. 86 shows a simplified process diagram. The pressing force F, shown as a function of the relative position a, required to move the first and second objects against each other rises strongly when the foot portion abuts against the second object (dashed line). This may be used for defining a threshold force $F_t$. As soon as the required force reaches the threshold level, the process may be stopped.

Figure 87:
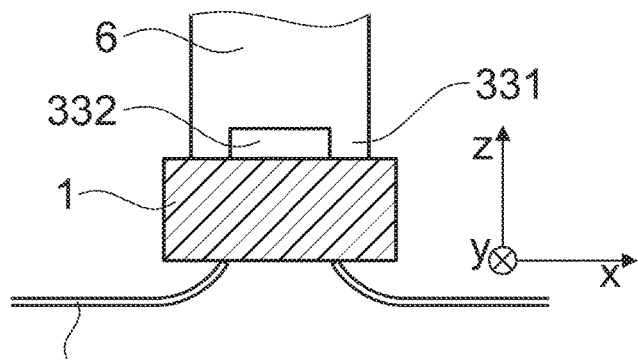
FIGS. 87-91 configurations implementing the principle of restricting the coupling face between a sonotrode and the first object to a region tailored to the shape and location of the second object.

FIG. 87 illustrates the principle of restricting the coupling face between the sonotrode 6 and the first object 1 to a region the in-plane (x-y-) extension of which is restricted to a region tailored to the shape of the second object and to the location of the edge. For example, the coupling face may be restricted to a lane following the course of the edge of the second object 2. In embodiments with a perforation along which the edge is formed, the coupling face is ring shaped with a central opening.

To this end, in FIG. 87 the sonotrode is formed to include a distal ring shaped protrusion 331, whereby a central hollow space 332 is formed during the process.

Figure 88:
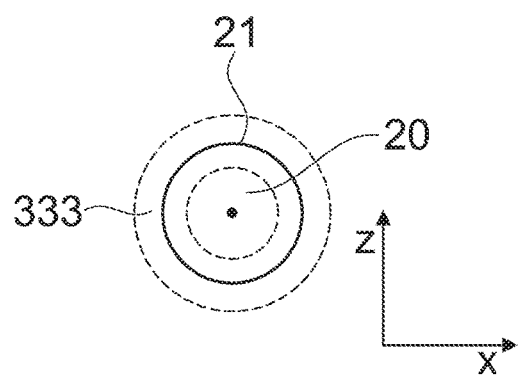

As shown in FIG. 88, showing a schematical vertical protection, the coupling face 333 (dashed lines) extends to both sides of the edge 21.

Figure 89:
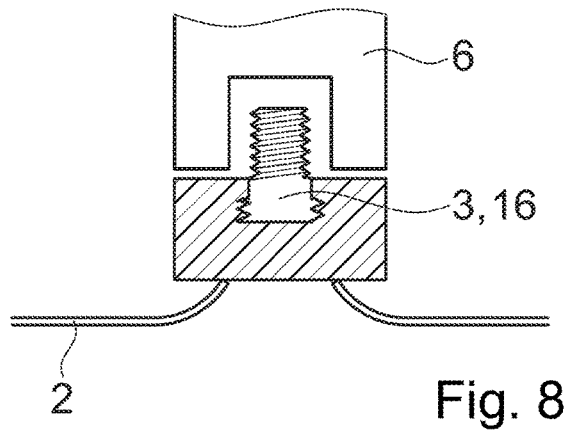
Figure 90:
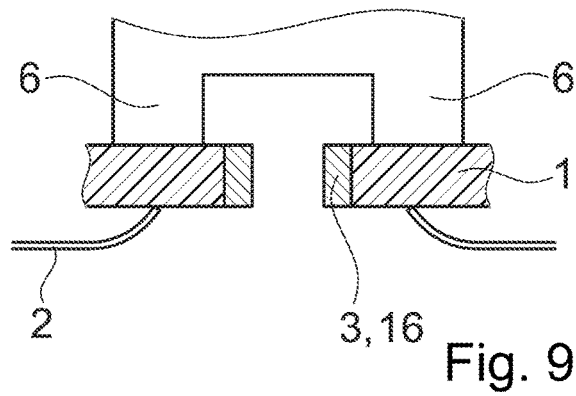

Such a construction with a sonotrode forming a hollow space may feature the additional benefit of making possible that a functional element that may be centrally located with respect to the perforation 20 does not come into direct contact with the sonotrode. FIG. 89 illustrates an example of a first object including a connector piece 3 being a threaded bar, whereas FIG. 90 shows a first object with a bushing as connector piece 3.

Figure 91:
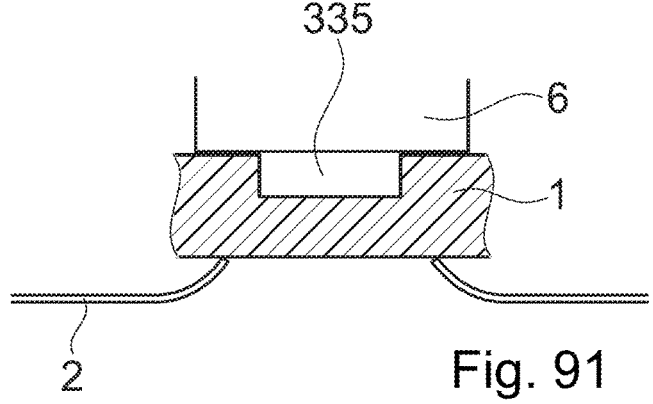

FIG. 91 shows that the principle of restricting the coupling face does not need to be implemented by shaping the sonotrode correspondingly, but that in addition or as an alternative the proximal face of the first object 1 may be shaped to define the coupling face. In FIG. 91, the first object forms an indentation 335 to be aligned with the perforation 20 in the second object 2. In FIG. 91, the distal outcoupling face of the sonotrode 6 is shown to be essentially flat; other shapes would be possible also, for example including a guiding protrusion engaging with a guiding indentation of the first object (not shown).

In a group of embodiments, also, but not only, embodiments in which the coupling face is adapted to the location of the perforation and the edge, the method includes adjusting a position, especially an in-plane (x-y-) position of the first object and/or of the sonotrode relative to the second object.

Figure 92:
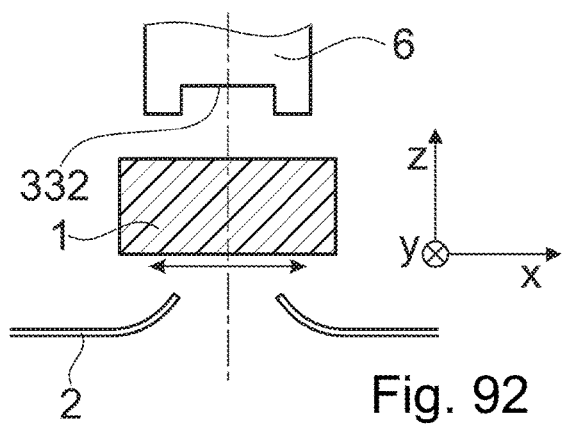
FIGS. 92 and 93 two basic configurations for adjusting an in-plane position.

In a first sub-group of this group, the position of the sonotrode 6 with respect to the second object 2 is defined, for example by the machinery including a mounting frame. This first sub-group is schematically shown in FIG. 92. The position of the first object 1, which may be arranged between the sonotrode and the second object 2, may be adjustable. The precision, by which the position of the first object may need to be adjusted, strongly depends on the nature and function of the first object and on the requirements.

Figure 93:
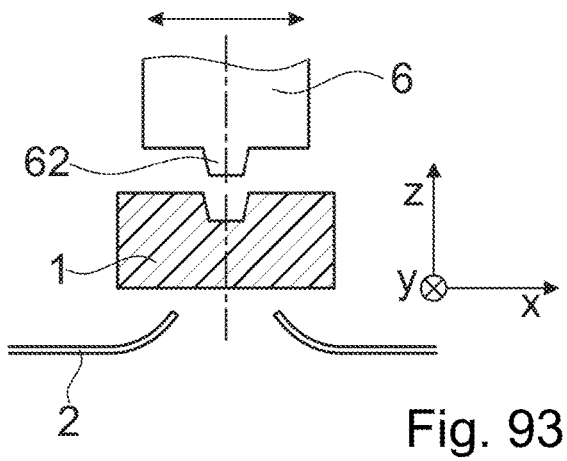

A second sub-group of embodiments includes defining the position of the first object 1 relative to the sonotrode 6. The position of the first-object-sonotrode assembly relative to the second object may be adjustable. Again, the precision by which the x-y-position needs to be adjusted, may strongly depend on the structure and requirements. FIG. 93 schematically illustrates the principle of the second sub-group. The relative in-plane (x-y-) positions of the sonotrode and the first object are fixed by a guiding protrusion 62 of the sonotrode cooperating with a corresponding guiding indentation of the first object. However, other means for defining a relative in-plane position exist.

Figure 94:
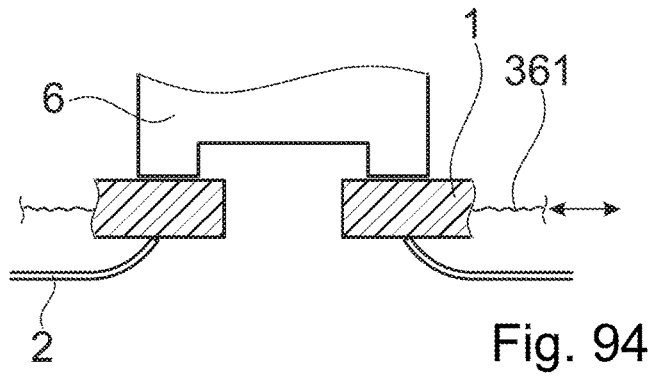
FIGS. 94 and 95 embodiments of the basic configuration of FIG. 92.
Figure 95:
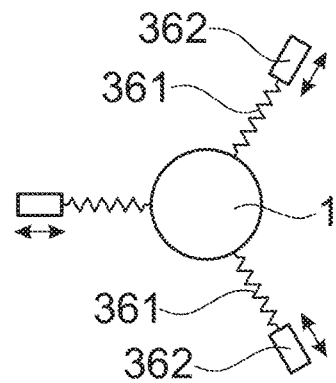
Figure 96:
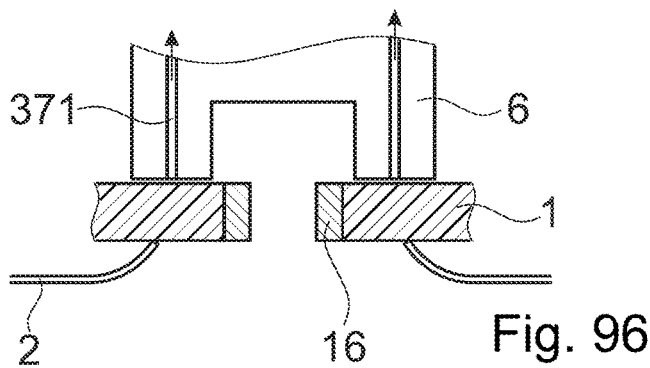
FIGS. 96-102 embodiments and principles of the basic configuration of FIG. 93.

FIGS. 94 and 95 refer to the first sub-group and illustrate a possible set-up for holding and positioning the first object for the process. The principle shown is similar to the one illustrated in FIGS. 50a and 50b. A possible requirement is that the means that guide the first object need to be such as to vibrationally de-couple the first object from the frame-work (for example constituted by a holding frame or a casing) with respect to which they are mounted. In FIGS. 50a and 50b, this is achieved by the shape of the guiding tool. FIGS. 94 and 95, as an alternative thereto, illustrate guiding tools being springs 361 that are mounted on adjustment tools 362 at least some of which have an adjustable x-y-position. The set-up may for example include three or four such adjustment tools 362 with springs distributed around the periphery of the first object 1. In case four adjustment tools are present, the adjustment tools that are at opposite positions may be coupled with each other and be movable together.

Figure 97:
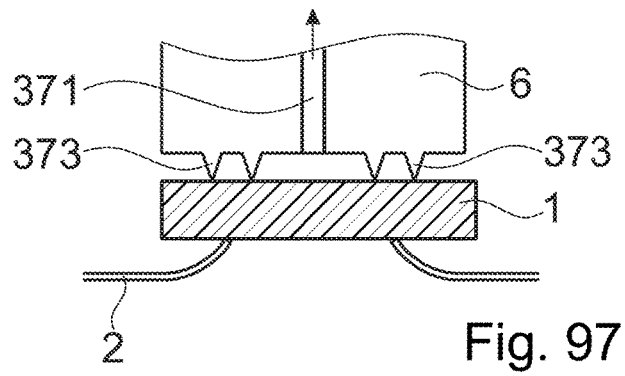

FIGS. 96-100 refer to the second sub-group of embodiments and illustrate structures defining and fixing, for the process, the in-plane position of the first object 1 relative to the sonotrode 6. According to FIG. 96, the sonotrode may be provided with suction channels 371 through which a vacuum can be applied, whereby the first object may be caused to temporarily stick to the proximal face of the sonotrode. As shown in FIG. 97, a combination of at least one such suction channel 371 with fixations possible. The sonotrode 6 of FIG. 97 for example includes guiding tips 373 that penetrate into the first object 1 and thereby fix the lateral position. The penetration into the first object may be caused by a vacuum applied to the suction channel and/or by a pressing force, possibly vibration assisted. In the latter case, material of the first object may locally be made flowable for the penetration of the guiding tips by the energy input.

If instead of pointed guiding tips 373, the sonotrode (or the first object) includes an annular ridge, the pressing of the first object and the sonotrode against each other also addresses the possible issue of leakage when vibration is coupled into the sonotrode. Otherwise, the suction velocity has to be sufficient to compensate for such leakage to maintain the vacuum.

The guiding tips 373 or other penetrating guiding means need not be undercut. An in-plane guidance and possibly also a temporary full fixation may be caused by the guiding means reaching into material of the first object, in the latter case for example in a Morse cone like situation (the shape of the guiding means being appropriately chosen).

A vacuum that sucks the first object towards the sonotrode 6 may be switched off after the guiding tips (or other penetrating guiding means) have penetrated the first object.

Figure 98:
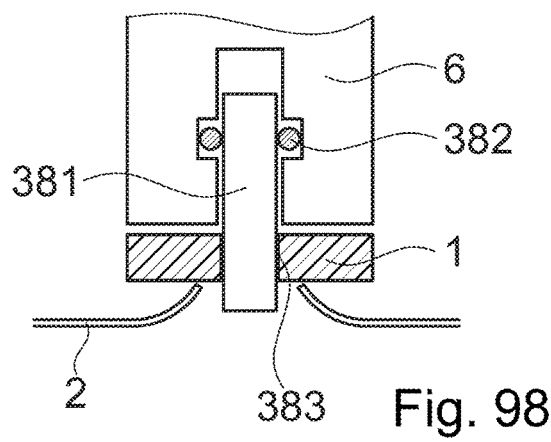

FIG. 98 shows a further possibility. A guiding element 381, here being a guiding rod is laterally guided both, relative to the sonotrode 6 and relative to the first object 1. A first bearing 382 in the sonotrode is constituted by an O-ring being a loose fit bearing, and a second bearing 383 is a tight-fit bearing relative to the first object, wherein by the second bearing the guiding element is also held with respect to axial movements. Because one of the bearings (the first bearing 382 in the depicted embodiment) is only a loose fit bearing, the vibration energy that is transmitted via the guiding element is minimized.

Figure 99:
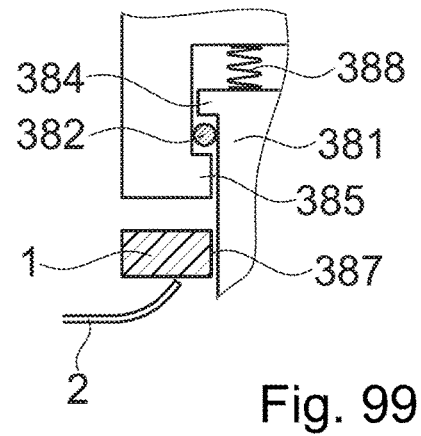

In the variant of FIG. 99, both, the first bearing 382 and the second bearing 387 are loose fit bearings. An axial support is given by an inward flange 385 of the sonotrode 6 and an outward flange 384 of the guiding element 381 that cooperate with the O-ring that constitutes the first bearing to prevent the guiding element 381 from breaking loose from the sonotrode 6. An optional spring 388 may ensure that the axial position relative to the sonotrode remains defined. The guiding element 381 of the embodiment of FIG. 99 is, like the one of FIG. 98, essentially cylindrical with the exception of the outward flange 384. The cylinder symmetry is not necessarily the symmetry of a rotational cylinder; a deviation from rotational symmetry may cause a guidance also with respect to rotational relative movements.

Figure 100:
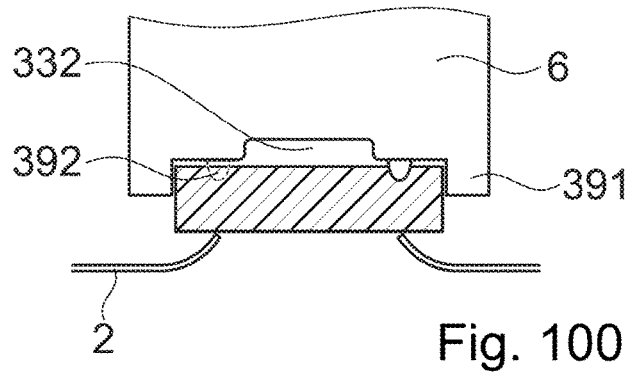

FIG. 100 shows an embodiment in which the first object is guided by a peripheral flange 391 of the sonotrode instead of (or in addition to) a guiding protrusion. The dashed lines show optional additional conical penetrating guiding elements 392 that during the process may penetrate into material of the first object.

Figure 101:
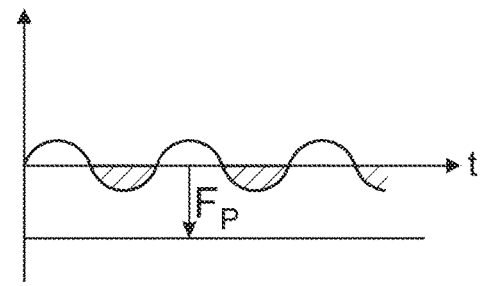

FIG. 101 illustrates that when a sonotrode couples mechanical vibration into the first object, the contact force between the first object and the object against which it is pressed by the sonotrode, namely the second object, varies periodically. During the lower half-wave (illustrated by the shaded areas), the contact may be very weak or even be loose, and this may cause an uncontrolled sideways shifting ("swimming") of the first object during the process absent any guiding means. This could be addressed by pressing the sonotrode with a higher force against the first object. However, this influences the vibration coupling properties, and therefore the pressing force may be a parameter that is not arbitrarily choosable. If however, an additional pressing force $F_p$ acts on the first object, the problem is solved (arrow in FIG. 101) if this additional pressing force is sufficient to compensate for the "lift-off" effect during the lower half-wave periods.

Figure 102:
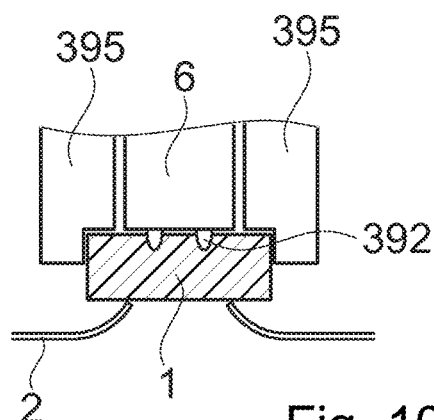

An according set-up is illustrated in FIG. 102, where a hold-down tool 395 is illustrated in addition to the sonotrode. The hold-down tool in the depicted embodiment has an optional peripheral guiding flange. Also, the sonotrode is depicted to have at least one also optional conical penetrating guiding element 392.

For the process, it is sufficient if the hold-down tool 395 acts on the first object during an initial stage. As soon as the edge of the second object has penetrated the first object to some depth, the hold-down force is not required any more. Therefore, the hold-down tool does not necessarily need a forward drive mechanism for maintaining the pressing force when the first object is moved towards distally during the process.

The embodiment of FIG. 102 may belong to the second sub-group, or it may belong to a further sub-group with first and second objects having a pre-defined position relative to one another (the first object position being fixed by the hold-down tool), and, with the sonotrode position being adjustable.

Figure 103:
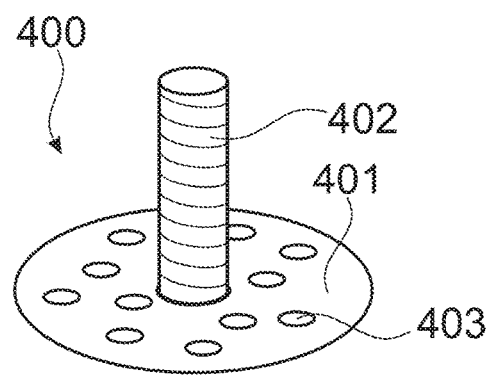
FIG. 103 a fastener as an example of a second object.

FIG. 103 depicts a fastener 400 having an anchoring plate 401 (or "fastener head") and a fastening element 402 bonded thereto. The fastening element can have any property of a state-of-the art fastener such as a threaded bolt (as depicted) a bolt without a thread, a pin, a nut, a hook, an eyelet, a base for a bayonet coupling, etc. The fastener may in this be constituted essentially like a fastener sold under the trade name "bighead" and intended to be glued to a surface of another object.

A fastener of this kind in a process of the invention may serve as a second object. Especially, the anchoring plate 401 may be viewed as sheet portion and may be provided with a plurality of openings 403 along which an edge extends. This edge and/or the peripheral edge of the anchoring plate may be used as the edge in the approach according to embodiments of the invention. To this end, the anchoring plate along the respective edge may be deformed to be bended, especially towards the side from which the first object is to be brought into contact with the anchoring plate for the process.

Figure 104:
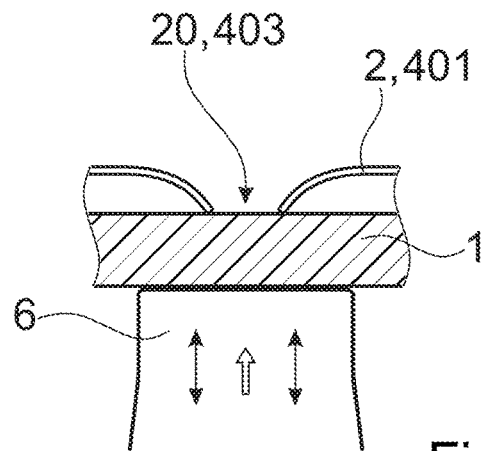
FIGS. 104-106 principles of coupling mechanical vibration into the second object.

FIG. 104 very schematically depicts a first possibility in which the circumstances allow the mechanical vibration to be applied from the first object 1 side. The anchoring plate 401 is bent towards the first object side (for example, but not necessarily corresponding to the lower side in the orientation of FIG. 103), whereby a bonding in the region of the opening(s) 403 may be caused, essentially as described hereinbefore.

In many configurations with a fastener of the kind mentioned referring to FIG. 103 it will not be possible or not be advantageous to couple the vibration into the first object, for example because the first object is a larger object, its backside is poorly accessible and/or for other reasons. Then, the vibration may be coupled into the second object. To this end, the sonotrode 6 used for coupling the vibration into the assembly may be appropriately shaped.

Figure 105:
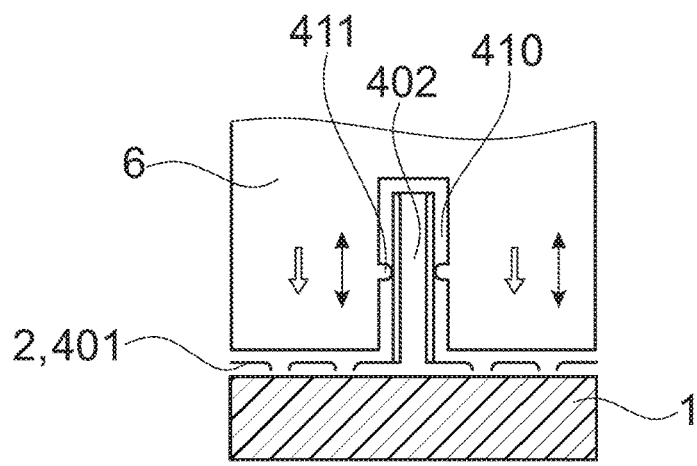

FIG. 105 very schematically illustrates a first possibility. The sonotrode has a receiving opening 410 having a mouth in the distal outcoupling face, in which the fastening element 402 is received when the distal outcoupling face is pressed against the anchoring plate. Thereby the tool (sonotrode) and the second object are adapted to each other for the tool to be pressed directly against a proximally facing surface of the anchoring plate.

The tool may be equipped with a guiding structure, such as inwardly facing guiding protrusions 411 for the second object to be guided relative to the tool. Such guiding structure may especially engage the fastening element, as is the case for the schematically shown guiding protrusions 411 of the embodiment shown in FIG. 105.

Figure 106:
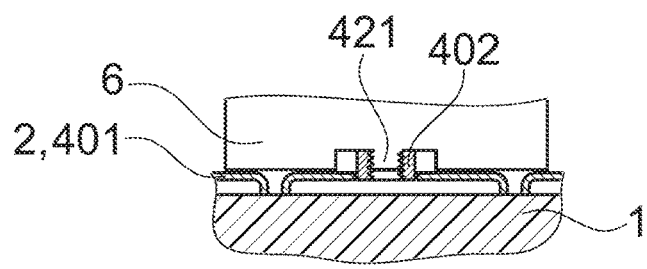

In embodiments, the guiding structure may be configured as fastening structure cooperating with the fastening element to temporarily fasten the second object (faster) 2 to the sonotrode 6. This possibility is schematically shown in FIG. 106. In the example of FIG. 106, the second object/fastener has a fastening structure 402 being a nut secured, for example welded, to the anchoring plate 401, and this nut serves as the fastening structure. The tool 6 includes a threaded protrusion 421 adapted to the inner thread of the nut 402, whereby for the process the fastener can be screwed onto the tool.

Similar configurations are possible for other fastening elements as well, for example an indentation with an inner thread for cooperating with a threaded bar of the fastener.

In the hereinbefore described embodiments, the mechanical vibration was assumed to be longitudinal vibration, i.e. vibration in the proximodistal direction. This is not a requirement. As known for example from ultrasonic welding of metallic parts, the vibration may also be transverse vibration. In the context of the present invention, transverse vibration may especially be an option for embodiments in which the vibration is coupled into the metallic part, i.e. into the second object instead of into the first object. For example in embodiments like the ones described referring to FIG. 106, in which there is a temporary fastening of the second object to the sonotrode, it would be readily possible to couple transverse vibration from the sonotrode into the second object.

Figure 108:
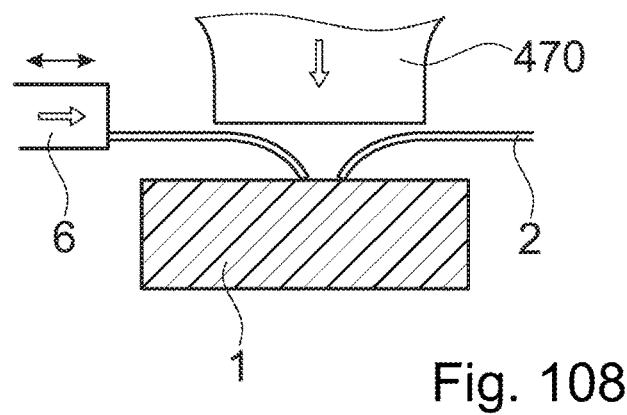
FIGS. 108-110 sonotrode designs and configurations for coupling transverse vibration into a second object.

FIG. 108 very schematically illustrates an alternative. The sonotrode couples vibration into the second object from a generally lateral direction (in-plane direction with respect to the sheet plane, if defined), whereas a separate pressing tool 470 applies the required pressing force. This set-up corresponds to the lateral-drive set-up in ultrasonic metal welding.

Figure 109:
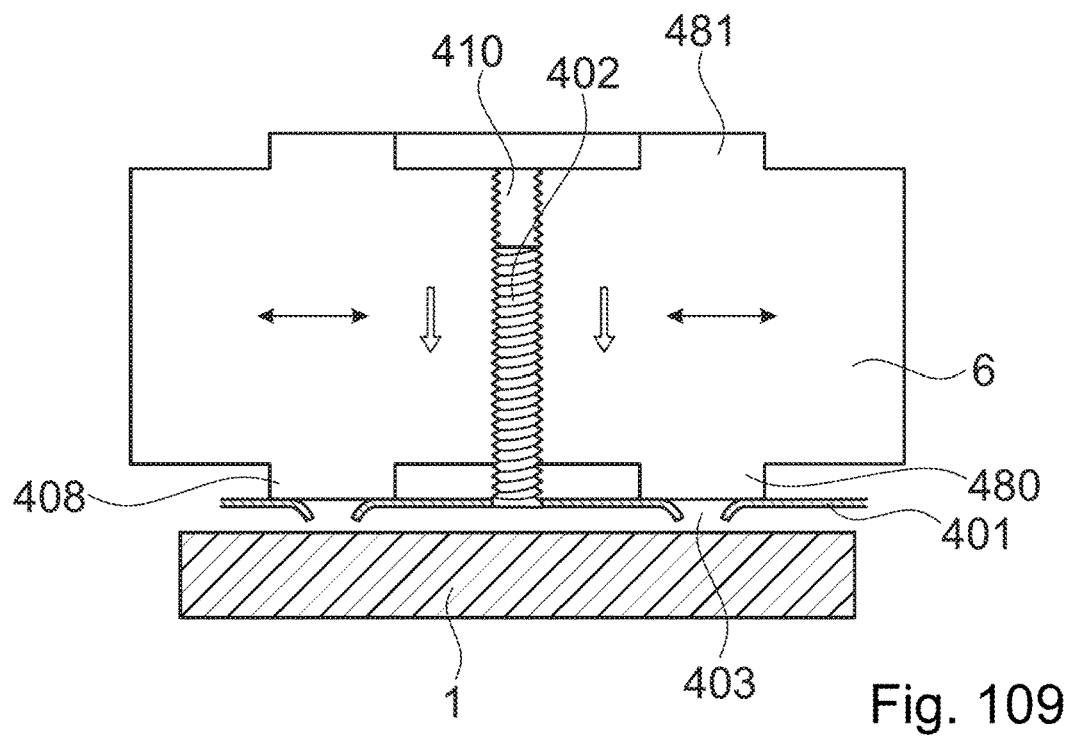

FIG. 109 shows a sonotrode 6 equipped for transversal oscillation. The sonotrode 6 has a receiving opening 410 that is configured to receive the fastening structure 402. Especially, in FIG. 109 the receiving opening is illustrated to have an inner thread adapted to the thread of the fastening structure being a threaded bar. The sonotrode 6 has a ring-shaped skirt 480 that during the process is pressed against a peripheral part of the anchoring plate and thereby couples the pressing force and, together with the receiving opening, the mechanical vibration into the anchoring plate 401. For symmetry reasons, the sonotrode 6 shown in FIG. 109 in addition to the distal ring-shaped skirt 480 that is pressed against the anchoring plate has a proximal ring-shaped skirt 481. Due to this, it would be possible to carry out the process for two assemblies in parallel, the sonotrode being clamped between two first objects pressed against the respective second objects that are introduced from opposite sides (then, of course, the length of the respective fastening structures should correspond to at most half of the extension of the sonotrode in the direction of the receiving opening. Two more coupling locations could be present on the opposite sides of the sonotrode that are parallel to the drawing plane in FIG. 109.

Figure 110:
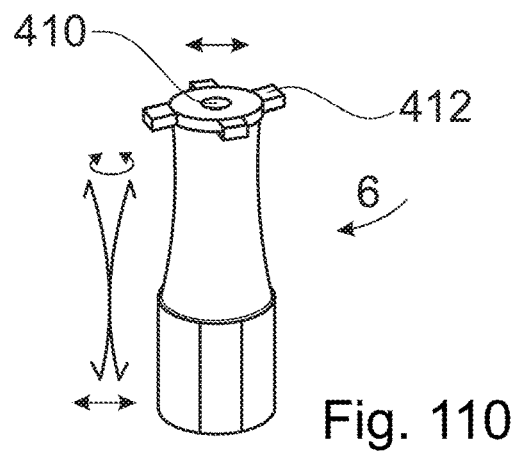

Another sonotrode 6, suitable for example for a 'wedge-reed'-like configuration, is illustrated in FIG. 110. The sonotrode includes a receiving opening 410 for receiving the fastening structure (for example threaded bar). Similarly to the embodiments of FIGS. 109 and 106, the receiving opening may optionally be equipped for a coupling to the fastening structure. The sonotrode is equipped and mounted for transversal vibration of the distal end portion, for example by a vibration coupled into the sonotrode by a coupler acting from sideways and causing a bending oscillation of the sonotrode, as schematically indicated in FIG. 110.

The sonotrode in the depicted embodiment instead of a ring-shaped skirt includes a plurality of wings for coupling the vibration into lateral portions of the anchoring plate. An adaptation to a sonotrode with an outcoupling skirt like in FIG. 109 or with another coupling face would be readily possible.

Whereas the option of transversal vibration has primarily been described referring to second objects being fasteners having an anchoring plate, the concept may readily be applied to other embodiments also, especially to embodiment in which the vibration is coupled into the second object, including the embodiments of FIGS. 25-26, 30-31 and others.

Example 1

A disc of ABS having a thickness of 4 mm was and a diameter of 19.5 mm was attached to a metal sheet deformed as shown in FIGS. 1*a* and 1*b*. The metal sheet was a 0.8 mm steel sheet. The large diameter D was varied between 6, 8, and 12 mm, and the height h was set to a value between 2 mm and 3 mm, and the angle α was chosen to be 20°. Using a commercially available ultrasonic welding apparatus (20 kHz) operated with an amplitude of about 60 μm and a power required of 1000-1500 W that was pressed against the proximal end face of the disc by a force starting at 100 N and peaking at about 400 N, the method as shown in FIGS. 3*a* and 3*b* was carried out. A solid connection was achieved, and after cooling to room temperature, the disc could not be torn away from the sheet without deforming the sheet.

The same was repeated with systematically varied parameters, namely

A 1.2 mm aluminum sheet instead of a steel sheet.
An angle of 40°
A height of 1.8 mm Polyamide 66 with 30% Vol Glass Fibers as the disk material PVC, PBT PET and PC 2000 as the disk materials;

A punched perforation with a smooth shape as shown in FIGS. 2a and 2b.

What is claimed is:

1. A method of mechanically securing a first object to a second object, the method comprising the steps of:
   providing the first object comprising a thermoplastic material in a solid state;
   providing the second object with a generally flat sheet portion having a second object edge;
   providing a third object;
   positioning the first object, the second object and the third object to provide an assembly comprising the first, second and third objects, in which assembly the second object edge is in contact with the thermoplastic material of the first object;
   while the second object edge is in contact with the thermoplastic material of the first object, coupling mechanical vibration energy into the assembly by means of a vibrating tool until:
      a flow portion of the thermoplastic material of the first object due to friction heat generated between the second object edge and the thermoplastic material of the first object becomes flowable and flows around the second object edge to at least partially embed the second object edge in the thermoplastic material of the first object; and
      the third object is caused to be embedded at least partially in the thermoplastic material of the first object,
   stopping mechanical vibration and causing the thermoplastic material of the first object to re-solidify, whereby re-solidified thermoplastic material of the first object at least partially embedding the second object edge anchors the first object to the second object and whereby re-solidified thermoplastic material anchors the third object to the first object.

2. The method according to claim 1, wherein in the step of positioning, the second and third objects are brought into contact with the first object from opposite sites.

3. The method according to claim 1, wherein in the step of positioning, the first object is brought into contact with the second object from a generally proximal side and the third object is brought into contact with the first object from a generally proximal side, and the step of coupling mechanical vibration energy into the assembly comprises pressing a vibrating tool against a proximally facing coupling face of the third object, whereby by the vibrating tool simultaneously a pressing force relative to the first object and mechanical vibration are coupled into the third object.

4. The method according to claim 1, wherein in the step of providing the second object, the sheet portion defining a sheet plane and along the second object edge has a section projecting away from the sheet plane towards a proximal direction.

5. The method according to claim 1, wherein in the step of providing the second object, the second object comprises a perforation, with the second object edge running along the perforation.

6. The method according to claim 5, wherein the sheet portion defines a sheet plane and around the perforation has a deformed section projecting away from the sheet plane, and wherein the deformed section comprises a plurality of tongues, the second object edge being constituted by end edges of the tongues.

7. The method according to claim 5, wherein the sheet portion defines a sheet plane and around the perforation has a deformed section projecting away from the sheet plane, and wherein the deformed section runs continuously around a periphery of the perforation.

8. The method according to claim 1, wherein the step of coupling mechanical vibration energy into the assembly is carried out such that during the step of causing the flow portion to re-solidify, the third object extends through a plane defined by the second object edge.

9. The method according to claim 1, wherein the third object comprising a generally flat sheet portion having a third object edge, and wherein the step of coupling mechanical vibration energy into the assembly comprises coupling mechanical vibration energy into the assembly until a flow portion of the thermoplastic material becomes flowable and flows around the third object edge to at least partially embed the third object edge in the thermoplastic material and flows around the third object edge to embed the third object edge in the thermoplastic material.

10. The method according to claim 9, wherein the second object has a second object perforation and the third object has a third object perforation, and wherein the step of positioning comprises aligning the second object perforation and the third object perforation with respect to each other.

11. The method according to claim 1, wherein in the step of positioning, the second and third objects are brought into contact with the first object from a same side.

12. The method according to claim 1, wherein the first object and the vibrating tool, by which the vibration is coupled into the assembly, are adapted to each other so that there is a contact face between the vibrating tool and the first object in addition to a contact face between the vibrating tool and the second object or the third object, wherein in the step of coupling the vibration energy into the assembly, thermoplastic material of the first object is caused to become flowable at an interface to the vibrating tool and is caused to flow relative to the vibrating tool.

13. The method according to claim 12, wherein the third object comprising a generally flat sheet portion having a third object edge,
   wherein in the step of positioning the second and third objects are brought into contact with the thermoplastic material of the first object from opposite sides,
   and wherein the step of coupling mechanical vibration energy into the assembly comprises coupling mechanical vibration energy by means of a first and second vibrating tool from opposite sides into the assembly while the second object edge and third object edge are in contact with the thermoplastic material, until a flow portion of the thermoplastic material becomes flowable and flows around the second object edge and the third object edge to at least partially embed the second object edge and the third object edge in the thermoplastic material,
   and wherein the first object comprises a first protrusion with a first end portion protruding from the respective face against which the second object edge is pressed, wherein the contact face is between the first vibrating tool and the first end portion, and wherein the first object further comprises a second protrusion with a second end portion protruding from the respective face against which the third object edge is pressed, wherein the contact face is between the second vibrating tool and the second end portion.

14. A method of mechanically securing a first object to a second object, the method comprising the steps of:

providing the first object comprising a thermoplastic material in a solid state;
providing the second object with a generally flat sheet portion having a second object edge;
providing a third object;
positioning the first object, the second object and the third object to provide an assembly comprising the first, second and third object, in which assembly the second object edge is in contact with the thermoplastic material of the first object;
while the second object edge is in contact with the thermoplastic material of the first object, coupling mechanical vibration energy into the assembly until a flow portion of the thermoplastic material due to friction heat generated between the second object edge and the thermoplastic material becomes flowable and flows around the second object edge to at least partially embed the second object edge in the thermoplastic material;
stopping the mechanical vibration and causing the thermoplastic material to re-solidify,
whereby after the thermoplastic material re-solidifies, the re-solidified thermoplastic material at least partially embedding the second object edge anchors the first object in the second object and the first object and the third object engage with each other thereby securing the third object to the second object.

15. The method according to claim 14, wherein the third object has a third object through opening and the step of positioning the first object, the second object and the third object relative to each other comprises causing a shaft portion of the first object to reach through the third object through opening until the second object edge is in contact with the thermoplastic material.

16. The method according to claim 15, wherein the second object has a perforation, with the second object edge running along the perforation, wherein a diameter of the shaft portion is larger than a diameter of the perforation.

17. The method according to claim 15, wherein a diameter of the shaft portion is equal to or smaller than a cross section of the third object opening.

18. The method according to claim 14, wherein the first object comprises a proximal head portion.

19. The method according to claim 18, wherein the step of coupling energy into the assembly comprises pressing a vibrating tool against a proximally facing coupling face of the first object, whereby by the vibrating tool simultaneously a pressing force relative to the second object and mechanical vibration are coupled into the first object, and wherein the step of coupling energy and pressing is carried out until a distally facing face of the head portion abuts against a proximal end face of the third object in a vicinity of a mouth of the third object opening.

20. The method according to claim 14, wherein the step of coupling mechanical vibration energy into the assembly is carried out such that during the step of causing the flow portion to re-solidify, the first object extends through a plane defined by the second object edge.

21. The method according to claim 14, wherein the sheet portion has a perforation and around the perforation is deformed to project away from a sheet plane towards a distal side.

22. The method according to claim 14, wherein the second object has a plurality of perforations, in each case with a second object edge running along the plurality of perforations, wherein the plurality of perforations are arranged within a common deformed section projecting away from a sheet plane towards a distal side.

* * * * *